(12) United States Patent
Seo et al.

(10) Patent No.: US 12,382,155 B2
(45) Date of Patent: Aug. 5, 2025

(54) CAMERA MODULE AND MOBILE DEVICE INCLUDING THE SAME

(71) Applicant: SAMSUNG ELECTRO-MECHANICS CO., LTD., Suwon-si (KR)

(72) Inventors: Bo Sung Seo, Suwon-si (KR); Ji Buem Chun, Suwon-si (KR); Jae Won Jung, Suwon-si (KR); Nam Ki Park, Suwon-si (KR); Dong Yeon Shin, Suwon-si (KR); Young Bok Yoon, Suwon-si (KR); Byung Gi An, Suwon-si (KR); Dong Ryul Kim, Suwon-si (KR); Joo Sub Maeng, Suwon-si (KR); Se Hyeun Yun, Suwon-si (KR); Han Na Lee, Suwon-si (KR); Soo Yeon Oh, Suwon-si (KR); Jun Sup Shin, Suwon-si (KR); Suk Young Oh, Suwon-si (KR); Joung Ho Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/554,618

(22) Filed: Dec. 17, 2021

(65) Prior Publication Data
US 2022/0210300 A1 Jun. 30, 2022

(30) Foreign Application Priority Data
Dec. 29, 2020 (KR) ........................ 10-2020-0185696

(51) Int. Cl.
*H04N 23/55* (2023.01)
*G02B 27/64* (2006.01)
(Continued)

(52) U.S. Cl.
CPC ............ *H04N 23/55* (2023.01); *G02B 27/646* (2013.01); *H04N 23/51* (2023.01); *H04N 23/54* (2023.01);
(Continued)

(58) Field of Classification Search
CPC ........ H04N 23/51; H04N 23/54; H04N 23/55; H04N 23/57; H04N 23/67; G03B 3/00; G03B 30/00
(Continued)

(56) References Cited

U.S. PATENT DOCUMENTS 9,020,334 B1 4/2015 Suzuka
11,102,387 B2 8/2021 Lee et al.
(Continued)

FOREIGN PATENT DOCUMENTS

CN 107277307 A 10/2017
CN 110036326 A 7/2019
(Continued)

OTHER PUBLICATIONS

Indian Office Action issued on Jul. 27, 2022, in counterpart Indian Patent Application No. 202114059708 (5 pages in English).
(Continued)

*Primary Examiner* — Anthony J Daniels
(74) *Attorney, Agent, or Firm* — NSIP Law

(57) ABSTRACT

A camera module includes a housing having an internal space, and a first lens module and a second lens module disposed in the internal space and each configured to be movable in an optical axis direction, wherein a first shaft and a first ball member are disposed between the first lens module and the housing, wherein a second shaft and a second ball member are disposed between the second lens module and the housing, and wherein, when moving in the optical axis direction, rolling friction occurs on one of both
(Continued)

sides of each lens module, and sliding friction occurs on the other of both sides.

31 Claims, 46 Drawing Sheets

(51) Int. Cl.
    *H04N 23/51* (2023.01)
    *H04N 23/54* (2023.01)
    *H04N 23/67* (2023.01)
    *H04N 23/68* (2023.01)
    *H04N 23/69* (2023.01)

(52) U.S. Cl.
    CPC .......... *H04N 23/67* (2023.01); *H04N 23/685* (2023.01); *H04N 23/69* (2023.01)

(58) Field of Classification Search
    USPC ....................................................... 348/345
    See application file for complete search history.

(56) References Cited

U.S. PATENT DOCUMENTS

| | | | |
|---|---|---|---|
| 11,575,821 | B2 | 2/2023 | Kim et al. |
| 11,624,891 | B2 | 4/2023 | Kawanabe |
| 2017/0139225 | A1 | 5/2017 | Lim |
| 2017/0160509 | A1 | 6/2017 | Wang et al. |
| 2018/0096204 | A1 | 4/2018 | Hyun et al. |
| 2018/0367714 | A1 | 12/2018 | Im et al. |
| 2019/0271825 | A1* | 9/2019 | Kawanabe ............... G02B 7/02 |
| 2019/0346653 | A1 | 11/2019 | Kang et al. |
| 2020/0137274 | A1 | 4/2020 | Lee et al. |
| 2020/0348479 | A1 | 11/2020 | Kwon et al. |
| 2021/0018719 | A1 | 1/2021 | Park |
| 2021/0072495 | A1 | 3/2021 | Shin et al. |
| 2021/0096321 | A1 | 4/2021 | Choi |
| 2021/0302687 | A1 | 9/2021 | Jang |
| 2021/0352215 | A1* | 11/2021 | Kim ....................... H04N 23/45 |
| 2021/0377450 | A1* | 12/2021 | Shabtay ................. H04N 23/45 |
| 2022/0026692 | A1 | 1/2022 | Machida et al. |
| 2022/0121001 | A1* | 4/2022 | Xu ........................... G03B 5/00 |
| 2022/0256058 | A1* | 8/2022 | Kim ....................... H04N 23/55 |
| 2022/0291475 | A1 | 9/2022 | Kim et al. |
| 2022/0382013 | A1* | 12/2022 | Oh ......................... G03B 13/36 |
| 2023/0161227 | A1* | 5/2023 | Kim ....................... H04N 23/54 |
| | | | 396/55 |
| 2023/0367181 | A1* | 11/2023 | Shin ........................ G03B 3/10 |

FOREIGN PATENT DOCUMENTS

| | | |
|---|---|---|
| CN | 111103742 A | 5/2020 |
| CN | 211959318 U | 11/2020 |
| JP | 3800612 B2 | 7/2006 |
| JP | WO2018/105267 A1 | 6/2018 |
| KR | 20-0401042 Y1 | 11/2005 |
| KR | 10-2017-0056387 A | 5/2017 |
| KR | 10-2018-0098463 A | 9/2018 |
| KR | 10-2018-0135392 A | 12/2018 |
| KR | 10-2018-0137277 A | 12/2018 |
| KR | 10-2019-0036372 A | 4/2019 |
| KR | 10-2019-0119390 A | 10/2019 |
| KR | 10-2019-0129696 A | 11/2019 |
| KR | 10-2020-0047275 A | 5/2020 |
| KR | 10-2020-0126873 A | 11/2020 |
| KR | 10-2173328 B1 | 11/2020 |
| KR | 10-2021-0002820 A | 1/2021 |
| TW | 201841017 A | 11/2018 |
| WO | WO 2020/060235 A1 | 3/2020 |

OTHER PUBLICATIONS

Korean Office Action issued on Jun. 1, 2023, in counterpart Korean Patent Application No. 10-2020-0185696 (6 pages in English, 6 pages in Korean).
Korean Office Action issued on Dec. 7, 2023, in counterpart Korean Patent Application No. 10-2020-0185696 (5 pages in English, 5 pages in Korean).
Chinese Office Action issued on Apr. 1, 2024, in counterpart Chinese Patent Application No. 202111622076.4 (5 pages in English, 10 pages in Chinese).
Korean Office Action issued on Sep. 11, 2023, in Korean Patent Application No. 10- 2021-0175103 (counterpart of U.S. Appl. No. 17/861,749) (6 pages in English, 5 pages in Korean).
Non-Final Office Action issued on Apr. 28, 2025, in U.S. Appl. No. 17/861,749 (* pages in English).
U.S. Appl. No. 17/861,749, filed Jul. 11, 2022, Se Yeon Hwang et al, Samsung Electro-Mechanics Co., Ltd.
Non-Final Office Action issued on Sep. 29, 2024, in U.S. Appl. No. 17/588,621 (14 pages in English).
Notice of Allowance issued on Apr. 4, 2025, in U.S. Appl. No. 17/588,621 (13 pages in English).
Notice of Allowance issued on May 28, 2025, in U.S. Appl. No. 17/861,749 (8 pages in English).
U.S. Appl. No. 17/588,621, filed Jan. 31, 2022, Jae Kyung Kim et al, Samsung Electro-Mechanics Co., Ltd.

* cited by examiner

CAMERA MODULE AND MOBILE DEVICE INCLUDING THE SAME

CROSS-REFERENCE TO RELATED APPLICATION(S)

This application claims the benefit under 35 USC 119(a) of Korean Patent Application No. 10-2020-0185696 filed on Dec. 29, 2020, in the Korean Intellectual Property Office, the entire disclosure of which is incorporated herein by reference for all purposes.

BACKGROUND

1. Field

The present disclosure relates to a camera module and a mobile device including the same.

2. Description of the Background

Cameras may be employed in mobile devices such as smartphones, tablet PCs, laptops, and the like, and an autofocusing function (AF), an image stabilization function (OIS) and a zoom function may be added to cameras for mobile terminals.

However, to implement the various functions, the structure of a camera module may be complicated, and the size of a camera module may be increased, such that the size of a mobile device on which the camera module is mounted may also be increased.

Also, when a lens or an image sensor is directly moved for image stabilization, the weight of a lens or an image sensor and also the weight of the other members to which the lens or image sensor is attached should be considered, such that driving force above a certain level may be necessary, which may increase power consumption.

Further, to implement an autofocusing function (AF) and a zoom function, a predetermined distance or more should be secured such that a plurality of lens barrels may move a relatively long distance in an optical axis direction, and the alignment of optical axes of the plurality of lens barrels should not be disturbed. However, it may be difficult to implement such a structure in a small-sized and compact camera structure.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, and a first lens module and a second lens module disposed in the internal space, and each configured to be movable in an optical axis direction, wherein a first shaft and a first ball member are disposed between the first lens module and the housing, wherein a second shaft and a second ball member are disposed between the second lens module and the housing, and wherein, when moving in the optical axis direction, rolling friction occurs on one of both sides of each lens module, and sliding friction occurs on the other of both sides.

One side of the first lens module may be supported by the first shaft, and the other of both sides of the first lens module may be supported by the first ball member, and one side of the second lens module may be supported by the second ball member, and the other of both sides of the second lens module may be supported by the second shaft.

The one side of the first lens module may have a length longer than that of the other of both sides of the first lens module in the optical axis direction, and the other of both sides of the second lens module may have a length longer than that of the one side of the second lens module in the optical axis direction.

A first magnet may be disposed on one side surface of the first lens module, and a first coil portion including a plurality of coils may be disposed in a position opposing the first magnet in a direction perpendicular to the optical axis direction, a second magnet may be disposed on one side surface of the second lens module, and a second coil portion including a plurality of coils may be disposed in a position opposing the second magnet in a direction perpendicular to the optical axis direction, and the one side surface of the first lens module and the one side surface of the second lens module may be disposed opposite to each other with respect to the optical axis.

One surface of the first magnet opposing the first coil portion may have an N pole and an S pole in the optical axis direction, one surface of the second magnet opposing the second coil portion may have an N pole and an S pole in the optical axis direction, and two position sensors of which sensed values have a phase difference of 90 degrees therebetween according to a movement of the first magnet, and two position sensors of which sensed values have a phase difference of 90 degrees therebetween according to a movement of the second magnet may be disposed in the housing.

A magnetic material configured to generate magnetic force in a direction perpendicular to the optical axis direction may be disposed on each of surfaces of the first lens module and the housing opposing each other, and a magnetic material configured to generate magnetic force in a direction perpendicular to the optical axis direction may be disposed on each of surfaces of the second lens module and the housing opposing each other.

A center of magnetic force acting between the first lens module and the housing may be disposed more adjacent to the first shaft than the first ball member, and a center of magnetic force acting between the second lens module and the housing may be disposed more adjacent to the second shaft than the second ball member.

The first shaft and the second shaft may be disposed opposite to each other with respect to the optical axis.

The first shaft and the second shaft may be disposed on and fixed to a bottom surface of the housing.

The first lens module may include a first guide groove in which the first shaft may be accommodated and a second guide groove in which the first ball member may be accommodated, and the second lens module may include a third guide groove in which the second shaft may be accommodated and a fourth guide groove in which the second ball member may be accommodated.

A plurality of contact protrusions may be disposed in the first guide groove and the third guide groove, respectively, and the plurality of contact protrusions may be configured to slide with respect to the first shaft and the second shaft.

Each of the first lens module and the second lens module may be supported at three points by the plurality of contact protrusions, the first ball member, and the second ball member.

The camera module may further include a reflective module configured to change a path of light such that light may be directed toward the first lens module and the second lens module, and an image sensor module including an image sensor configured to receive light passing through the first lens module and the second lens module.

The reflective module may be configured to be rotatable about a first axis perpendicular to the optical axis and a second axis perpendicular to both the optical axis and the first axis as rotation axes.

The image sensor may be configured to be movable on a first axis perpendicular to the optical axis and a second axis perpendicular to both the optical axis and the first axis.

A first stopper configured to limit a moving distance of the first lens module and a second stopper configured to limit a moving distance of the second lens module may be disposed in the housing, and the first stopper may be disposed to press both ends of the first shaft, and the second stopper may be disposed to press both ends of the second shaft.

In another general aspect, a camera module includes a housing having a first side facing a second side with an internal space therebetween, first and second lens barrels disposed in the internal space along an optical axis direction, a first shaft and a first ball member disposed between the first lens barrel and the housing, and a second shaft and a second ball member disposed between the second lens barrel and the housing, wherein the first shaft is disposed closer to the first side than the first ball member is, and wherein the second shaft is disposed closer to the second side than the second ball member is.

The first lens barrel may be movably disposed on the first shaft and the first ball member to move in the optical axis direction, and the second lens barrel may be movably disposed on the second shaft and the second ball member to move in the optical axis direction.

The first lens barrel may be supported on the first shaft in two sliding areas spaced apart from each other in the optical axis direction and supported on the first ball member in one rolling area.

The first lens barrel may include a pair of protrusions in each sliding area slidably contacting the first shaft, and a groove accommodating the first ball member rotatable in the rolling area.

The protrusions may be disposed in a groove on the first lens module.

The first shaft may include a pair of shafts, and the first lens barrel may include a protrusion in each sliding area slidably contacting the pair of shafts, and a groove accommodating the first ball member rotatable in the rolling area.

A side of the first lens barrel disposed facing the first side may be slidably supported on the first shaft, and a side of the first lens barrel disposed facing the second side may be supported on the first ball member, wherein the first ball member may be rotatable, and a side of the second lens barrel disposed facing the second side may be slidably supported on the second shaft, and a side of the second lens barrel disposed facing the first side may be supported on the second ball member, wherein the second ball member may be rotatable.

The side of the first lens barrel disposed facing the first side may have a length longer in the optical axis direction than that of the side of the first lens barrel disposed facing the second side, and the side of the second lens barrel disposed facing the second side may have a length longer in the optical axis direction than that of the side of the second lens barrel disposed facing the first side.

First coils may be disposed in the optical axis direction on the first side and a first magnet may be disposed on the first lens barrel opposing the first coils, and a second magnet may be disposed on the side of the second lens barrel disposed facing the second side, and second coils may be disposed in the optical axis direction opposing the second magnet.

In another general aspect, a camera module includes a first lens barrel slidably disposed on a first shaft disposed in the optical axis direction, and a second lens barrel spaced apart from the first shaft and slidably disposed on a second shaft disposed in the optical axis direction, wherein the first and second lens barrels are disposed on an optical axis.

The camera module may further include first and second rotatable ball members spaced apart from the first and second shafts in a direction perpendicular to the optical axis direction, respectively, wherein the first lens barrel may be disposed on the first ball member, and the second lens barrel may be spaced apart from the first ball member and disposed on the second ball member.

The first ball member may include two or more rotatable ball members, and the second ball member may include two or more rotatable ball members.

A first side of the first lens barrel may have a length longer in the optical axis direction than that of a second side of the first lens barrel opposite to the first side, a second side of the second lens barrel may have a length longer in the optical axis direction than that of a first side of the second lens barrel opposite to the second side, and the first sides of the first and second lens barrels may face in a substantially same direction perpendicular to the optical axis direction.

A lower surface connecting the first side and the second side of the first lens barrel may be disposed on the first shaft and the first ball member, the first shaft may be disposed closer to the first side of the first lens barrel than the first ball member is, and the lower surface may be supported on the first shaft in two places and on the first ball member in one place to form a triangle of support.

A center of magnetic force urging the first lens module in a direction toward the first shaft and the first ball member may be disposed within the triangle of support.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
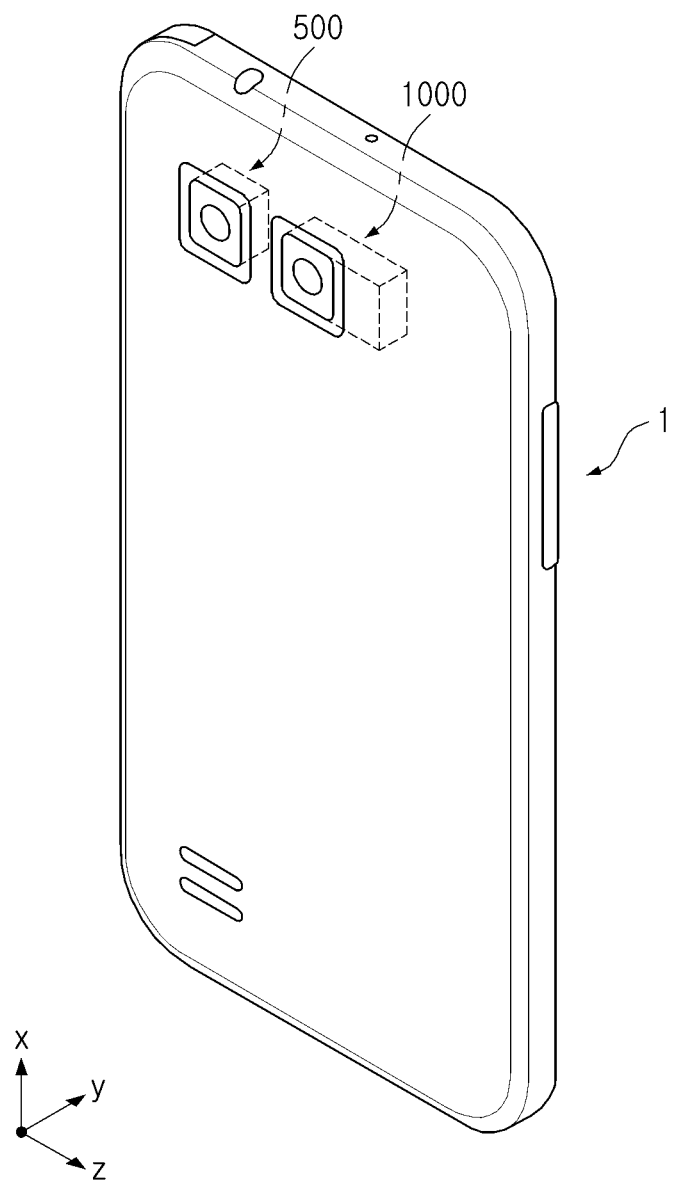
FIG. 1 is a perspective diagram illustrating a mobile device according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after gaining an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an embodiment or example, for example, as to what an embodiment or example may include or implement, means that at least one embodiment or example exists in which such a feature is included or implemented while all embodiments and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, although the examples described herein have a variety of configurations, other configurations are possible as will be apparent after an understanding of this disclosure.

An aspect of the present disclosure is to provide a camera module which may implement functions such as autofocusing adjustment, zoom, and optical image stabilization, may have a simplified structure, and may have a reduced size.

An aspect of the present disclosure is to provide a camera module in which, even when a plurality of groups of lenses are provided, the plurality of groups of lenses may be easily aligned in an optical axis direction.

An aspect of the present disclosure is to provide a camera module in which a plurality of groups of lenses moving in an optical axis direction may be easily moved in an optical axis direction to implement a zoom function.

An aspect of the present disclosure is to provide a camera module in which both a zoom lens and a reflective module may be prevented from being separated from a driving position and from being damaged by impacts.

An aspect of the present disclosure is to provide a camera module in which the movement position of a zoom lens may be accurately sensed to maximize performance of the zoom lens.

(FIG. 1)—Mobile Device

FIG. 1 is a perspective diagram illustrating a mobile device according to an example embodiment.

Referring to FIG. 1, a mobile device 1 in an example embodiment may be implemented as a mobile device such as a mobile communication terminal, a smartphone, and a tablet PC including a plurality of camera modules 500 and 1000.

In the example embodiment, the plurality of camera modules 500 and 1000 may be mounted on the mobile device 1. The plurality of camera modules 500 and 1000 may be arranged to be aligned horizontally as illustrated, or may be arranged to be vertically aligned although not illustrated.

Alternatively, the mobile device 1 in the example embodiment may include only the camera module 1000 which may have a zoom function described in the example embodiment.

At least one of the plurality of camera modules 500 and 1000 may be configured as a camera module 1000 in the example embodiment, described with reference to the drawings including FIG. 2. That is, a mobile device having a dual camera module may include at least one of the two camera modules as the camera module 1000 described in the example embodiment.

In the example embodiment, the camera module and the mobile device including the same may implement functions such as autofocus adjustment, zoom, and optical image stabilization, may have a simplified structure and a reduced size. Also, power consumption may be reduced.

The mobile device 1 may include the camera module 1000 having a zoom function to image a subject.

In the example embodiment, the camera module 1000 may include a plurality of lenses, and the optical axis (Z-axis) of one or more lenses of the plurality may be directed in a direction perpendicular to a thickness direction (Y-axis direction, a direction from the front surface to the rear surface of the mobile device, or an opposite direction) of the mobile device 1.

For example, the optical axis (Z-axis) of the plurality of lenses provided in the camera module 1000 may be formed in a width direction or a length direction of the mobile device 1.

Therefore, even when the camera module 1000 includes functions such as autofocusing (hereinafter, AF), zoom, and optical image stabilization (O1S), the thickness of the mobile device 1 may not increase. Accordingly, the thickness of the mobile device 1 may be reduced.

When two camera modules are used, entrance holes through which light is incident to the two camera modules may be disposed adjacent to each other.

The first camera module 1000 and the second camera module 500 may be configured to have different fields of view.

The first camera module 1000 may be configured to have a relatively narrow field of view (e.g., a telephoto camera), and the second camera module 500 may be configured to have a relatively wide field of view (e.g., a wide-angle camera). Here, the first camera module 1000 may correspond to a camera module described below with reference to the drawings other than FIG. 2.

For example, the field of view 81 of the first camera module 1000 may be formed in the range of 9° to 35°, and the field of view 82 of the second camera module 500 may be formed in the range of 60° to 120°.

By configuring the fields of view of the two camera modules differently as above, images of the subject may be obtained at various depths, and various image implementations such as combining or overlapping images may be implemented.

The camera module 1000 in an example embodiment may have AF, zoom, and OIS functions. Also, the camera module 1000 in the example embodiment may implement a relatively long stroke of movement of a plurality of lens barrels in the optical axis direction such that a high-performance zoom function may be implemented.

The camera module 1000 having AF, zoom, and OIS functions may include various components, and accordingly, the size of the camera module may increase as compared to a general camera module.

When the size of the camera module 1000 increases, however, it may be difficult to reduce the size of the mobile device 1 on which the camera module 1000 is mounted.

For example, in the camera module, when the number of stacked lenses increases for a zoom function, and a plurality of stacked lenses are formed in the thickness direction of the mobile device, the thickness of the mobile device may increase depending on the number of stacked lenses. Accordingly, the number of stacked lenses may not be sufficiently secured without increasing the thickness of the mobile device, such that zoom performance may be weakened.

Also, to implement the AF, zoom, and OIS functions, it may be necessary to install an actuator moving a plurality of lens groups in the optical axis direction or a direction perpendicular to the optical axis. However, when the optical axis (Z-axis) of the lens group is formed in the thickness direction of the mobile device, the actuator for moving the lens group may also need to be installed in the thickness direction of the mobile device. Accordingly, the thickness of the mobile device may increase.

However, since the camera module 1000 in an example embodiment may be disposed such that the optical axis (Z-axis) of the plurality of lenses may be perpendicular to the thickness direction of the mobile device 1, even when the camera module 1000 having AF, zoom, and OIS functions is mounted, the mobile device 1 may have a reduced thickness. (FIGS. 2 to 4B)—Overall Description of Camera Module Embodiment 1-1 (FIGS. 2 to 3)

Figure 2:
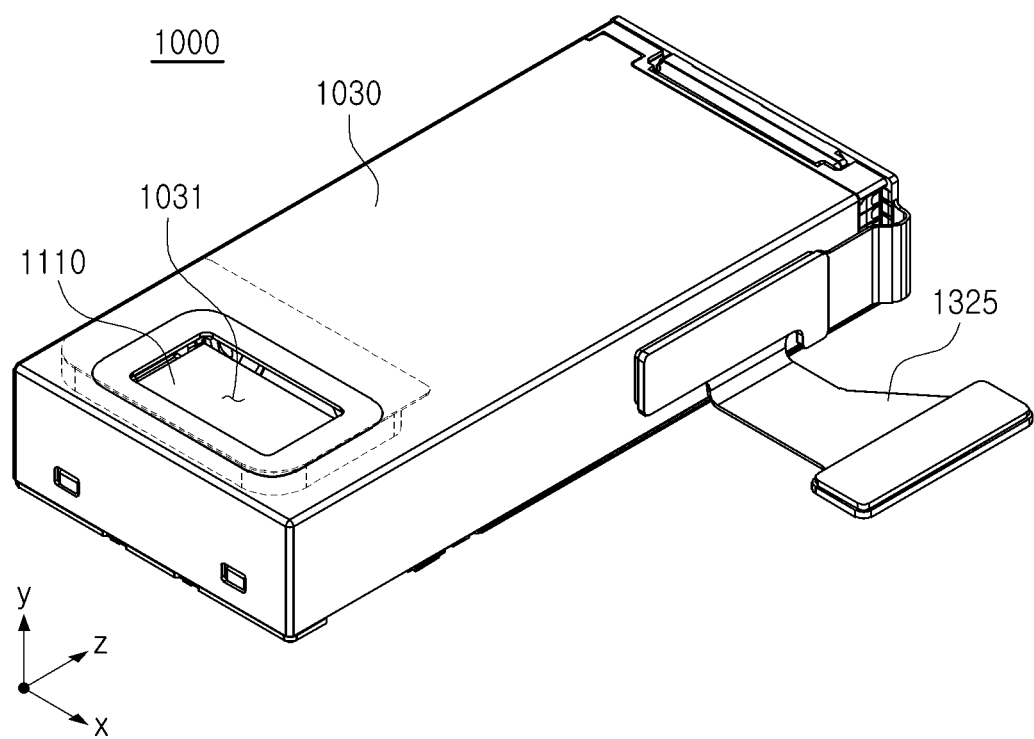
FIG. 2 is a perspective diagram illustrating a camera module according to an example embodiment of the present disclosure.

FIG. 2 is a perspective diagram illustrating a camera module according to an example embodiment. FIG. 3 is an exploded perspective diagram illustrating a camera module in FIG. 2 in which a cover is disassembled.

Figure 3:
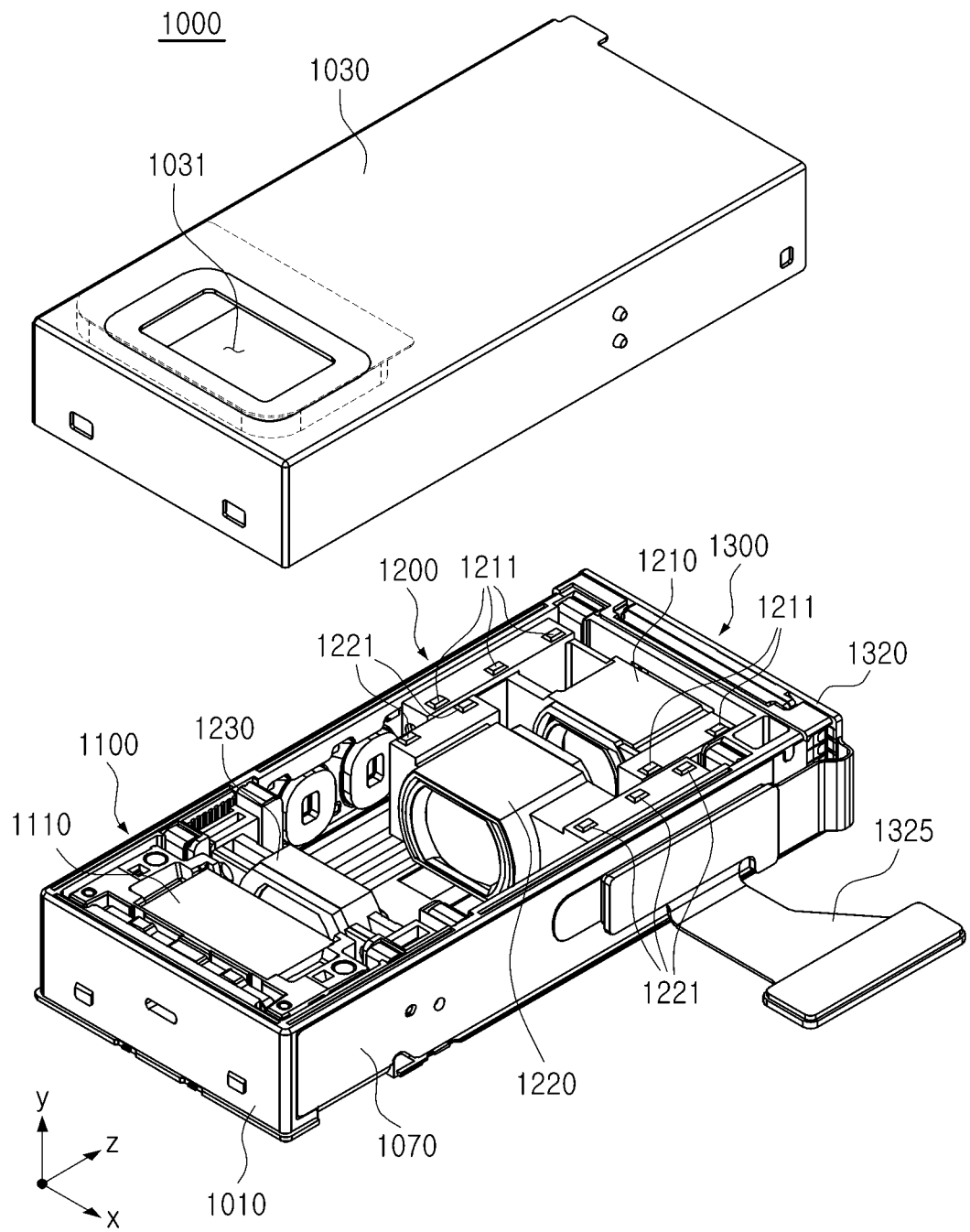
FIG. 3 is an exploded perspective diagram illustrating a camera module in FIG. 2 in which a cover is disassembled.

Referring to FIGS. 2 and 3, the camera module 1000 in an example embodiment may include a reflective module 1100, a lens module 1200 and an image sensor module 1300 provided in a housing 1010.

The reflective module may be configured to change a travelling direction of light. For example, a traveling direction of light incident through an opening 1031 of a cover 1030 covering the camera module 1000 from the top may be directed toward the lens module 1200 through the reflective module 1100. To this end, the reflective module 1100 may include an optical path changing member 1110 configured to change the path of light (e.g., to reflect light). The optical path changing member 1110 may be implemented by a mirror, a prism, a beam splitter, or the like.

For example, the path of the light incident in the thickness direction (Y-axis direction) of the camera module 1000 may change to substantially coincide with the optical axis (Z-axis) direction by the reflective module 1100. The light of which the path has changed may be incident to the lens module 1200.

The lens module 1200 may include a plurality of lenses through which the light of which the traveling direction changes by the reflective module 1100 passes. The lens module 1200 may include a plurality of lens modules (lens barrels) 1210, 1220, and 1230. In the example embodiment, the number of the plurality of lens barrels is three, but the number of lens barrels may be one or more.

Autofocus (AF) and zoom functions may be implemented according to the movement of at least one of the plurality of lens barrels 1210, 1220, and 1230 in the optical axis direction (Z-axis).

In the example embodiment, the entire three lens barrels 1210, 1220, and 1230 may move in the optical axis direction, or the lens barrel 1230 among the lens barrels may be fixed so as not to move in the optical axis direction. Autofocus (AF) and zoom functions may be implemented by the moving lens barrels 1210 and 1220.

The image sensor module 1300 may include an image sensor 1310 converting light passing through a plurality of lenses into an electrical signal and a printed circuit board 1320 on which the image sensor 1310 is mounted. Also, the image sensor module 1300 may include an optical filter 1340 for filtering light incident through the lens module 1200. The optical filter 1340 may be implemented as an infrared cut filter.

In the internal space of the housing 1010, the reflective module 1100 may be disposed in front of the lens module 1200 with respect to the lens module 1200, and the image sensor module 1300 may be disposed in the rear of the lens module 1200.

Also, boards 1320 and 1070, which may be a main board 1070 and a sensor board 1320, may be disposed to supply power to a first driver 1140 of the reflective module 1100, a second driver 1240 of the lens module 1200, and the image sensor 1310 of the image sensor module 1300 or to transmit a control signal to the above components or receive a control signal from the above components, and a single terminal 1325 connected to both the boards 1320 and 1070 may be disposed.

Figure 4A:
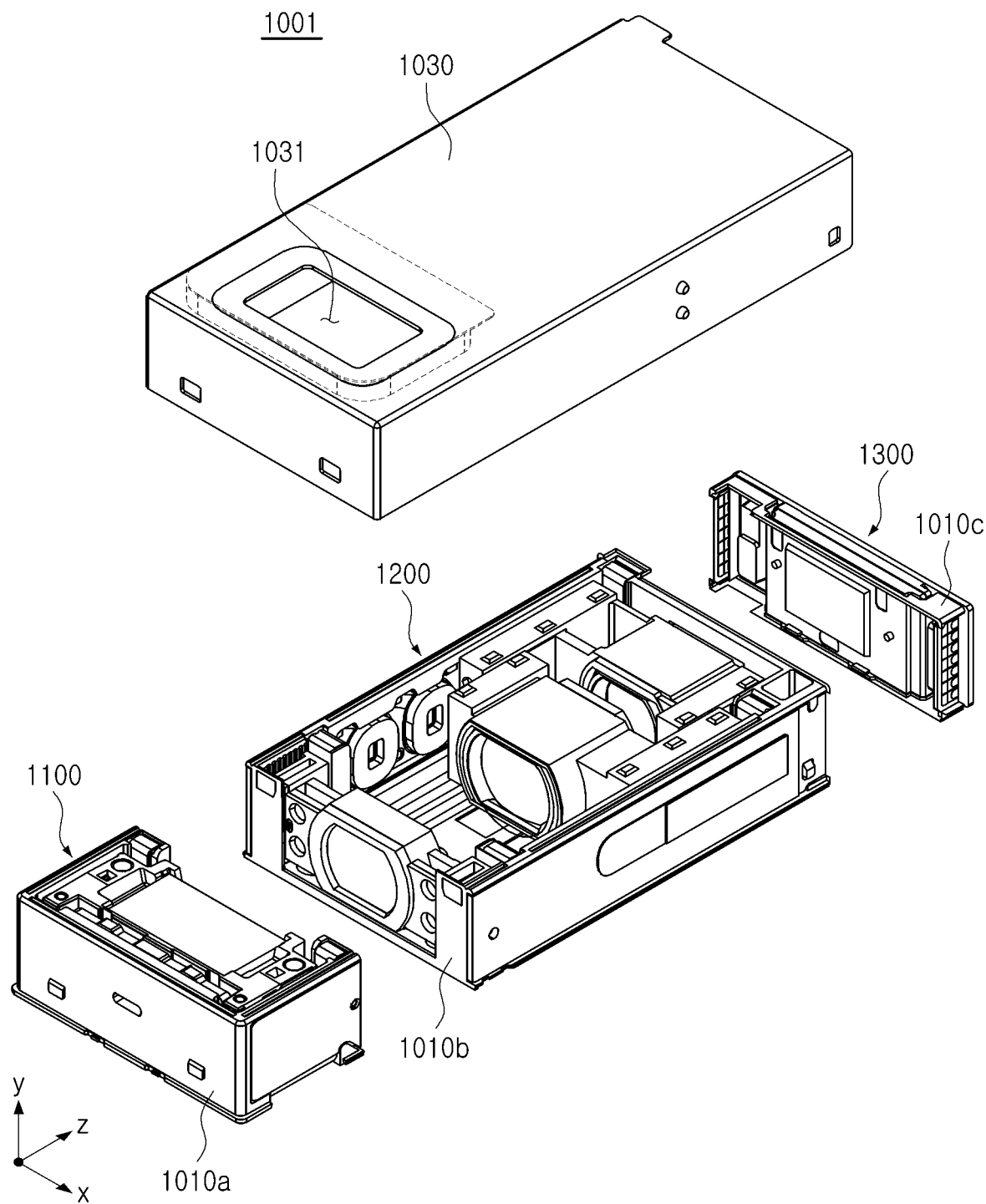
FIGS. 4A and 4B are perspective diagrams illustrating a camera module according to other example embodiments of the present disclosure.

Embodiment 1-2 (FIG. 4A)

The camera module 1000 in the example embodiment may include a structure in which a reflective module 1100, a lens module 1200, and an image sensor module 1300 are provided in a housing 1010, and although not illustrated in the drawings, the camera module 1000 may also include a structure in which a reflective module and a lens module are further included, in addition to the structure illustrated in the drawings.

Figure 4B:
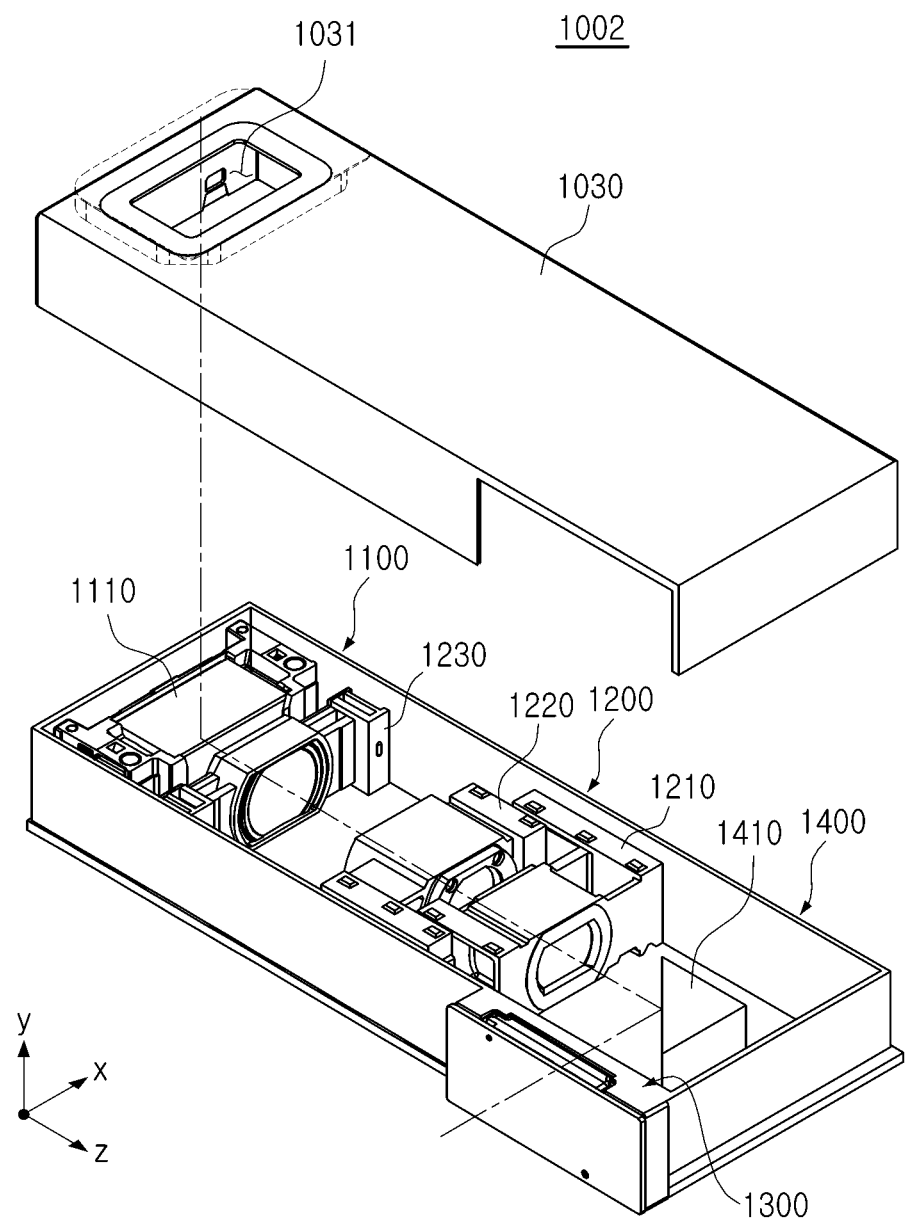
Figure 5:
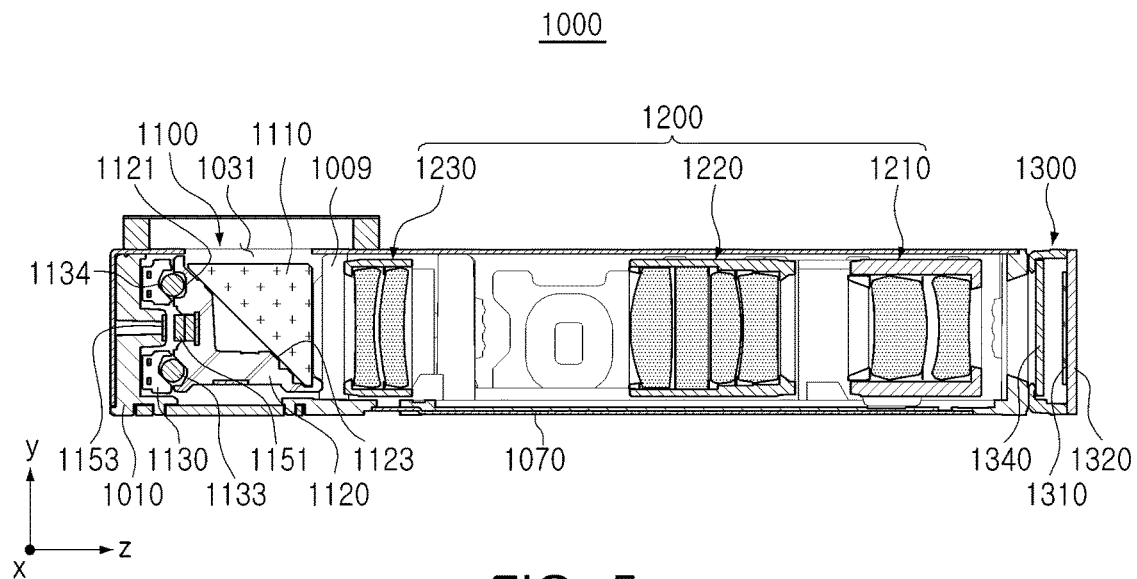
FIG. 5 is a cross-sectional diagram illustrating a camera module according to an example embodiment of the present disclosure, taken from the side.
Figure 6:
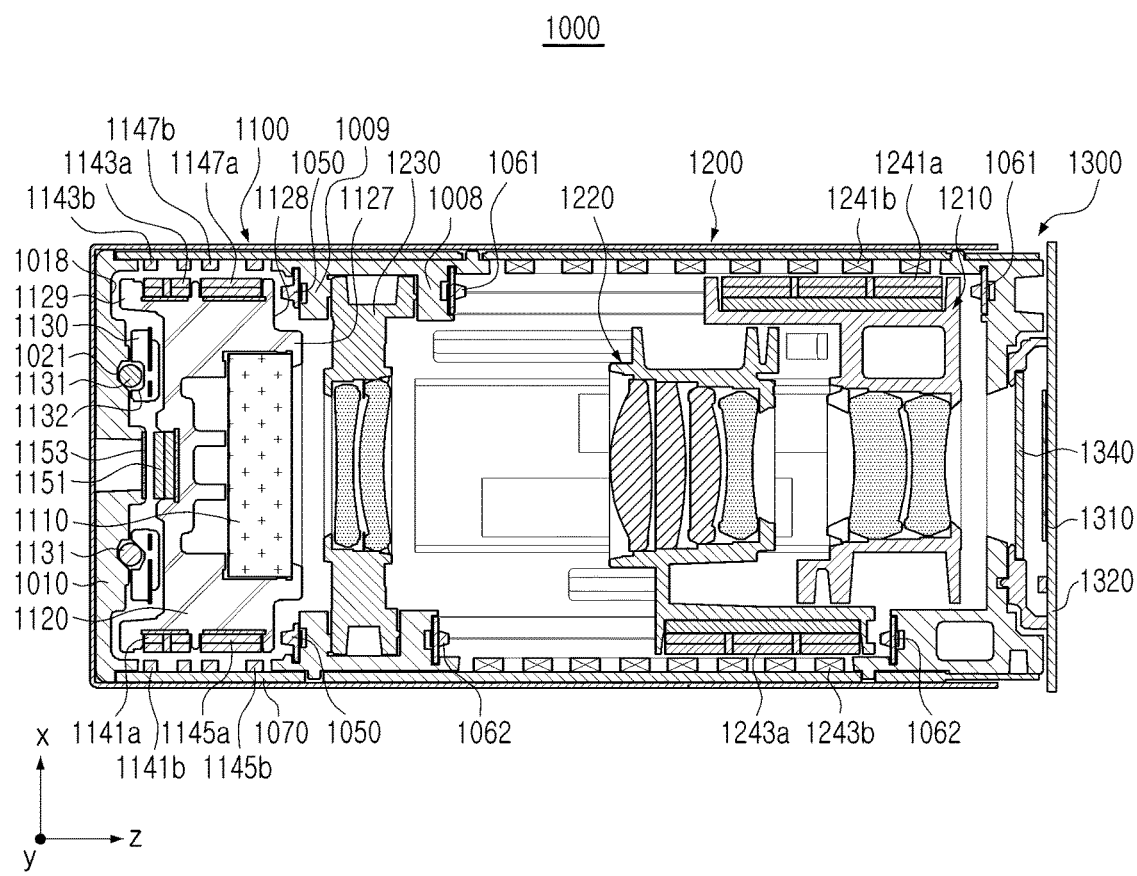
FIG. 6 is a cross-sectional diagram illustrating a camera module according to an example embodiment of the present disclosure, taken from above.
Figure 7:
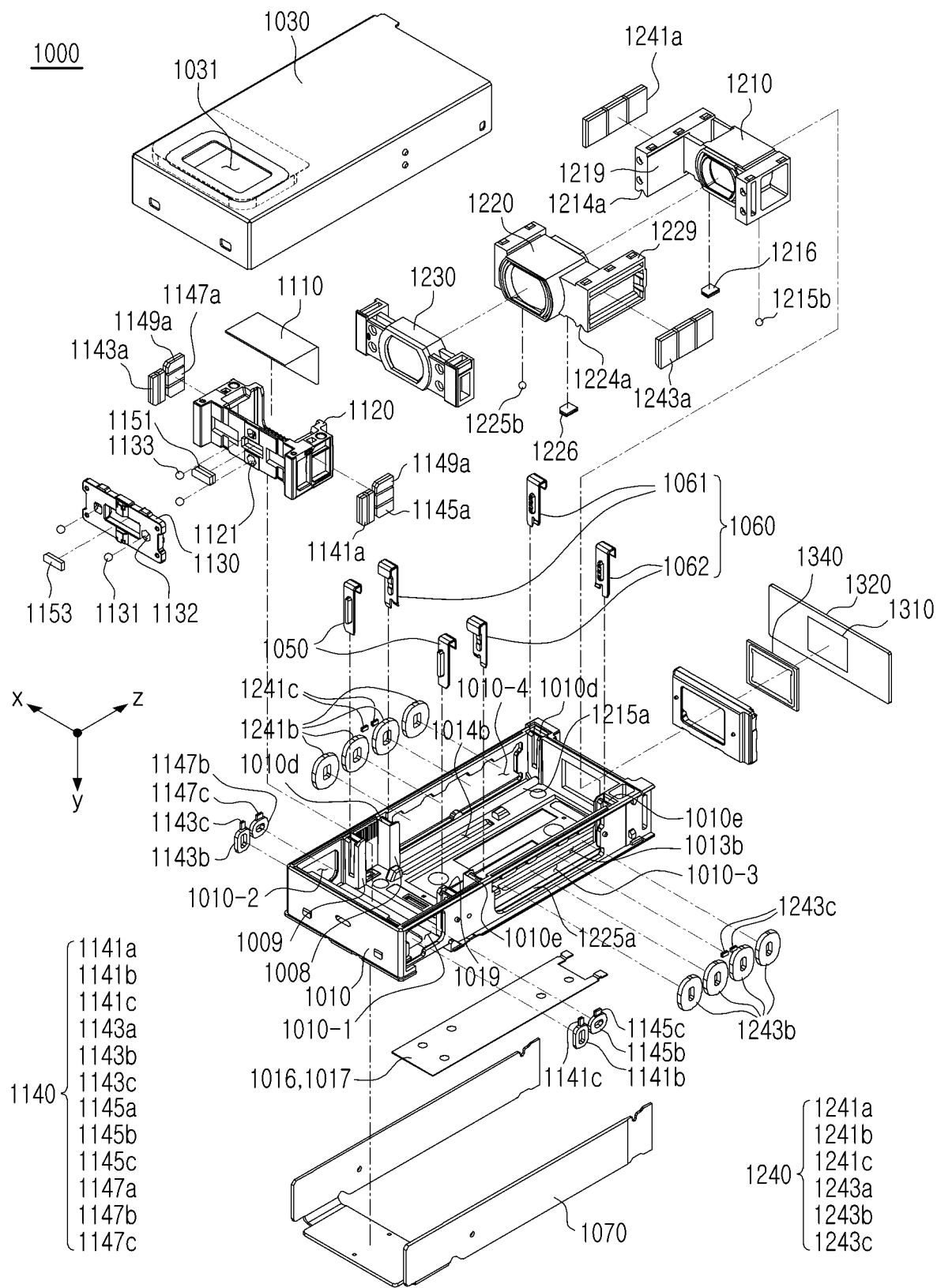
FIG. 7 is an exploded perspective diagram illustrating a camera module according to an example embodiment of the present disclosure.
Figure 8:
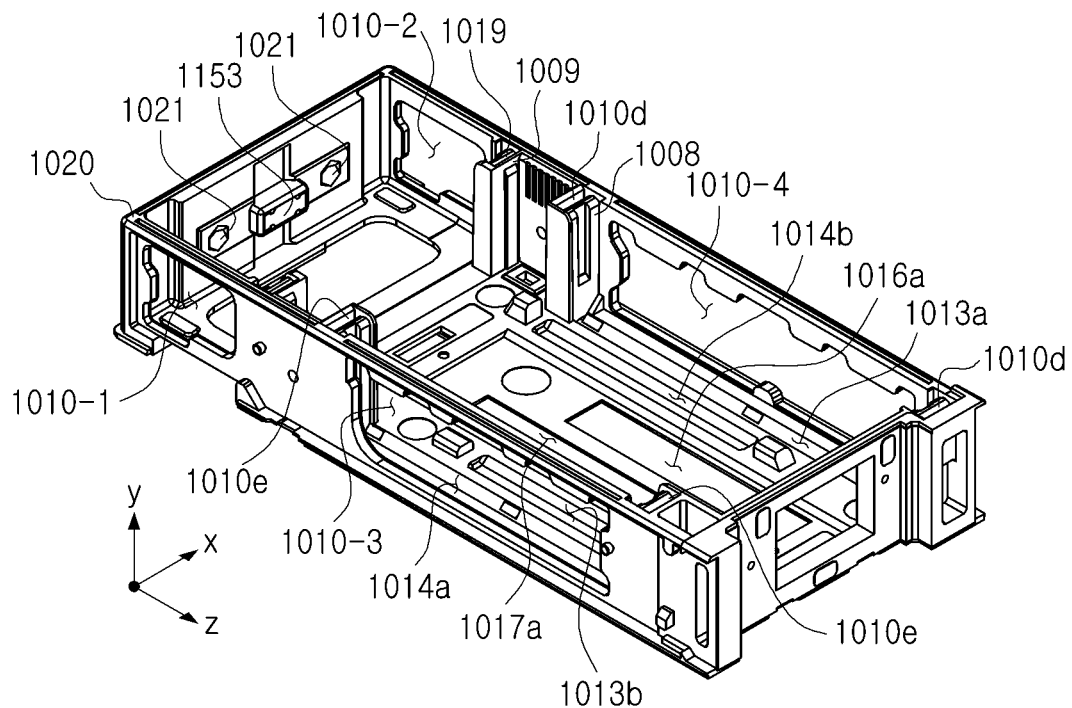
FIG. 8 is a perspective diagram illustrating a housing of a camera module according to an example embodiment of the present disclosure.

FIGS. 4A and 4B are perspective diagrams illustrating a camera module according to other example embodiments.

Referring to FIG. 4A, a camera module 1001 in another example embodiment may have the same structure as that of the camera module 1000 in the aforementioned example embodiment, and a housing may be divided for each module.

Hereinafter, different reference numbers (e.g., "1001" in this description, "1002" or "1003" in other embodiments) may be used for each camera module in example embodiments for ease of description, and the different examples are included in the camera module "1000" in the example embodiment.

That is, both the camera modules 1000 and 1001 according to the example embodiment may include a reflective module 1100, a lens module 1200, and an image sensor module 1300, and in the camera module 1000 in the aforementioned example embodiment, the reflective module 1100, the lens module 1200, and the image sensor module 1300 may be disposed in a single housing 1010, or only the image sensor module 1300 may be disposed separately.

However, in the camera module 1001 in another example embodiment, the reflective module 1100 and the lens module 1200 may be disposed in separate housings. That is, the reflective module 1100 may be disposed in a first housing 1010a, and the lens module 1200 may be disposed in a second housing 1010b.

The image sensor module 1300 may be disposed together with the lens module 1200 in the second housing 1010b, or may be separately provided in a third housing 1010c.

Also, the plurality of first to third housings 1010a, 1010b, and 1010c may be aligned in order in the optical axis (Z-axis) direction and may be connected to each other by various methods such as bonding using a mutual adhesive, mechanical bonding of a hook method, or the like.

The cover 1030 may cover the entire upper portions of the plurality of first to third housings 1010a, 1010b, and 1010c integrated with and coupled to each other. Although not illustrated, the cover 1030 may also be divided for each housing or may selectively cover only two housings.

The example embodiment may include both the structures in which the housing 1010 is integrated or the structure in which the plurality of housings 1010a, 1010b, and 1010c divided for each module are provided, and in the description below, the structure in which the housing 1010 is integrated will be described, and the structure in which the housing is divided may be included in the example embodiment although it is not indicated that the housing is divided.

Embodiment 1-3 (FIG. 4B)

Referring to FIG. 4B, a camera module 1002 in another example embodiment may have the same structure as that of the camera module 1000 in the aforementioned example embodiment, and an additional optical path changing member 1410 may be disposed in the housing 1010.

That is, both the camera modules 1000 and 1002 in the example embodiment may include a reflective module 1100, a lens module 1200, and an image sensor module 1300, and in the camera module 1000 in the example embodiment described above, a single reflective module 1100 may be disposed in a single housing 1010.

However, the camera module 1002 in another example embodiment may further include one or more second reflective modules 1400 for changing a path of light in addition to the first reflective module 1100. The OIS function may be disposed in one of the plurality of reflective modules 1100 and 1400, or the reflective modules 1100 and 1400 may be responsible for different portions of the OIS function, respectively, that is, for example, the optical path changing member of the first reflecting module 1100 may be rotationally driven with respect to a first axis perpendicular to the optical axis, and the optical path changing member of the second reflecting module 1400 may be rotationally driven with respect to a second axis perpendicular to both the optical axis and the first axis.

The light incident to the camera module 1002 may be incident to the image sensor module 1300 after the light path is changed at least twice in the first reflective module 1100 and the second reflective module 1400.

(FIGS. 5 to 58)—Description of Camera Module (FIGS. 5 to 15) Reflective Module Referring to FIGS. 5 to 15, the camera module 1000 in an example embodiment may include a reflective module 1100, a lens module 1200 and an image sensor module 1300 provided in the housing 1010.

Figure 16:
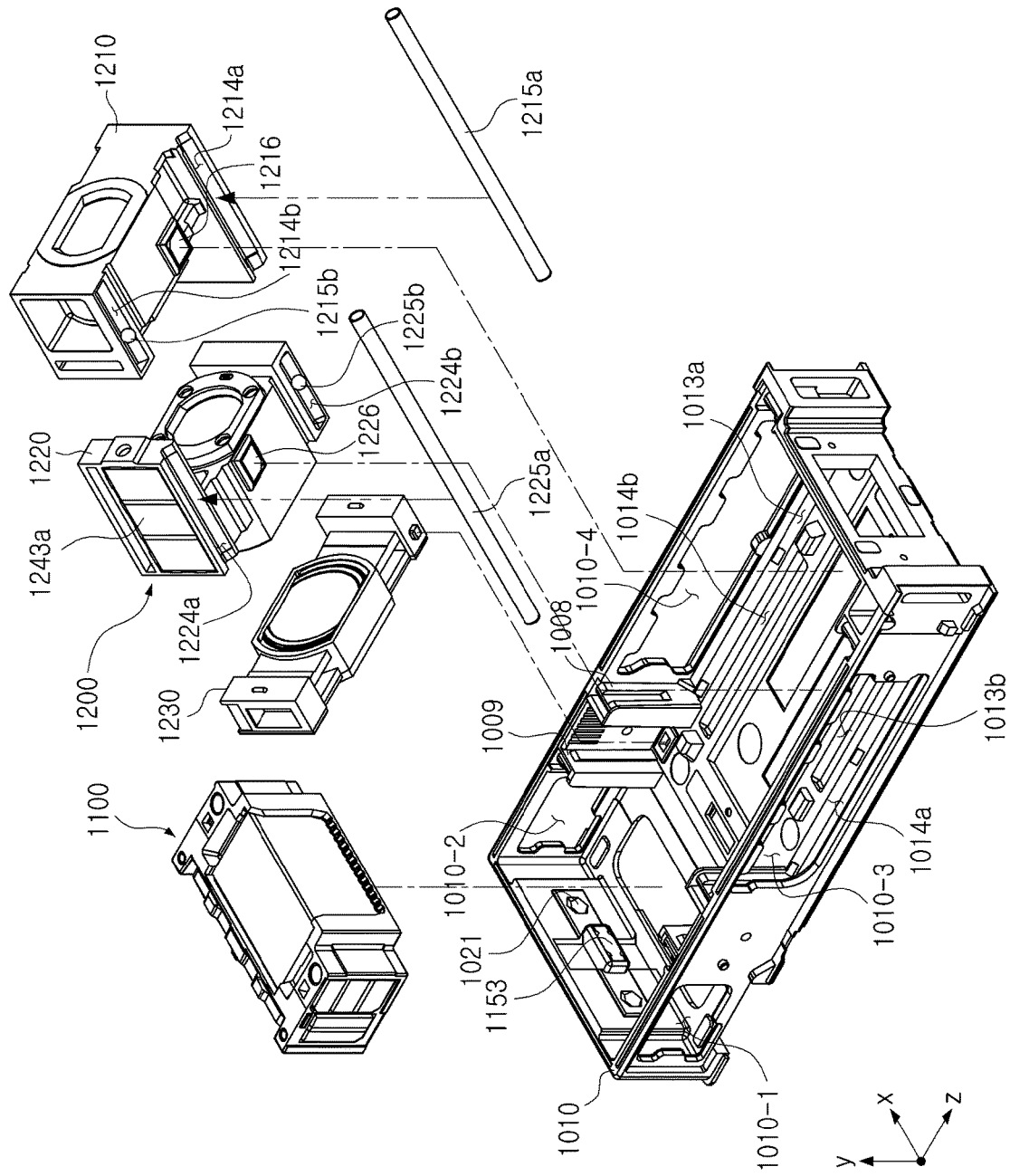
FIG. 16 is an exploded perspective diagram illustrating a housing and a lens barrel according to an example embodiment of the present disclosure.

Hereinafter, the structure of the reflective module 1100 which may change a path of light incident to the camera module and may perform an optical image stabilization function will be described, and the other components will be described with reference to other drawings up to FIG. 16.

In the housing 1010, a reflective module 1100, a lens module 1200, and an image sensor module 1300 may be disposed from one side to the other.

The housing 1010 may have an internal space into which the reflective module 1100, the lens module 1200, and the image sensor module 1300 are inserted.

For example, as illustrated in the drawing, the housing 1010 may be integrated such that both the reflective module 1100 and the lens module 1200 are inserted into the internal space. However, an example embodiment thereof is not limited thereto, and for example, as described above, separate housings in which the reflective module 1100 and the lens module 1200 are disposed, respectively, may be connected to each other.

The housing 1010 may block light by the cover 1030 and may be covered such that the internal space is not visible.

The cover 1030 may have an opening 1031 through which light is incident, and a traveling direction of light incident through the opening 1031 may change by the reflective module 1100 and may be incident to the lens module 1200. The cover 1030 may be integrated to cover the entire housing 1010, or may be divided into separate members covering the reflective module 1100 and the lens module 1200, respectively.

The reflective module 1100 may include an optical path changing member 1110 configured to reflect light. The optical path changing member 1110 may be implemented by a prism, a beam splitter, or a mirror.

Light incident to the lens module 1200 may pass through the plurality of lens groups (three lens barrels 1210, 1220, and 1230) and may be converted into an electrical signal by the image sensor 1310, and the electrical signal may be stored.

The housing 1010 may include a reflective module 1100 and a lens module 1200 in the internal space. The reflective module 1100 may be disposed on the front side of the internal space of the housing 1010, that is, adjacent to the opening through which light is incident, and the lens module 1200 may be disposed in a position adjacent to the image sensor on which light is formed.

The space of the housing 1010 in which the lens module 1200 is provided may be divided by a first protruding wall 1009. The first protruding wall 1009 may be configured to protrude from a side wall of the housing 1010 into the internal space, protruding from both sides.

The reflective module 1100 may include a rotation holder 1120, and the housing 1010 and the rotation holder 1120 opposing the housing 1010 may have a first magnetic material 1151 and a second magnetic material 1153 on opposite surfaces, respectively, and the rotation holder 1120 may be supported by (in close contact with) the housing 1010 by attractive force between the first magnetic material 1151 and the second magnetic material 1153.

Here, the first magnetic material 1151 and the second magnetic material 1153 may be configured as a pulling yoke and a pulling magnet, and for example, the first magnetic material 1151 and the second magnetic material 1153 may be selectively a pulling yoke and a pulling magnet, or both the first magnetic material 1151 and the second magnetic material 1153 may be pulling magnets.

A first ball member 1131, a rotating plate 1130, and a second ball member 1133 may be disposed between an internal wall surface of the housing 1010 and the rotation holder 1120.

The first ball member 1131 and the second ball member 1133 may be partially inserted into and in close contact with guide grooves 1132, 1134, 1021, and 1121, and accordingly, when the rotation holder 1120 and the rotating plate 1130 are inserted into the internal space of the housing 1010, a space may be necessary between the rotation holder 1120 and the first protruding wall 1009, and after the rotation holder 1120 is mounted in the housing 1010, the rotation holder 1120 may be in close contact with an internal wall surface of the housing 1010 by the attractive force of the first magnetic material and the second magnetic material, such that a space may be left between the rotation holder 1120 and the third lens barrel 1230.

Accordingly, in the example embodiment, a damper 1050 inserted into the first protruding wall 1009 of the housing 1010 may be disposed.

The damper 1050 may be inserted into the first protruding wall 1009 of the housing 1010.

Figure 31A:
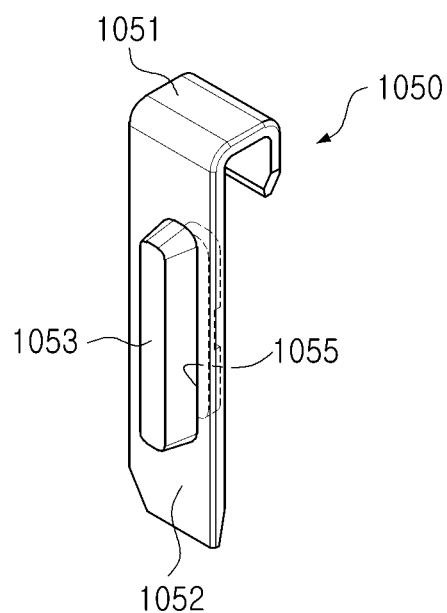
FIG. 31A is a perspective diagram illustrating a damper according to an example embodiment of the present disclosure.

For example, as illustrated in FIG. 31A, the damper 1050 may include a frame 1051 inserted into the first protruding wall 1009 and an extension portion 1052 extending from the frame 1051. The extension portion 1052 may include a damping material 1053 protruding in the direction of the rotation holder 1120 in the optical axis direction.

The damping material 1053 may be inserted into a through-hole 1055 provided in the extension portion 1052 or may be attached to the extension portion 1052 using an adhesive, and as the damping material 1053, any elastic material such as urethane, silicone, epoxy, or poly may be used.

The first protruding wall 1009 of the housing may include an insertion groove 1019 into which the frame 1051 is inserted. The hook-shaped frame 1051 may be inserted from the upper portion of the first protruding wall 1009 to the lower portion, and the hook-shaped frame may be fixed so as not to move by being hooked by the upper portion of the first protruding wall 1009. Also, an adhesive may be applied between the frame 1051 and the housing 1010 and the frame 1051 and the housing 1010 may be bonded to each other.

The damping material 1053 may be disposed to be inserted into the through-hole provided in the extension portion 1052 (the damping material 1053 may be attached to one surface or both surfaces of the extension portion 1052 by bonding using an adhesive), the damping material 1053 may be disposed to protrude from one surface or both surfaces of the extension portion 1052. The damping material 1053 may work as a damper for absorbing impacts of the rotation holder 1120 or a stopper for limiting the moving distance thereof.

The damper 1050 may work as a stopper for controlling the movement of the rotation holder 1120 or a damper for absorbing impacts thereof. A space may be disposed between the damper 1050 and the rotation holder 1120 such that the rotation holder 1120 may rotate smoothly.

The reflective module 1100 may change the path of the light incident through the opening 1031. When an image or video is taken, the image may be blurred or the video may be shaken due to user hand-shake, and in this case, the reflective module 1100 may correct user hand-shake by moving the rotation holder 1120 on which the optical path changing member 1110 is mounted.

For example, when the shaking occurs during taking an image or a video due to user hand-shake, the shaking may be compensated for by providing a relative displacement corresponding to the shaking to the rotation holder 1120.

In the example embodiment, since the OIS function may be implemented by the movement of the rotation holder 1120, which has a relatively light weight because the rotation holder 1120 does not include a lens, power consumption may be reduced.

That is, in the example embodiment, to implement the optical image stabilization (OIS) function, the traveling direction of light may change by moving the rotation holder 1120 including the optical path changing member 1110 without moving the lens barrel including a plurality of lenses or the image sensor, such that light having gone through the optical image stabilization may be incident to the lens module 1200.

The reflective module 1100 may include a rotation holder 1020 supported by the housing 1010 toward the housing 1010, an optical path changing member 1110 mounted on the rotation holder 1020, and a first driver 1140 for moving the rotation holder 1120. A rotating plate 1130 may be disposed between the housing 1010 and the rotation holder 1020.

The optical path changing member 1110 may change the traveling direction of light. For example, the optical path changing member 1110 may be implemented as a mirror, a prism, a splitter, or the like, configured to reflect light (for ease of description, the optical path changing member 1110 is implemented as a prism in the drawing).

The optical path changing member 1110 may be fixed to the rotation holder 1120. The rotation holder 1120 may include a mounting surface 1123 on which the optical path changing member 1110 is mounted.

The mounting surface 1123 of the rotation holder 1120 may be configured as an inclined surface such that the path of light may change. For example, the mounting surface 1123 may be an inclined surface inclined by 30 to 60 degrees with respect to the optical axis (Z-axis) of the plurality of lenses. The inclined surface of the rotation holder 1120 may be directed to the opening 1031 of the cover 1030 through which light is incident.

The rotation holder 1120 on which the optical path changing member 1110 is mounted may be movably accommodated in the internal space of the housing 1010. For example, the rotation holder 1120 may be accommodated in the housing 1010 to be able to rotate with respect to the first axis and the second axis. Here, the first axis and the second axis may be perpendicular to the optical axis (Z-axis), and the first axis and the second axis may be perpendicular to each other. For example, the first axis may be parallel to the X-axis illustrated in the drawing, and the second axis may be parallel to the Y-axis illustrated in the drawing.

The rotation holder 1120 may be supported by the housing 1010 toward the housing 1010 based on a first ball member 1131 aligned with the first axis and a second ball member 1133 aligned with the second axis interposed therebetween, such that the rotation holder 1120 may smoothly rotate about the first axis and the second axis.

In the drawings, as an example, two first ball members 1131 aligned with the first axis and two second ball members 1133 aligned with the second axis may be disposed. The rotational movement may be performed with respect to the first axis and the second axis by the first driver 1140.

Also, the first ball member 1131 and the second ball member 1133 may be provided on the front and rear surfaces of the rotating plate 1130, respectively. Alternatively, positions of the first ball member 1131 and the second ball member 1133 may be switched on the front and rear surfaces of the rotating plate 1130, that is, the first ball member 1131 may be aligned with the second axis, and the second ball member 1133 may be aligned with the first axis. Hereinafter, the structure illustrated in the drawings will be described for ease of description. The rotating plate 1130 may be disposed between the rotation holder 1120 and the internal side surface of the housing 1010.

By attractive force of the first magnetic material 1151 provided in the rotation holder 1120 and the second magnetic material 1153 provided in the housing 1010, the rotation holder 1120 may be supported by the housing 1010 through the rotating plate 1130.

The rotation holder 1120 in the example embodiment may include a first extension portion 1129 of which both sides may extend in the direction of the surface supported by the housing 1010. The rotating plate 1130 may be disposed between the first extension portions 1129 provided on both sides. Also, the housing 1010 may include an inlet portion 1018 recessed in the optical axis (Z-axis) direction on the internal surface of the housing 1010 such that a space in which the first extension portion 1129 may easily move may be secured.

By including this structure, the space in which the two magnets, 1-1 magnets 1141*a* and 1143*a* and 1-2 magnets 1145*a* and 1147*a*, disposed side by side on the side surface of the rotation holder 1120, may be easily provided may be secured, and by configuring the rotation holder 1120 and the rotating plate 1130 to partially overlap each other in the optical axis (Z-axis) direction, the space in which the length of the zoom driver may be sufficiently lengthened may be secured.

Also, the rotation holder 1120 in the example embodiment may include a recess portion 1128 in the direction toward the image sensor in which the optical path changing member 1110 is mounted to reduce the space occupied in the optical axis (Z-axis) direction, and may include a second extension portion 1127 protruding toward the image sensor in the optical axis (Z-axis) direction while the optical path changing member 1110 is mounted in a portion other than the recess portion 1128.

The recess portion 1128 may oppose the first protruding wall 1009 of the housing 1010 in the optical axis (Z-axis) direction, and a portion the second extension portion 1127 may be disposed in the same position as the first protruding wall 1009 in the optical axis (Z-axis) direction (that is, the second extension portion 1127 and the first protruding wall 1009 may be disposed to overlap each other in the X-axis direction), or may be disposed adjacent to the first protruding wall 1009.

The second extension portion 1127 may be configured to have a size smaller than a distance between ends of the first protruding walls 1009 taken in the X-axis direction on both sides in the housing 1010. That is, the width of the second extension portion 1127 in the X direction may be smaller than the distance between the ends of the first protruding wall 1009 on both sides such that the extension portion 1127 may be disposed between the ends.

As described above, by including the recess portion 1128 on both sides of the rotation holder 1120, the rotation holder 1120 may be disposed to substantially occupy a minimum space in the optical axis direction, and since the rotation holder 1120 may be disposed in the same position as the first protruding wall 1009 or may be disposed adjacent to the first protruding wall 1009 in the optical axis (Z-axis) direction, the space in which the length of the zoom driver may be lengthened sufficiently may be obtained.

Guide grooves 1132 and 1134 may be disposed on the front and rear surfaces of the rotating plate 1130 such that the first ball member 1131 and the second ball member 1133 may be inserted into the guide grooves, and the guide grooves 1132 and 1134 may include a first guide groove 1132 into which the first ball member 1131 is partially inserted and a second guide groove 1134 into which the second ball member 1133 is partially inserted.

Also, the housing 1010 may include a third guide groove 1021 into which the first ball member 1131 is partially inserted, and the rotation holder 1120 may include a fourth guide groove 1121 into which the second ball member 1133 is partially inserted.

The first guide groove 1132, the second guide groove 1134, the third guide groove 1021, and the fourth guide groove 1121 described above may have a hemispherical or polygonal (polyhedral or polygonal pyramid) groove shape such that the first ball member 1131 and the second ball member 1133 may easily rotate.

The first ball member 1131 and the second ball member 1133 may work as a bearing while rolling or sliding in the first guide groove 1132, the second guide groove 1134, the third guide groove 1021, and the fourth guide groove 1121.

Figure 13:
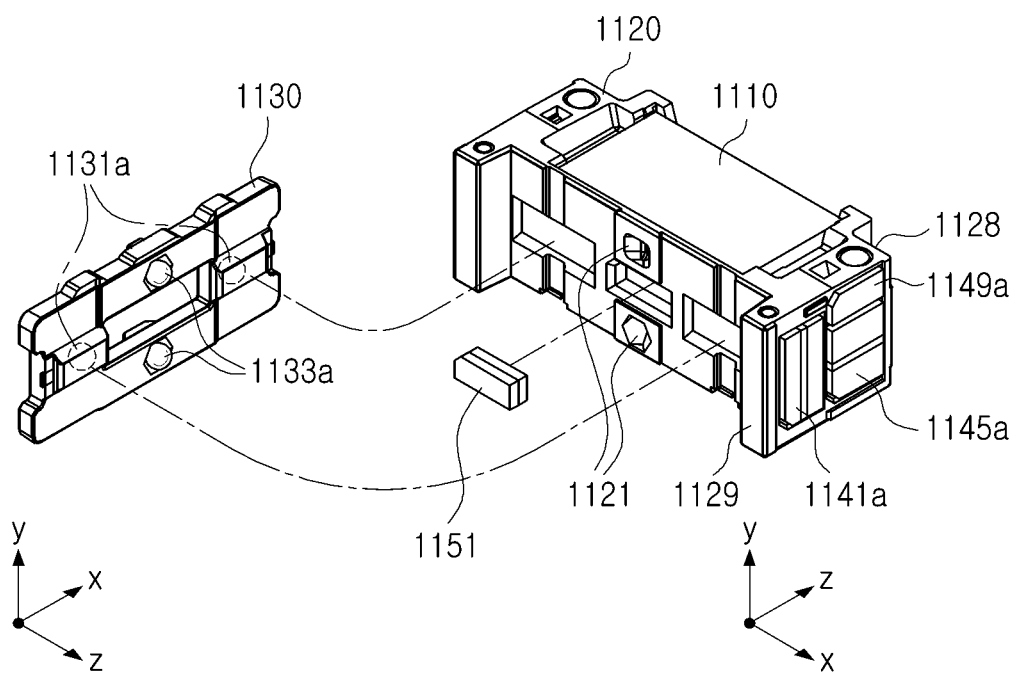
FIG. 13 is an exploded perspective diagram illustrating a rotating plate and a rotation holder of a camera module according to another example embodiment of the present disclosure.
Figure 14:
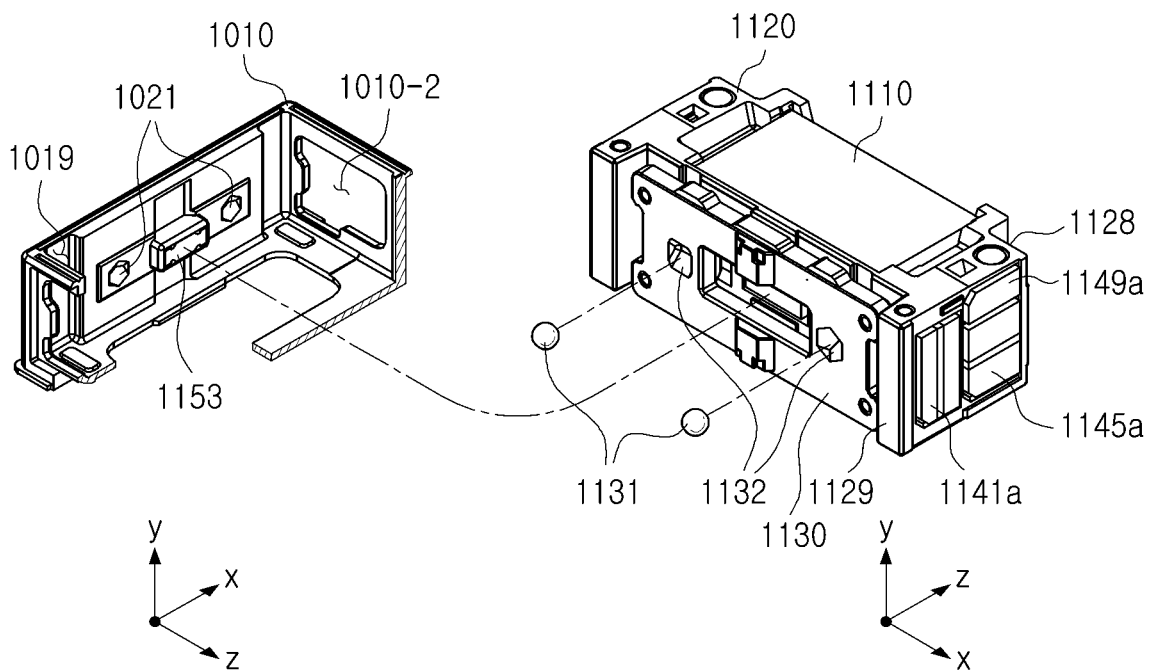
FIG. 14 is an exploded perspective diagram illustrating a housing and a rotation holder of a camera module according to an example embodiment of the present disclosure.
Figure 15:
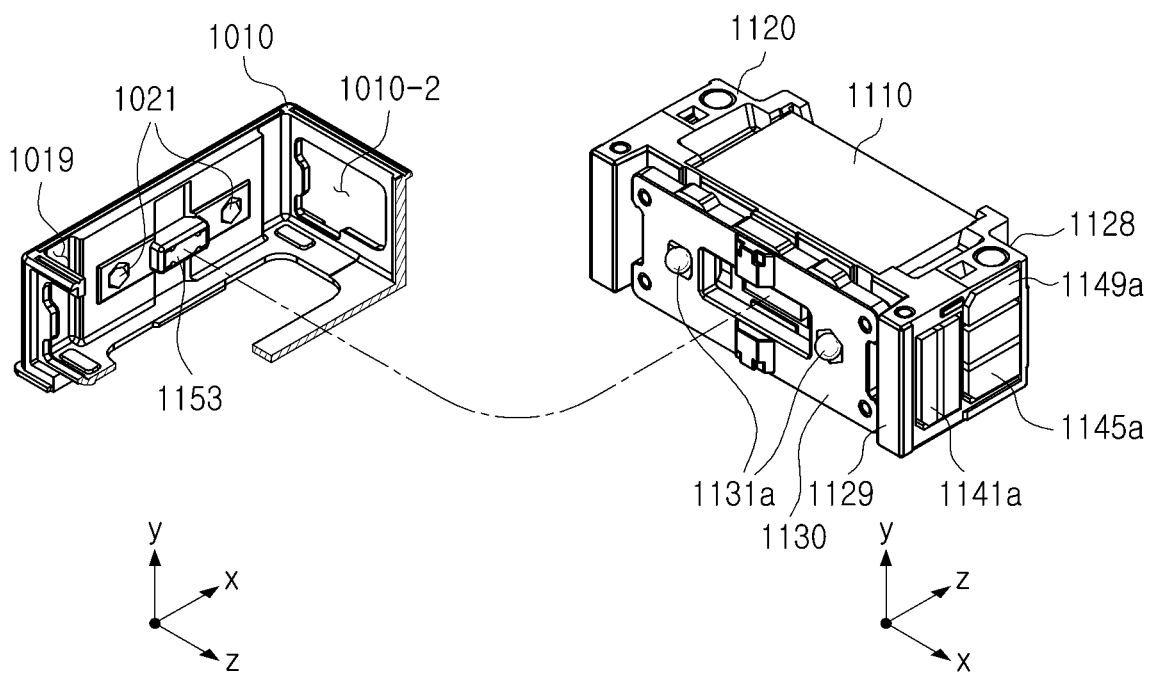
FIG. 15 is an exploded perspective diagram illustrating a housing and a rotation holder of a camera module according to another example embodiment of the present disclosure.

As illustrated in FIGS. 13 and 15, the first ball member 1131*a* and the second ball member 1133*a* may be fixed to both surfaces of the rotating plate 1130 or one surface of the housing 1010 and the rotation holder 1120, respectively.

The first driver 1140 may generate driving force such that the rotation holder 1120 may rotate with respect to two axes.

For example, the first driver 1140 may include a plurality of magnets 1141*a*, 1143*a*, 1145*a*, and 1147*a* and a plurality of coils 1141*b*, 1143*b*, 1145*b*, and 1147*b* disposed to oppose the plurality of magnets 1141*a*, 1143*a*, 1145*a*, and 1147*a*.

The plurality of magnets 1141*a*, 1143*a*, 1145*a*, and 1147*a* may be disposed separately on both side surfaces of the rotation holder 1120, that is, on a surface parallel to the YZ plane. As described above, since the plurality of magnets 1141*a*, 1143*a*, 1145*a*, and 1147*a* and the plurality of coils 1141*b*, 1143*b*, 1145*b*, 1147*b* may be disposed on the side surfaces of the rotation holder 1120 and the opposite surfaces thereof, and may not be disposed on the bottom of the housing 1010 or on the upper surface side, the overall thickness (the length in the Y-axis direction) of the camera module 1000 may be reduced, and further, the camera module 1000 may be easily installed despite a thin thickness of the mobile device 1.

Also, the second driver 1240 including a plurality of magnets 1241*a* and 1243*a* and a plurality of coils 1241*b* and 1243*b* may also be disposed on the side surface of the housing 1010, which may contribute to reducing the overall thickness (the length in the Y-axis direction) of the camera module 1000.

As illustrated in FIG. 1, the camera module 1000 may be disposed such that the bottom surface of the housing 1010 may be directed in the direction of a display (screen) of the mobile device 1, as in the example embodiment. When the first driver 1140 or the second driver 1240 is disposed on the side surface of the housing 1010, the magnetic flux leakage occurring in the direction of the display (screen) may be greatly prevented, thereby affecting the function of the mobile device 1 less.

Among the plurality of magnets, each of the 1-1 magnets 1141*a* and 1143*a* and the 1-2 magnets 1145*a* and 1147*a* may be disposed in parallel on one side of the rotation holder 1120. The 1-1 magnets 1141*a* and 1143*a* and the 1-2 magnets 1145*a* and 1147*a* may be magnetized such that surfaces opposite to the coil may have N and S poles in a direction perpendicular to each other, and for example, the 1-1 magnets 1141*a* and 1143*a* may be magnetized to have N and S poles along the optical axis (Z-axis direction), and the 1-2 magnets 1145*a* and 1147*a* may be magnetized to have N and S poles in the Y-axis direction perpendicular to the optical axis.

When power is applied to the plurality of coils 1141*b*, 1143*b*, 1145*b*, and 1147*b*, the rotation holder 1120 on which the plurality of magnets 1141*a*, 1143*a*, 1145*a*, and 1147*a* are mounted may rotate with respect to the first axis (X-axis) and the second axis (Y-axis) by electromagnetic influence between the plurality of magnets 1141*a*, 1143*a*, 1145*a*, and 1147*a* and the plurality of coils 1141*b*, 1143*b*, 1145*b*, and 1147*b*.

A plurality of coils 1141*b*, 1143*b*, 1145*b*, and 1147*b* may be mounted on the housing 1010. For example, the plurality of coils 1141*b*, 1143*b*, 1145*b*, and 1147*b* may be mounted on the housing 1010 while being mounted on the main board 1070. That is, the plurality of coils 1141*b*, 1143*b*, 1145*b*, and 1147*b* may be disposed on the main board 1070, the main board 1070 may be attached to an external surface of the housing 1010, and the plurality of coils 1141*b*, 1143*b*, 1145*b*, and 1147*b* may be exposed into the housing 1010 through through-holes 1010-1 and 1010-2 and may oppose the plurality of magnets 1141*a*, 1143*a*, 1145*a*, and 1147*a*.

In the drawing, the main board 1070 may be provided in an integrated form such that both the coil for the reflective module 1100 and the coil for the lens module 1200 may be mounted, but the main board 1070 may be configured to be divided into two or more boards such that the coil for the reflective module 1100 and the coil for the lens module 1200 may be mounted therein, respectively.

Figure 11A:
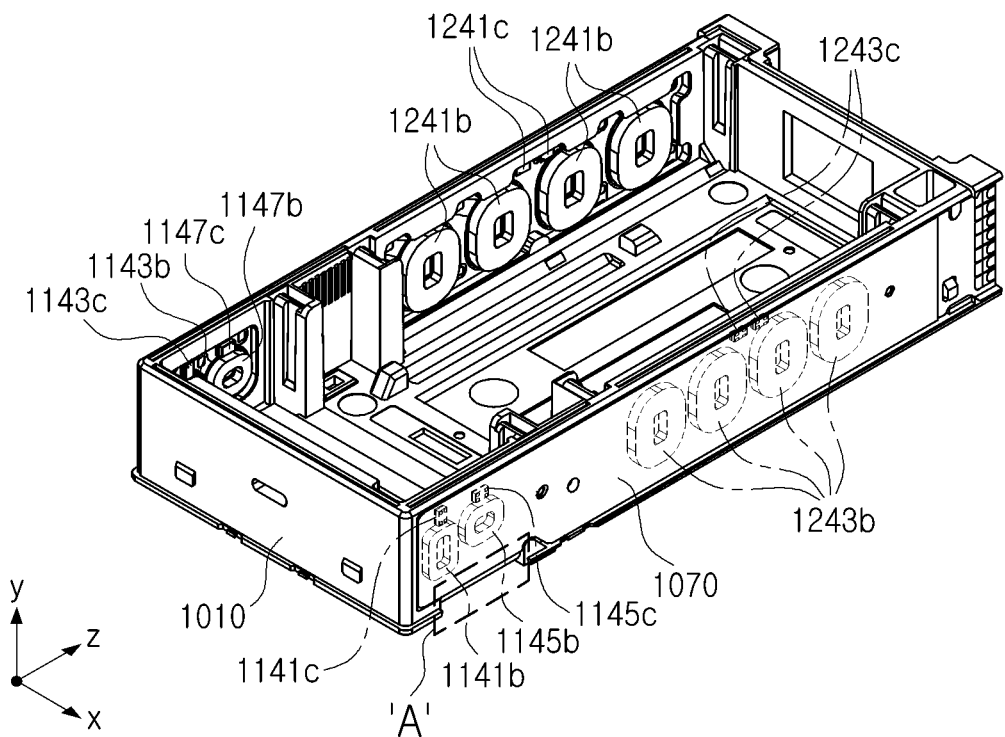
FIG. 11A is a perspective diagram illustrating a camera module in which a main board on which a driving coil and a position sensor are mounted is coupled to a housing according to an example embodiment of the present disclosure.

As illustrated in FIG. 11A, the main board 1070 may be attached to the external surface of the housing 1010 by bonding using an adhesive while the plurality of coils 1141*b*, 1143*b*, 1145*b*, and 1147*b* are mounted thereon. Also, due to the structural configuration such as portion "A" in FIG. 11A, the main board 1070 may have a bent portion to enclose the side surface and the bottom surface of the housing 1010 by including the side board 1070a and the bottom board 1070b, and as for the bent portion of the board as above, the both bent portions to which an adhesive is applied may be lifted in a bonding process using an adhesive.

Figure 11B:
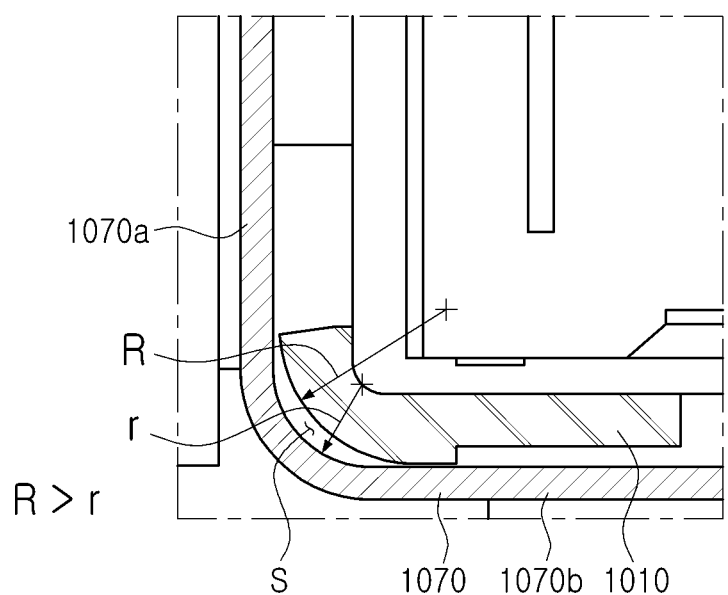
FIG. 11B is a perspective diagram illustrating a camera module in which a main board is coupled to a reflective module according to an example embodiment of the present disclosure.
Figure 12:
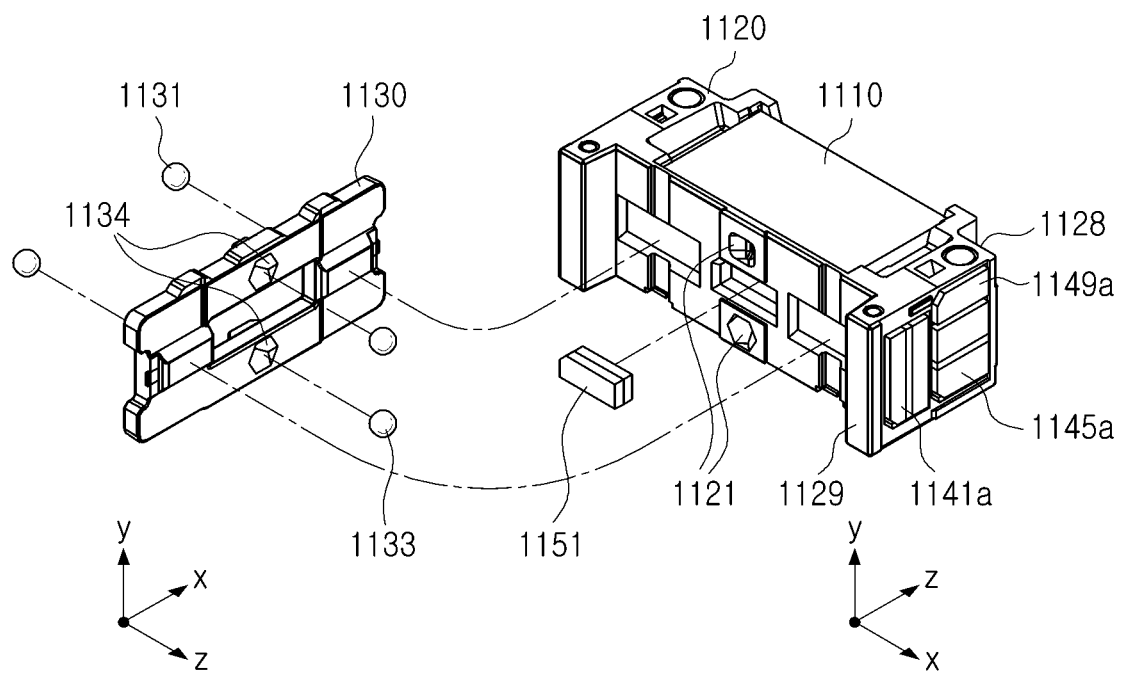
FIG. 12 is an exploded perspective diagram illustrating a rotating plate and a rotation holder of a camera module according to an example embodiment of the present disclosure.

Accordingly, as illustrated in FIG. 11B, a space portion S may be disposed between the external surface of a bent portion of the housing 1010 to which the board 1070 is attached and the bent portion of the board 1070. The space portion S may be intentionally formed by configuring the radius of curvature r of the bent portion of the board 1070 to be smaller than the radius of curvature R of the external surface of the bent portion of the housing 1010.

In the example embodiment, when the rotation holder 1120 rotates, a closed-loop control method of sensing and providing feedback of the position of the rotation holder 1120 and the feedback may be used.

Therefore, position sensors 1141c, 1143c, 1145c, and 1147c may be used for closed-loop control. The position sensors 1141c, 1143c, 1145c, and 1147c may be configured as Hall sensors, TMR sensors, magnetic sensors, or the like.

The position sensors 1141c, 1143c, 1145c, and 1147c may be disposed in or in an external region of each coil 1141b and 1143b, and may be mounted together on the main board 1070 on which each coil 1141b and 1143b is mounted.

The position sensor 1141c, 1143c, 1145c, and 1147c may interact with one of the 1-1 magnets 1141a and 1143a and the 1-2 magnets 1145a and 1147a, or the entire 1-1 magnets 1141a and 1143a and the 1-2 magnets 1145a and 1147a, which may be driving magnets, or may interact with the sensing magnet 1149a provided separately.

The main board 1070 may include a gyro sensor (not illustrated) for detecting a shaking factor such as user hand-shake, and may include a driving circuit device (driver IC, not illustrated) for providing a driving signal to the plurality of coils 1141b, 1143b, 1145b, and 1147b.

When the rotation holder 1120 rotates about the first axis (X-axis), the rotating plate 1130 may rotate on the first ball member 1131 arranged on the first axis (X-axis) (in this case, the rotation holder 1120 may not move relative to the rotating plate 1130).

Also, when the rotation holder 1120 rotates with respect to the second axis (Y-axis), the rotation holder 1120 may rotate on the second ball member 1133 arranged on the second axis (Y-axis) (in this case, since the rotating plate 1130 does not rotate, the rotation holder 1120 may move relative to the rotating plate 1130).

That is, when rotating about the first axis (X-axis), the first ball member 1131 may be applied, and when rotating about the second axis (Y-axis), the second ball member 1133 may be applied.

That is because, as illustrated in the drawings, when rotating about the first axis (X-axis), the second ball member 1133 aligned with respect to the second axis (Y-axis) may be inserted into the guide groove and may not move, and when rotating about the second axis (Y-axis), the first ball member 1131 aligned with the first axis (X-axis) may be inserted into the guide groove and may not move.

The reflective module 1100 in the example embodiment will be described based on the structure in which the rotation holder 1120 provided with the optical path changing member 1110 may rotate while being supported by the ball members 1131 and 1133 arranged in one direction on one surface of the housing 1010, but an example embodiment thereof is not limited thereto. The rotation holder 1120, in the example embodiment, 1) may rotate by hanging from the housing via a spring, 2) may be fixed to the housing to be rotatable by means of a hinge-type rotating member, 3) may be provided to the housing to pivotally rotate with respect to a single axis, or 4) may rotate by being supported by the housing by means of a ball member sliding or rotating along a curved ball guide.

(FIGS. 9 and 10) OIS, Autofocusing, Zoom

Figure 9:
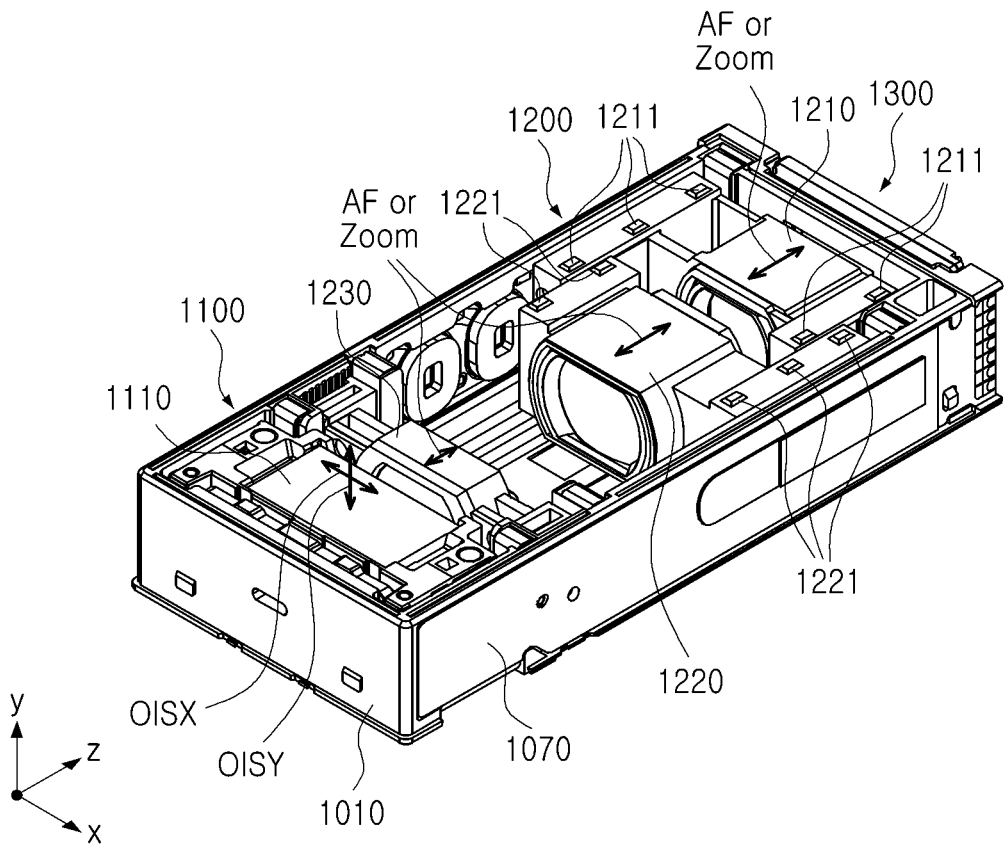
FIG. 9 is a perspective diagram illustrating a camera module in which a reflective module and a lens module are coupled to a housing according to an example embodiment of the present disclosure.
Figure 10:
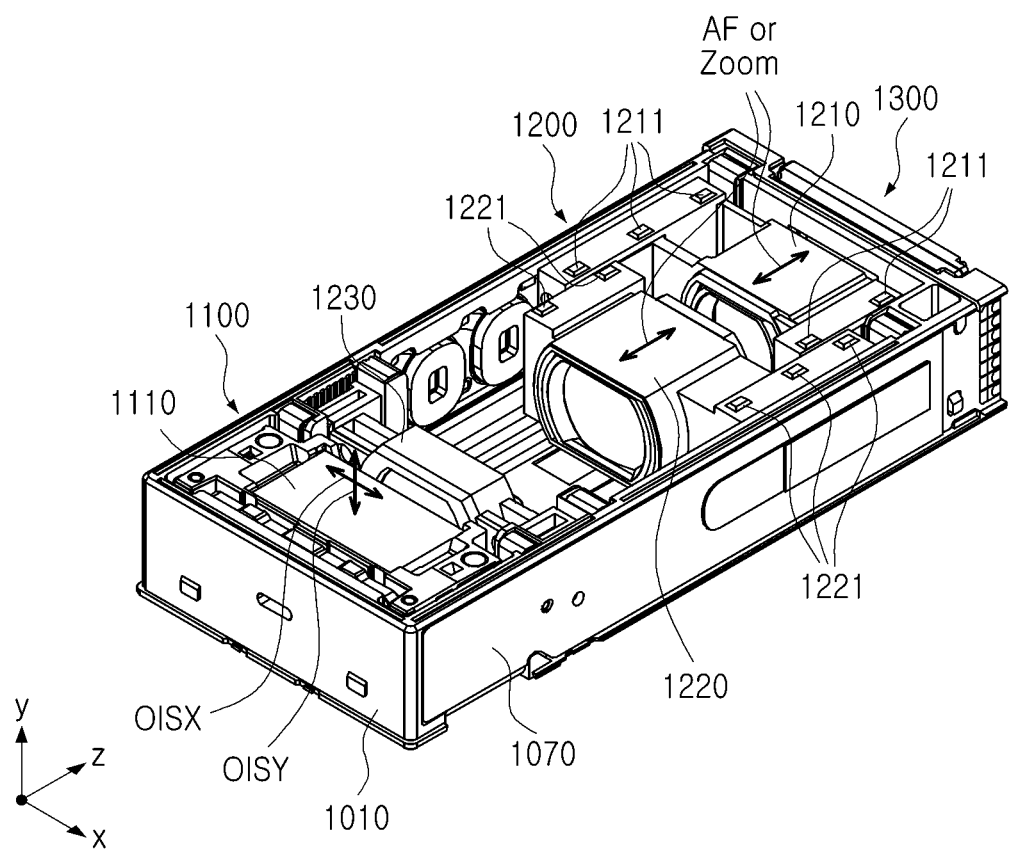
FIG. 10 is a perspective diagram illustrating a camera module in which a reflective module and a lens module are coupled to a housing according to another example embodiment of the present disclosure.

FIG. 9 is a perspective diagram illustrating a camera module in which a reflective module and a lens module are coupled to a housing according to an example embodiment. FIG. 10 is a perspective diagram illustrating a camera module in which a reflective module and a lens module are coupled to a housing according to another example embodiment.

Embodiment 2-1 (FIG. 9)

The implementation of AF, zoom, and OIS functions in the camera module 1000 in an example embodiment will be described with reference to FIGS. 9 and 10.

Light, of which the path may be changed in the reflective module 1100, may be incident to the lens module 1200. An autofocusing (AF) or zoom (Zoom) function may be implemented on the incident light by moving the three lens barrels 1210, 1220, and 1230 provided in the lens module 1200 in the optical axis direction (Z-axis).

Referring to the example embodiment illustrated in FIG. 9, for example, the rear two lens barrels 1210 and 1220 may be responsible for a zoom function, and the front lens barrel 1230 may be responsible for the autofocusing function. However, an example embodiment thereof is not limited thereto, and the three lens barrels 1210, 1220, and 1230 may be responsible for the zoom function and the autofocusing function in a divided or overlapping manner by various combinations.

Embodiment 2-2 (FIG. 10)

Various modified controls may be performed in addition to the aforementioned example embodiment. For example, referring to the example embodiment illustrated in FIG. 10, the two rear lens barrels 1210 and 1220 may perform a zoom function or an autofocusing function in a divided or overlapping manner, that is, for example, the two lens barrels 1210 and 1220 may perform a zoom function in combination, and the rearmost lens barrel 1210 may perform an autofocusing function, and the front lens barrel 1230 may maintain the state of being fixed to the housing 1010.

That is, one of the three lens barrels 1210, 1220, and 1230 may maintain a state of being fixed to the housing 1010, and the other two lens barrels may perform a zoom function or an autofocusing function in a divided or overlapping manner. In this case, for example, in the lens barrel 1230 fixed to the housing 1010, a ball bearing interposed between a driving magnet or a coil opposing thereto and the housing 1010 may not be used for bearing and may be used for a different purpose or may not be necessary.

Also, in the drawings related to the example embodiment, the space in which the front lens barrel 1230 and the two rear lens barrels 1210 and 1220 are disposed may be partitioned by the second protruding wall 1008. However, an example embodiment thereof is not limited thereto, and the entire three lens barrels 1210, 1220, and 1230 may be disposed in the same space or may be disposed in different partitioned spaces.

(FIGS. 16 to 27) Lens Module

Referring to FIGS. 16 to 27, a lens module 1200 according to the example embodiment may implement autofocusing (AF) and zoom functions, and lens barrels 1210 and 1220 may be driven by a second driver 1240.

The lens module 1200 may include two lens barrels, a first lens barrel 1210 and a second lens barrel 1220, provided to be movable in the optical axis (Z-axis) direction in the internal space of the housing 1010. The two lens barrels 1210 and 1220 may move in the optical axis (Z-axis) direction with respect to the housing 1010 by the second driver 1240.

The first and second lens barrels 1210 and 1220 may be configured to move in substantially the optical axis (Z-axis) direction to implement an autofocusing (AF) or zoom function.

Accordingly, the second driver 1240 may generate driving force to move each of the first and second lens barrels 1210 and 1220 in the optical axis (Z-axis) direction. That is, the second driver 1240 may implement an autofocusing (AF) or zoom function by individually moving the first and second lens barrels 1210 and 1220 in the optical axis (Z-axis) direction.

The first and second lens barrels 1210 and 1220 may be disposed to be supported by the bottom surface of the housing 1010. For example, both the first and second lens barrels 1210 and 1220 may be individually supported by the bottom surface of the housing 1010 via a ball member or a shaft.

The first lens barrel 1210 may be provided in the housing 1010 to be movable in the optical axis (Z-axis) direction. For example, a single first shaft 1215a and a single third ball member 1215b may be disposed between the first lens barrel 1210 and the bottom surface of the housing 1010.

The first lens barrel 1210 may move in the optical axis (Z-axis) direction on a first shaft 1215a fixed to one side of the bottom surface of the housing 1010 in the optical axis (Z-axis) direction and a third ball member 1215b disposed to roll in the optical axis (Z-axis) direction on the other of both sides of the bottom surface of the housing 1010.

The first lens barrel 1210 may slide on the first shaft 1215a, and may roll on the third ball member 1215b.

The first shaft 1215a and the third ball member 1215b may be disposed in the first guide grooves 1013a (1-1 guide groove) and 1013b (1-2 guide groove) disposed in the optical axis direction on both sides of the bottom surface of the housing.

The first shaft 1215a may be pressed and supported by a stopper 1060-1061 to be fixed to the 1-1 guide groove 1013a, or may be fixed by bonding using an adhesive. The third ball member 1215b may roll in the 1-2 guide groove 1013b.

The first shaft 1215a and the third ball member 1215b may be accommodated in the first guide grooves 1013a and 1013b and may be disposed between the first lens barrel 1210 and the housing 1010.

The first guide grooves 1013a and 1013b may be elongated in the optical axis (Z-axis) direction. The cross-sectional surfaces of the first guide grooves 1013a and 1013b may have various shapes, such as a rounded shape, a V shape, or a polygonal shape.

Second guide grooves 1214a (2-1 guide groove) and 1214b (2-2 guide groove) into which the first shaft 1215a and the third ball member 1215b are inserted may be disposed on the lower surface of the first lens barrel 1210 opposite to the bottom of the housing 1010. The cross-sectional surfaces of the second guide grooves 1214a and 1214b may have various shapes, such as a rounded shape, a V shape, or a polygonal shape.

In the 2-1 guide groove 1214a, contact protrusions 1215c may be spaced apart from each other and may be disposed in two positions. Two contact protrusions 1215c in contact with the first shaft 1215a may be disposed in each position, and the two contact protrusions 1215c may be spaced apart from each other in the direction perpendicular to the optical axis direction in the 2-1 guide groove 1214a and may be in contact with the first shaft 1215a on both sides.

Since the first shaft 1215a is in contact with only the contact protrusion 1215c, frictional force caused by sliding may be reduced.

Figure 25:
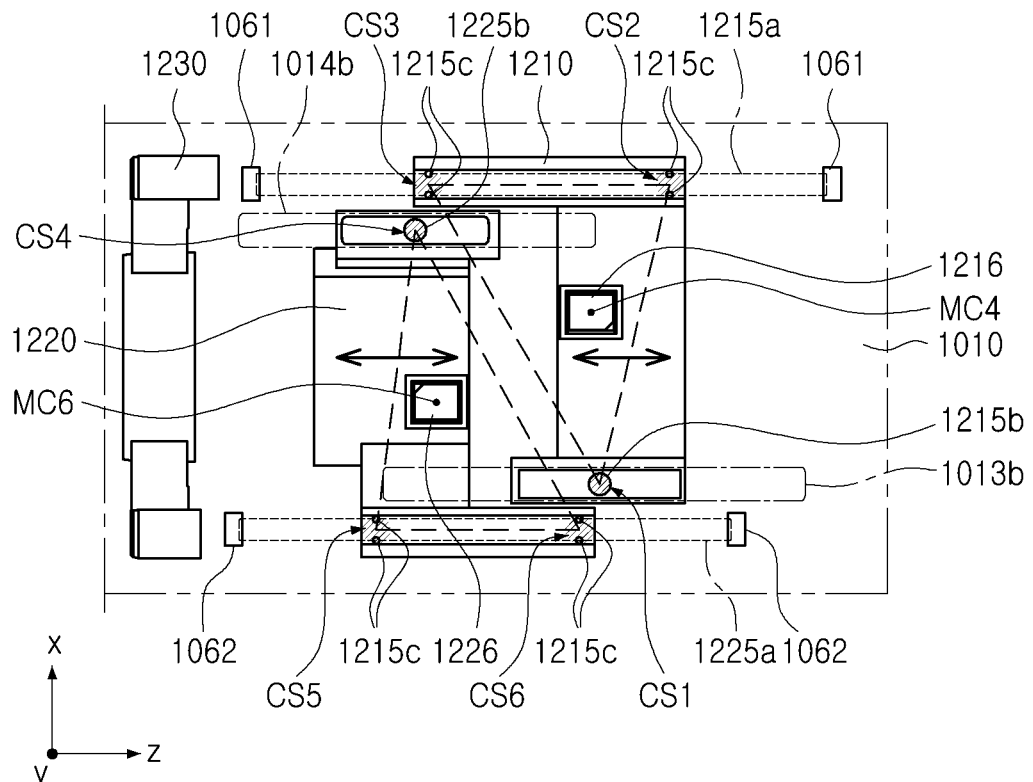
FIG. 25 is a diagram illustrating a shape in which a lens barrel is installed in a housing according to an example embodiment of the present disclosure.

Accordingly, the first lens barrel 1210 may have a three-position support structure by a first contact position CS1 in contact with a single third ball member 1215b, and a second contact position CS2 and a third contact position CS3 spaced apart from each other in the optical axis direction and each having two contact protrusions 1215c in contact with the first shaft 1215a (see FIG. 25).

Here, the first lens barrel 1210 may be pressed toward the bottom of the housing 1010 so as to maintain a state of contact by the housing 1010, the third ball member 1215b, and the first shaft 1215a.

To this end, a third magnetic material 1016 and a fourth magnetic material 1216 may be selectively disposed on the bottom surface of the housing 1010 and the lower surface of the first lens barrel 1210 opposing the bottom surface, and the first lens barrel 1210 may be pressed toward the bottom surface of the housing 1010 by attractive force between the magnetic materials.

Here, the third magnetic material 1016 and the fourth magnetic material 1216 may be configured as a pulling yoke and a pulling magnet, and for example, the third magnetic material 1016 and the fourth magnetic material 1216 may be selectively configured as pulling a pulling yoke and a pulling magnet, or both the third magnetic material 1016 and the fourth magnetic material 1216 may be configured as pulling magnets.

A third magnetic material 1016 may be provided in the optical axis direction along the movement path of the first lens barrel 1210 on the bottom surface of the housing 1010, and the fourth magnetic material 1216 may be disposed below the barrel 1210 to oppose the third magnetic material 1016. The third magnetic material 1016 may be sufficiently elongated in the optical axis direction to continuously oppose the fourth magnetic material 1216 in consideration of the movement path of the first lens barrel 1210.

In the example embodiment, the third magnetic material 1016 may be attached to the external surface of the housing 1010, and may be exposed to the internal space of the housing 1010 through a magnetic hole 1016a provided in the bottom of the housing 1010. Alternatively, the third magnetic material 1016 may be attached to the internal bottom of the housing 1010 or may be inserted into the bottom surface.

In the example embodiment, the first lens barrel 1210 may form the stable three-position support structure in any position when moving in the optical axis direction.

Figure 26:
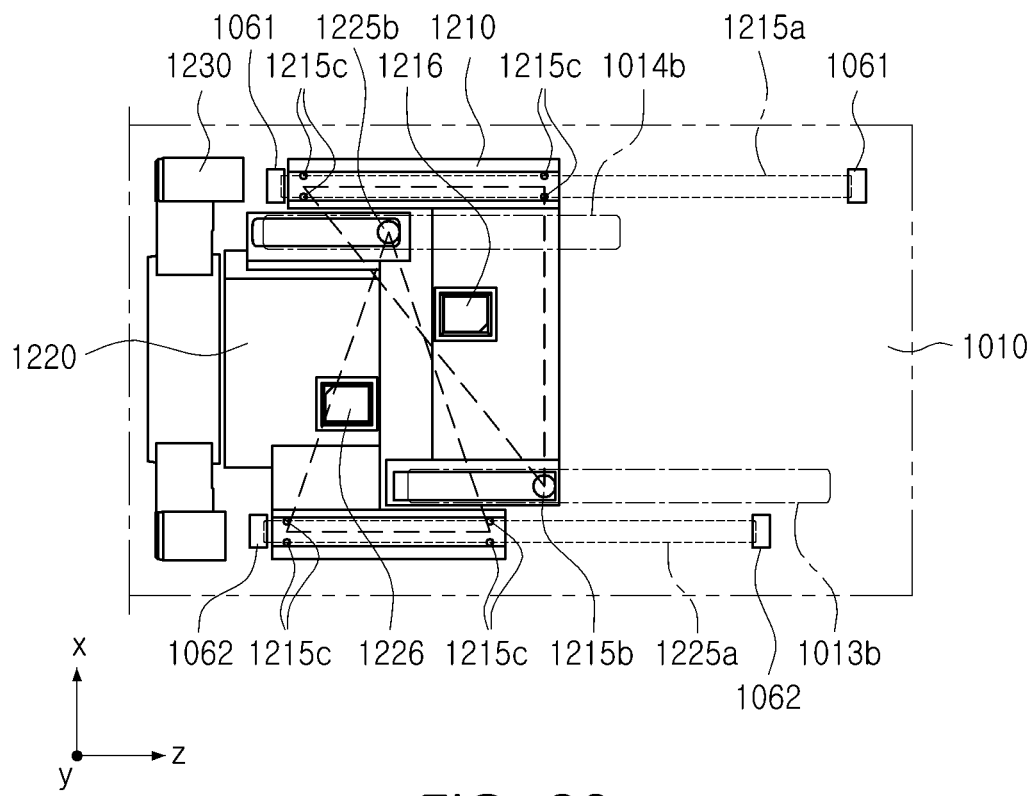
FIG. 26 is a diagram illustrating a shape of when entire lens barrels are moved toward a reflective module according to an example embodiment of the present disclosure.
Figure 27:
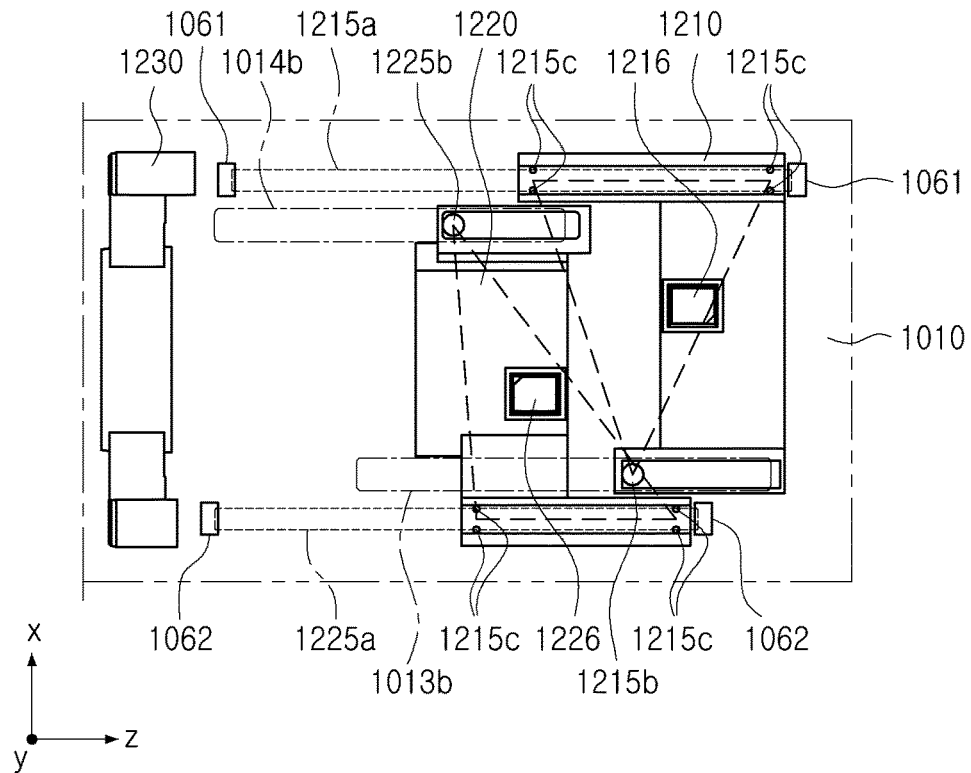
FIG. 27 is a diagram illustrating a shape of when entire lens barrels are moved toward an image sensor module according to an example embodiment of the present disclosure.

That is, as illustrated in FIGS. 25 to 27, the first lens barrel 1210 may move in the optical axis direction (the middle area in FIG. 25, the leftmost area in FIG. 26, and the rightmost area in FIG. 27). In any case, the first lens barrel 1210 may allow a center MC4 of magnetic force of the fourth magnetic material 1216 to be disposed in the triangle formed by the first contact position CS1 in contact with the third ball member 1215*b*, and the two contact positions in contact with the first shaft 1215*a*, the second contact position CS2 and the third contact position CS3.

Here, the center of magnetic force of the fourth magnetic material 1216 may be, for example, the geometric center of the surface on which the fourth magnetic material 1216 opposes the third magnetic material 1016, and in FIG. 25, the geometric center of the fourth magnetic material 1216 may refer to a center of gravity on the X-Z plane of the fourth magnetic material 1216.

The coil 1241*b* for driving the first lens barrel 1210 may be disposed on one side surface of both side surfaces of the housing 1010, and in this case, electromagnetic force may act on one side of the first lens barrel 1210. Accordingly, to easily drive the first lens barrel 1210, the third magnetic material 1016 and the fourth magnetic material 1216 may be provided to be biased toward one side surface from the center of the housing 1010, that is, the side on which the driving coil 1241*b* is disposed.

To improve the driving force, the first lens barrel 1210 may include an extension portion 1219 in which a portion on which the magnet 1241*a* is mounted may extend in the optical axis direction toward the second lens barrel 1220 to increase the size of the magnet 1241*a*.

Further, to improve the driving force, the second lens barrel 1220 may also include an extension portion 1229 in which a portion on which the magnet 1243*a* is mounted may extend in the optical axis direction toward the first lens barrel 1210 to increase the size of the magnet 1243*a*.

The second lens barrel 1220 may be provided in the housing 1010 to be movable in the optical axis (Z-axis) direction. For example, the second lens barrel 1220 may be disposed in front of the first lens barrel 1210 in parallel with the first lens barrel 1210 in the optical axis direction.

The second lens barrel 1220 may be provided in the housing 1010 to be movable in the optical axis (Z-axis) direction. For example, a single second shaft 1225*a* and a single fourth ball member 1225*b* may be disposed between the second lens barrel 1220 and the bottom surface of the housing 1010.

The second lens barrel 1220 may move in the optical axis direction by riding on a second shaft 1225*a* fixed to the other of both sides of the bottom surface of the housing 1010 in the optical axis (Z-axis) direction, and a fourth ball member 1225*b* disposed to roll in the optical axis (Z-axis) direction on one side of the bottom surface of the housing 1010.

That is, the second lens barrel 1220 may slide on the second shaft 1225*a*, and may roll on the fourth ball member 1225*b*.

The second shaft 1225*a* and the fourth ball member 1225*b* may be disposed in the third guide grooves 1014*a* (3-1 guide groove) and 1014*b* (3-2 guide groove) elongated in the optical axis direction on both sides of the bottom surface of the housing.

The second shaft 1225*a* may be pressed and supported by a stopper 1060-1062 so as to be fixed to the 3-1 guide groove 1014*a*, or may be fixed by bonding using an adhesive. The fourth ball member 1225*b* may roll in the 3-2 guide groove 1014*b*.

The second shaft 1225*a* and the fourth ball member 1225*b* may be accommodated in the third guide grooves 1014*a* and 1014*b* and may be disposed between the second lens barrel 1210 and the housing 1010.

The third guide grooves 1014*a* and 1014*b* may be elongated in the optical axis (Z-axis) direction. The cross-sectional surfaces of the third guide grooves 1014*a* and 1014*b* may have various shapes, such as a rounded shape, a V shape, or a polygonal shape.

Fourth guide grooves 1224*a* (4-1 guide groove) and 1224*b* (4-2 guide groove) into which the second shaft 1225*a* and the fourth ball member 1225*b* are inserted may be disposed on the lower surface of the second lens barrel 1220 opposing the bottom of the housing 1010. The cross-sectional surfaces of the fourth guide grooves 1224*a* and 1224*b* may have various shapes, such as a rounded shape, a V shape, or a polygonal shape.

In the 4-1 guide groove 1224*a*, contact protrusions 1225*c* sliding on the second shaft 1225*a* may be spaced apart from each other in the optical axis direction and may be disposed in two positions. Two contact protrusions 1225*c* in contact with the second shaft 1225*a* may be disposed in each position, and the two contact protrusions 1225*c* may be spaced apart from each other in the 4-1 guide groove 1224*a* in a direction perpendicular to the optical axis direction and may be in contact with the second shaft 1225*a* on both sides.

Since the second shaft 1225*a* is in contact with only the contact protrusion 1225*c*, frictional force caused by the sliding movement may be reduced.

Accordingly, the second lens barrel 1220 may form the three-position support structure by a fourth contact position CS4 in contact with a single fourth ball member 1225*b*, and a fifth contact position CS5 and a sixth contact position CS6 spaced apart from each other in the optical axis direction and each having two contact protrusions 1225*c* in contact with the second shaft 1225*a*.

Here, the second lens barrel 1220 may be pressed toward the bottom of the housing 1010 to maintain the state of being in contact with the housing 1010 by the fourth ball member 1225*b* and the second shaft 1225*a*.

To this end, a fifth magnetic material 1017 and a sixth magnetic material 1226 may be selectively provided on the bottom surface of the housing 1010 and the lower surface of the second lens barrel 1220 opposite thereto, and the second lens barrel 1220 may be pressed toward the bottom surface of the housing 1010 by attractive force between the magnetic materials.

Here, the fifth magnetic material 1017 and the sixth magnetic material 1226 may be configured as a pulling yoke and a pulling magnet, and for example, the fifth magnetic material 1017 and the sixth magnetic material 1226 may be selectively a pulling yoke and a pulling magnet, or both the fifth magnetic material 1017 and the sixth magnetic material 1226 may be pulling magnets.

A fifth magnetic material 1017 may be elongated in the optical axis direction along the movement path of the second lens barrel 1220 on the bottom surface of the housing 1010, and a sixth magnetic material 1226 may be disposed on the bottom of the second lens barrel 1220. The fifth magnetic material 1017 may be sufficiently elongated in the optical axis direction to continuously oppose the sixth magnetic material 1226 in consideration of the movement path of the second lens barrel 1220.

In the example embodiment, the fifth magnetic material 1017 may be attached to the external surface of the housing 1010, and may be exposed to the internal space of the housing 1010 through the magnetic hole 1017*a* provided in the bottom of the housing 1010. Alternatively, the fifth magnetic material 1017 may be attached to the internal bottom of the housing 1010 or may be inserted into the bottom surface.

The third magnetic material 1016 and the fifth magnetic material 1017 provided on the bottom surface of the housing 1010 and elongated in the optical axis direction along the movement path of the first lens barrel 1210 may be provided separately or may be integrated with each other (in the drawings, the third magnetic material 1016 and the fifth magnetic material 1017 may be integrated, but are not limited thereto).

Further, in the example embodiment, the second lens barrel 1220 may form the stable three-position support structure in any position when moving in the optical axis direction.

That is, as illustrated in FIGS. 25 to 27, the second lens barrel 1220 may move in the optical axis direction (the middle area in FIG. 25, the leftmost area in FIG. 26, and the rightmost area in FIG. 27). In any case, the second lens barrel 1220 may allow a center MC6 of magnetic force of the sixth magnetic material 1226 to be disposed in the triangle formed by the fourth contact position CS4 in contact with the fourth ball member 1225*b*, and the two positions in contact with the second shaft 1225*a*, the fifth contact position CS5 and the sixth contact position CS6.

Here, the center of magnetic force of the sixth magnetic material 1226 may be, for example, the geometric center of the surface on which the sixth magnetic material 1226 opposes the fifth magnetic material 1017, and in FIG. 25, the geometric center of the sixth magnetic material 1226 may refer to a center of gravity on the X-Z plane of the sixth magnetic material 1226.

The coil 1243*b* for driving the second lens barrel 1220 may be provided on one side surface of both side surfaces of the housing 1010, and in this case, electromagnetic force may act on one side surface of the second lens barrel 1220. Accordingly, to easily drive the second lens barrel 1220, the fifth magnetic material 1017 and the sixth magnetic material 1226 may be disposed adjacent to one side surface from the center of the housing 1010, that is, adjacent to the side on which the driving coil 1243*b* is disposed.

To improve the driving force, the second lens barrel 1220 may have an extension portion 1229 in which a portion on which a magnet is mounted may extend toward the first lens barrel 1210 in the optical axis direction to increase the size of the magnet 1243*a*.

As described above, the first lens barrel 1210 and the second lens barrel 1220 may move in the optical axis direction riding on different ball members and shafts, such that the first lens barrel 1210 and the second lens barrel 1220 may move a long distance in the optical axis direction to implement a long stroke, and a support portion may be elongated for stable driving of each lens barrel.

Figure 17:
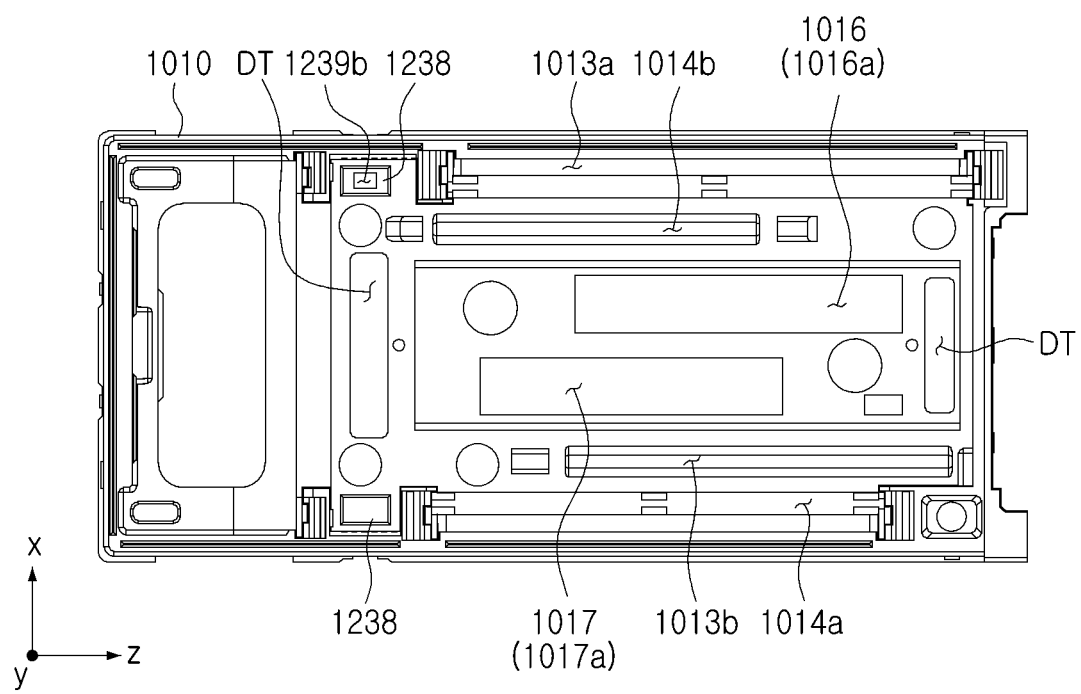
FIG. 17 is a plan diagram illustrating a housing according to an example embodiment of the present disclosure.

Accordingly, as illustrated in FIG. 17, a 1-1 guide groove 1013*a* and a 1-2 guide groove 1013*b* for the first lens barrel 1210, and a 3-1 guide groove 1014*a* and a 3-2 guide groove 1014*b* for the second lens barrel 1220 may be disposed side by side on the bottom of the housing 1010, and the first shaft 1215*a* and the second shaft 1225*a* may be provided in the 1-1 guide groove 1013*a* and the 3-1 guide groove 1014*a*, respectively.

The camera module 1000 in the example embodiment may be configured for zoom driving, and the first lens barrel 1210 and the second lens barrel 1220 may move a long distance in the optical axis direction, and accordingly, the first shaft 1215*a*, the 1-2 guide groove 1013*b*, the second shaft 1225*a*, and the 2-2 guide groove 1014*b* may overlap substantially in a direction perpendicular to the optical axis.

The housing 1010 may include a groove-shaped dust trap DT provided on the internal surface to collect foreign substances generated internally or introduced from the outside, and the dust trap DT may be filled with sticky adhesive to easily collect foreign substances.

The housing 1010 may include a first driver 1140 and a second driver 1240 for driving the reflective module 1100 and the lens module 1200, respectively. The first driver 1140 has been described in detail above, and the second driver 1240 may include a plurality of lens modules 1200 including the first lens barrel 1210 and the second lens barrel 1220, and a plurality of coils 1241*b* and 1243*b*.

For example, the second driver 1240 may include a plurality of magnets 1241*a* and 1243*a* and a plurality of coils 1241*b* and 1243*b* disposed to oppose the plurality of magnets 1241*a* and 1243*a*.

The lens barrels 1210 and 1220 in the example embodiment may need to move a long distance in the optical axis direction to implement a zoom camera. Accordingly, each of the magnets 1241*a* and 1243*a* may be magnetized in two or more poles to sequentially have at least N and S poles in the optical axis direction, and two or more of each of the coils 1241*b* and 1243*b* may be included.

When power is applied to the plurality of coils 1241*b* and 1243*b*, the first and second lens barrels 1210 and 1220 in which the plurality of magnets 1241*a* and 1243*a* are separately disposed may individually move in the optical axis (Z-axis) direction by electromagnetic influence between the plurality of magnets 1241*a* and 1243*a* and the plurality of coils 1241*b* and 1243*b*. Accordingly, zoom or autofocusing control may be implemented.

The plurality of magnets 1241*a* and 1243*a* may be separately disposed in the first and second lens barrels 1210 and 1220, respectively. For example, the first magnet 1241*a* may be mounted on a side surface of the first lens barrel 1210, and the second magnet 1243*a* may be mounted on a side surface of the second lens barrel 1220.

The plurality of coils 1241*b* and 1243*b* may be mounted on the housing 1010 to oppose the plurality of magnets 1241*a* and 1243*a*, respectively.

Here, since the plurality of magnets 1241*a* and 1243*a* provided in the first and second lens barrels 1210 and 1220 are separately disposed on both sides, respectively, the plurality of coils 1241*b* and 1243*b* may also be separately disposed on both side walls of the housing 1010 to oppose thereto.

For example, the plurality of coils 1241*b* and 1243*b* may be mounted on the main board 1070, and the main board 1070 may be attached to the external surface of the housing 1010 such that the plurality of coils 1241*b* and 1243*b* may be exposed into the housing 1010 through through-holes 1010-3 and 1010-4.

In the example embodiment, when the first and second lens barrels 1210 and 1220 move, a closed-loop control method of detecting and providing a feedback of the positions of the first and second lens barrels 1210 and 1220 may be used. Accordingly, position sensors 1241*c* and 1243*c* may be necessary for closed-loop control. The position sensors 1241*c* and 1243*c* may be Hall sensors, TMR (Tunnel Magneto-Resistance effect) angle sensors, general TMR sensors, or the like.

The position sensors 1241*c* and 1243*c* may be disposed internally or externally of the coils 1241*b* and 1243*b*, and the position sensors 1241*c* and 1243*c* may also be mounted together on the main board 1070 on which the coils 1241*b* and 1243*b* are mounted. As the moving distances of the first and second lens barrels 1210 and 1220 may be relatively long, a plurality of the position sensors 1241*c* and 1243*c* may be disposed and spaced apart from each other in the optical axis direction.

(FIGS. 18A to 24B) Lens Barrel Housing Support Structure

Figure 18A:
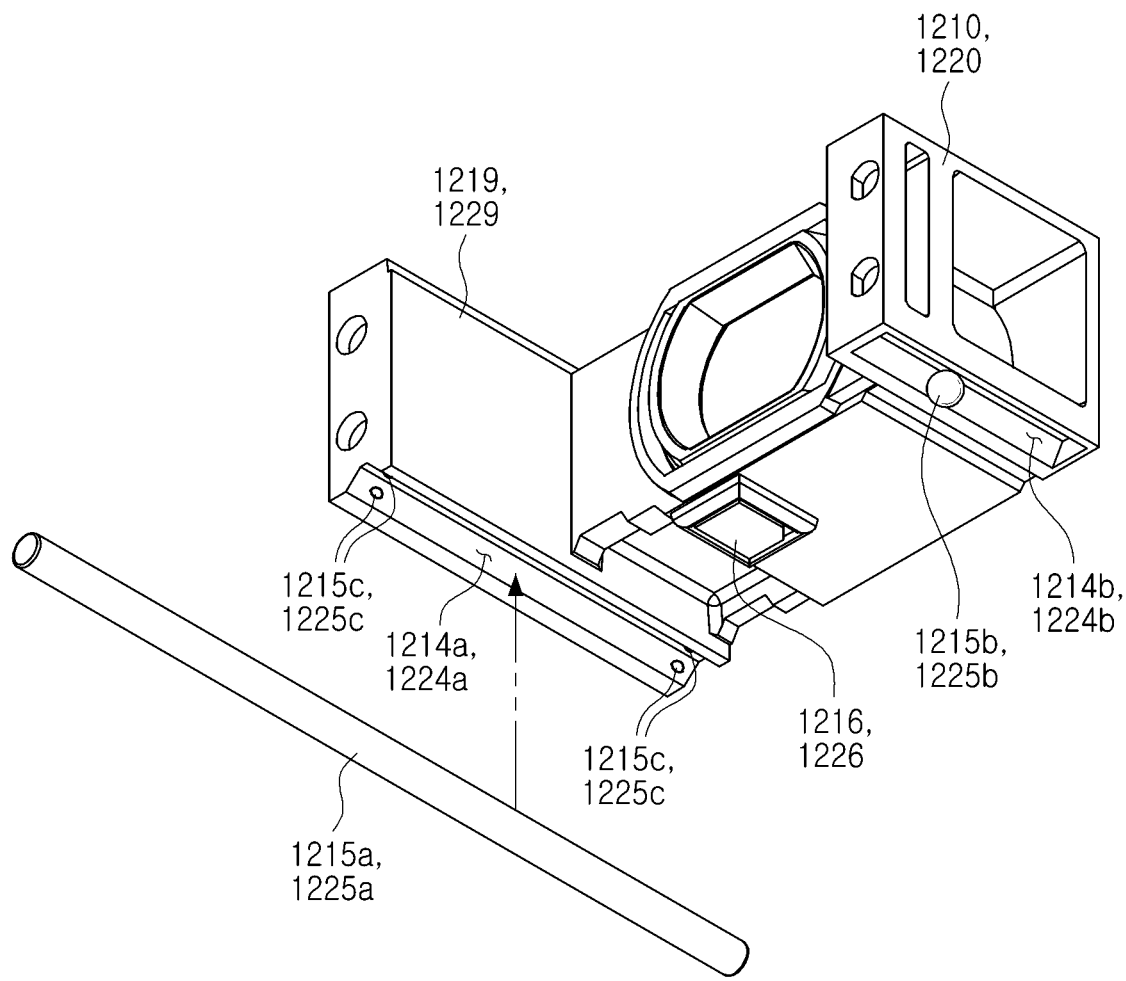
FIG. 18A is a perspective diagram illustrating a structure in which a lens barrel is supported by a housing according to an example embodiment of the present disclosure.

Embodiment 3-1 (FIG. 18A)

FIGS. 18A to 24B are perspective diagrams illustrating a structure in which a lens barrel coupled to a lens barrel or a holder is supported by a housing according to various example embodiments. While a first or second lens barrels 1210 and 1220 is shown in FIGS. 18 to 24A for clarity and conciseness, it will be understood that the other of the first or second lens barrels 1210 and 1220 may be a substantial mirror image of the first or second lens barrels 1210 and 1220 shown.

Referring to FIG. 18A, the first or second lens barrels 1210 and 1220 in the example embodiment may be guided by the first or second shaft 1215a or 1225a and the ball members 1215b and 1225b and may move in the optical axis direction in the housing 1010.

The shaft 1215a or 1225a may be a fixed member fixed to the housing 1010, and the ball member 1215b and 1225b may be configured to roll. Accordingly, one side of the first or second lens barrels 1210 and 1220 may form a sliding movement moving on the shaft 1215a or 1225a (sliding friction), and the other of both sides may form a rolling movement moving on the ball members 1215b and 1225b (rolling friction).

That is, since one side of the first or second lens barrels 1210 and 1220 in the example embodiment slides on the first or second shaft 1215a or 1225a, the first or second shaft 1215a or 1225a may be coated with a coating material on the surface thereof to reduce friction and noise.

The coating material may be a resin material binder, such as polyamideimide or epoxy, mixed with a solid lubricant, and in some cases, various additives providing functions such as abrasion resistance and rust prevention in addition to lubricating and providing the sliding effect.

The solid lubricant mixed with the binder may be at least one of Teflon, molybdenum (MOS2), polytetrafluoroethylene or fluororesin (PTFE), graphite, and the like.

Figure 18B:
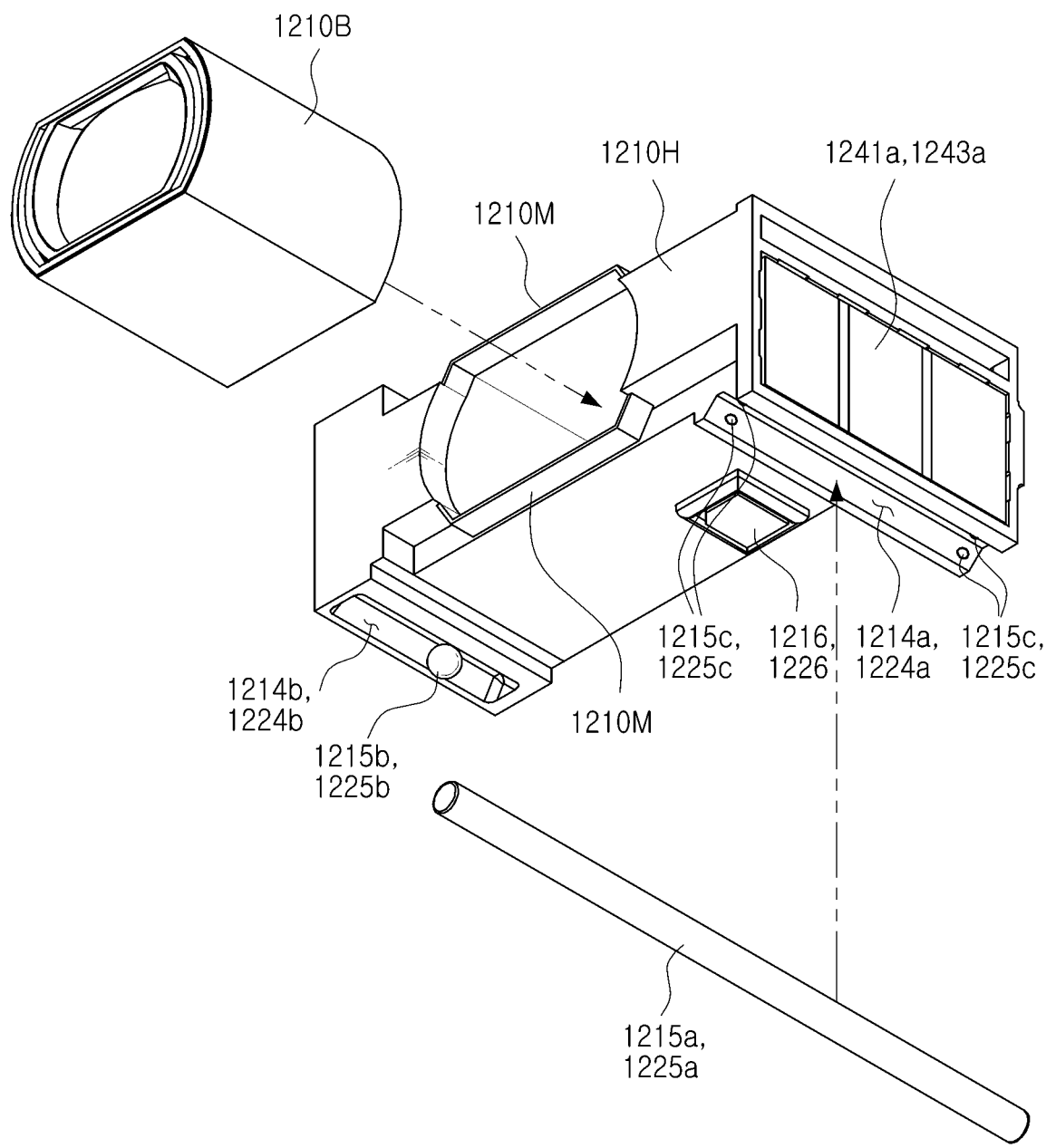
FIG. 18B is a perspective diagram illustrating a structure in which a lens barrel is coupled to a holder and is supported by a housing according to another example embodiment of the present disclosure.

Embodiment 3-2 (FIG. 18B)

Referring to FIG. 18B, the first or second lens barrels 1210 and 1220 in the example embodiment may further include a lens barrel 1210B in which a lens is disposed and a holder 1210H enclosing the lens barrel. The components included in the first or second lens barrels 1210 and 1220 described with reference to FIGS. 16 and 17 may be provided in the holder 1210H, and the holder 1210H may be supported by the housing 1010 by the shaft 1215a or 1225a and the ball members 1215b and 1225b and the movement thereof may be guided.

Since the upper and lower portions of which the lens barrel 1210B inserted into the holder 1210H may be configured to have a thin thickness for thickness reduction, a reinforcing member 1210M formed of a metal may be provided in the holder 1210H to enclose the lens barrel 1210B such that rigidity may be supplemented.

The reinforcing member 1210M may be divided or integrated to surround the lens barrel 1210B in upper and lower portions. The reinforcing member 1210M may be coupled to the lens barrel 1210B using an adhesive, or may be integrated by insert injection.

In the example embodiment, the lens barrel 1210B and the holder 1210H may be integrated with each other in the first or second lens barrels 1210 and 1220, but the first or second lens barrels 1210 and 1220 in the example embodiment may include the lens barrel 1210B in which a lens is disposed, and the holder 1210H enclosing the lens barrel 1210B as described with reference to FIG. 18B.

Figure 19A:
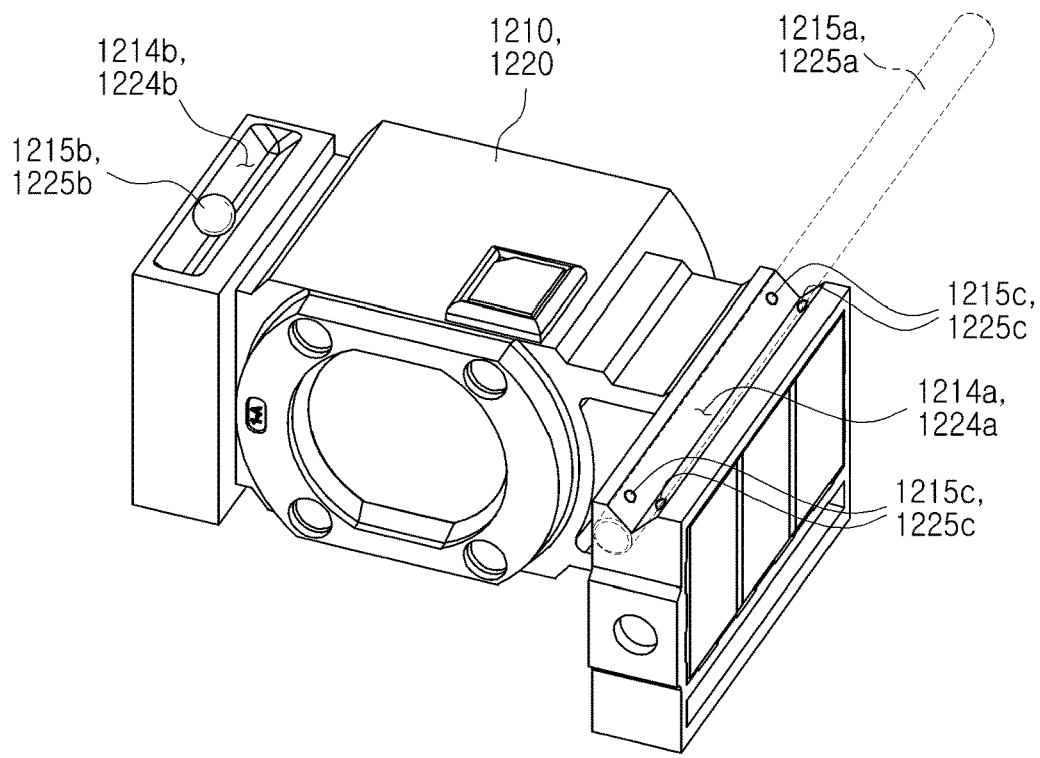
FIGS. 19A to 24B are perspective diagrams illustrating a structure in which a lens barrel coupled to a lens barrel or a holder is supported by a housing according to various example embodiments of the present disclosure.
Figure 19B:
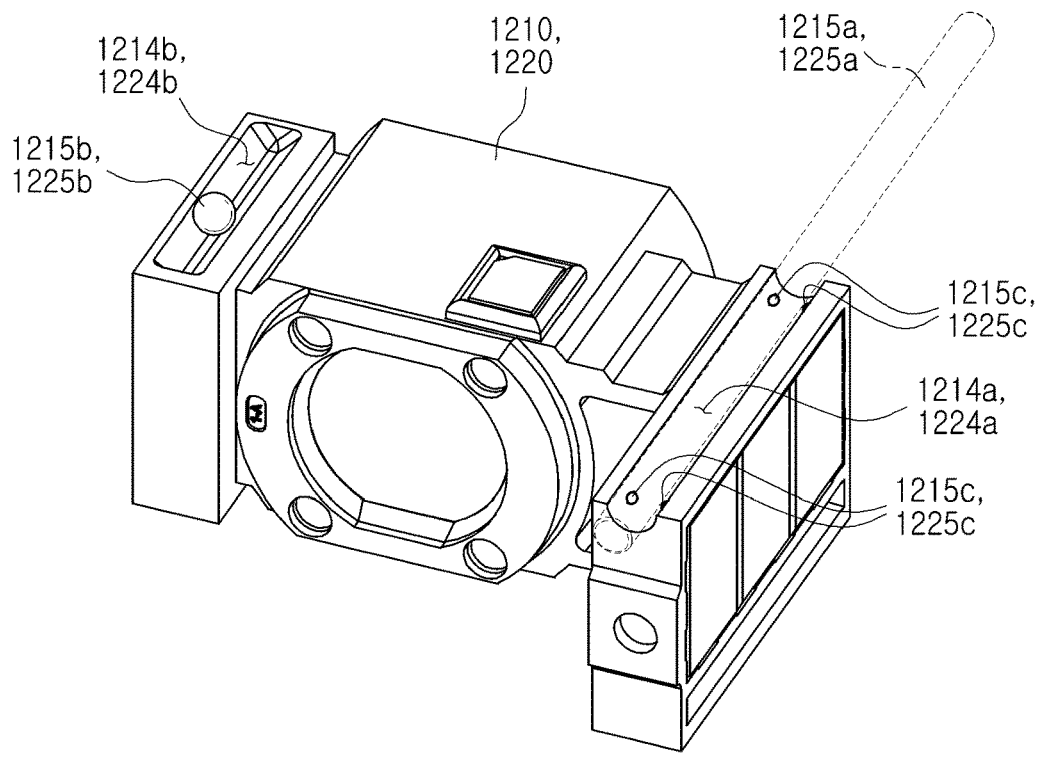

Embodiment 3-3 (FIGS. 19A to 19B)

Referring to FIGS. 19A and 19B, the first or second lens barrels 1210 and 1220 in the example embodiment may be guided by the shaft 1215a or 1225a and the ball members 1215b and 1225b and may move in the optical axis direction in the housing 1010.

First or second contact protrusions 1215c and 1225c provided in two positions may be provided in the 2-1 or 4-1 guide grooves 1214a and 1224a of the first or second lens barrels 1210 and 1220, respectively.

Each of the contact protrusions 1215c and 1225c provided in a single position may include two contact points protruding toward the shafts 1215a and 1225a, and may be configured as a spherical surface protruding into the guide grooves 1214a and 1224a.

The shaft 1215a and 1225a may be in contact with only the contact projections 1215c and 1225c, rather than in contact with the entire guide groove 1214a and 1224a.

The 2-1 or 4-1 guide grooves 1214a and 1224a may be configured as an angled V-shaped groove (FIG. 19A) or a rounded U-shaped groove (FIG. 19B).

Figure 20A:
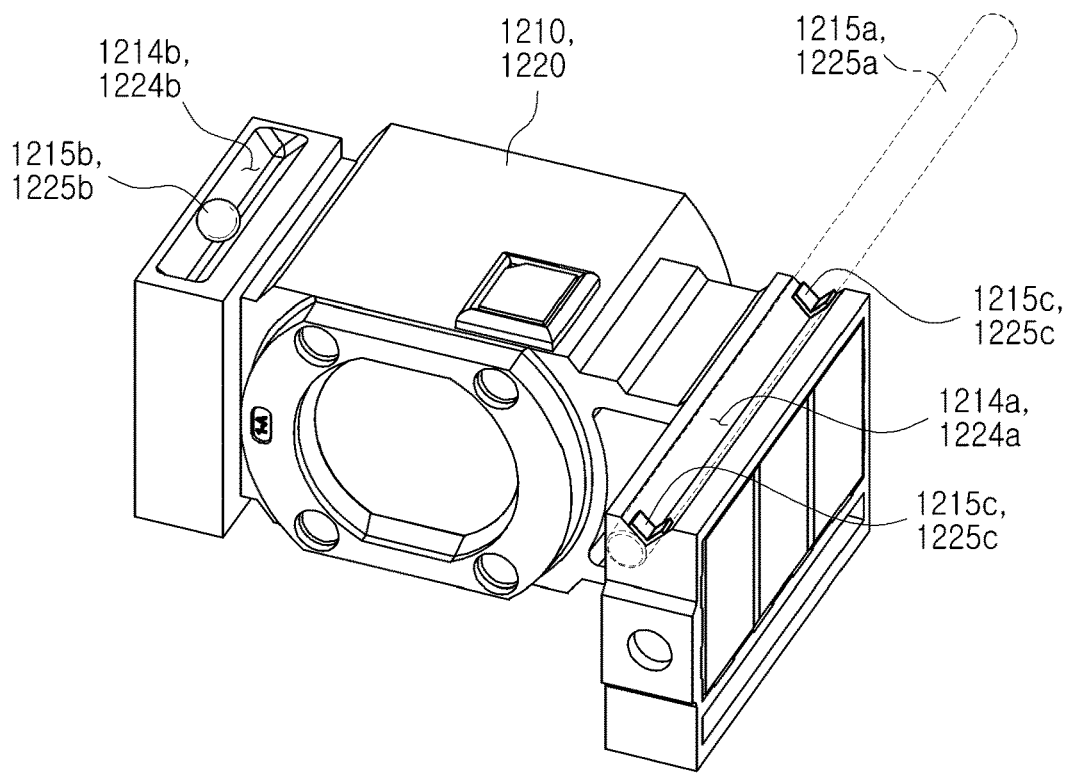
Figure 20B:
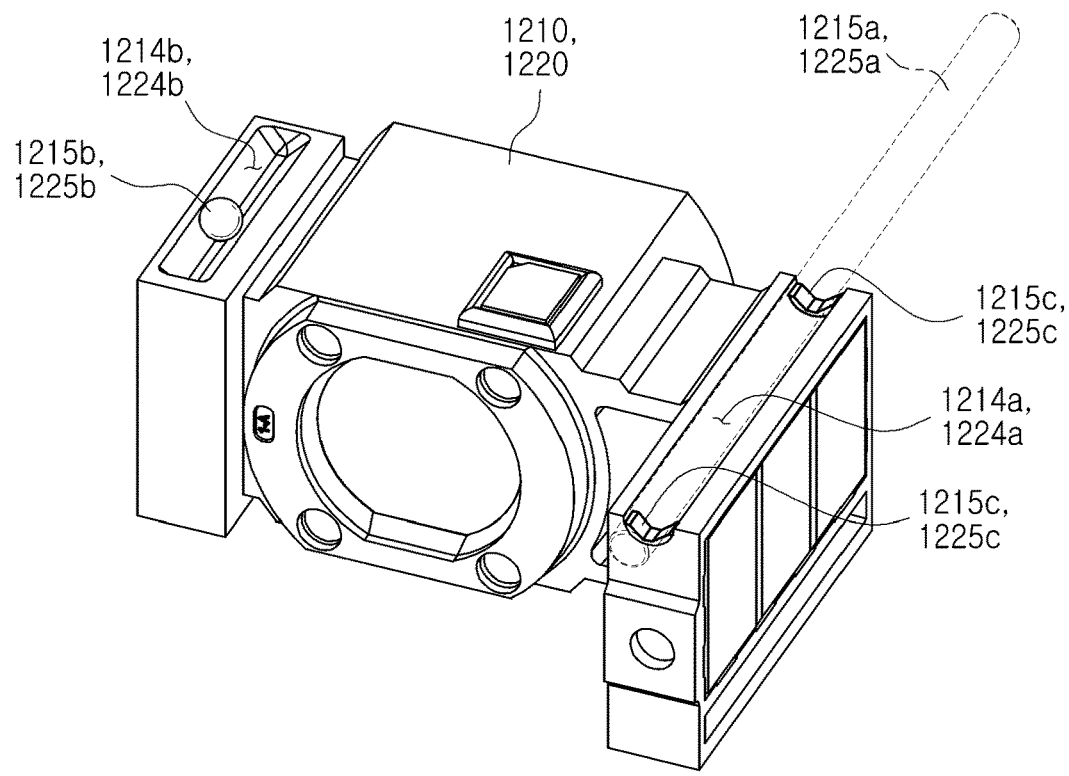

Embodiment 3-4 (FIG. 20A to FIG. 20B)

Referring to FIGS. 20A and 20B, each of the contact protrusions 1215c and 1225c provided in the positions may have a V-shaped protrusion (FIG. 20A) or a polygonal-shaped protrusion (FIG. 20B) in which the contact protrusions 1215c and 1225c may be disposed in and integrated with the guide grooves 1214a and 1224a or another member may be attached thereto.

Shafts 1215a and 1225a may not be in contact with the guide grooves 1214a and 1224a and may only be in contact with the contact protrusions 1215c and 1225c protruding into the guide grooves 1214a and 1224a.

The 2-1 or 4-1 guide grooves 1214a and 1224a may be an angled V-shaped groove (FIG. 20A) or a round U-shaped groove (FIG. 20B).

Figure 21:
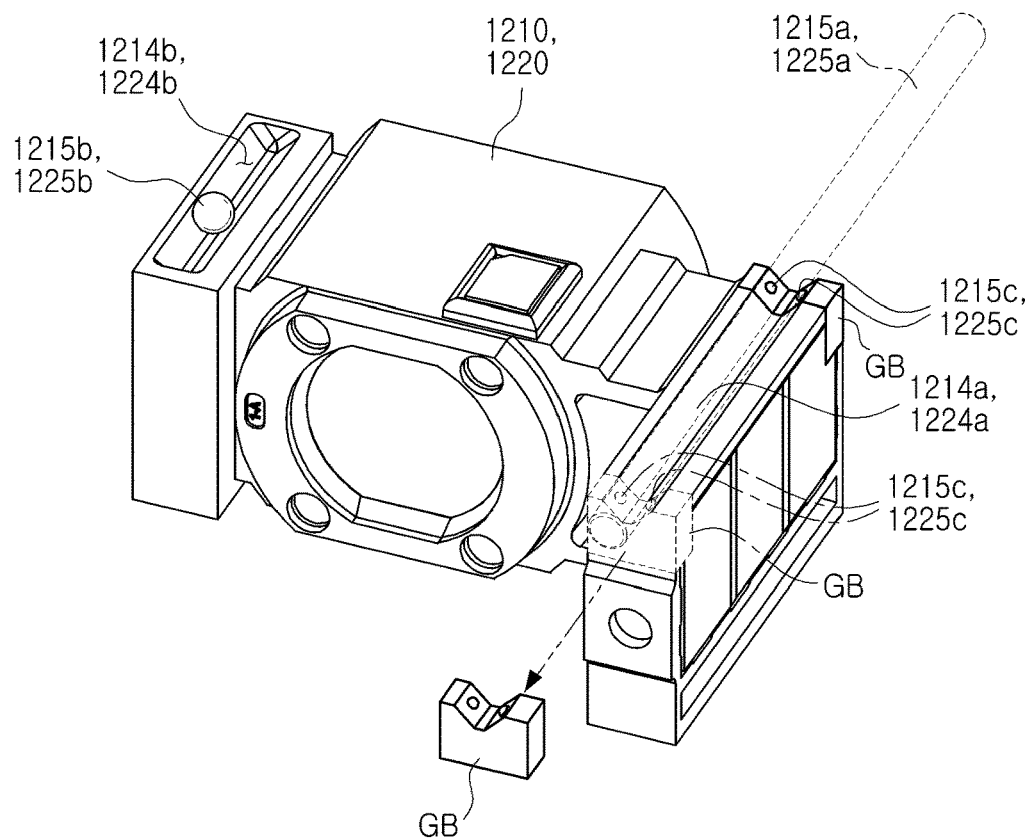

Embodiment 3-5 (FIG. 21)

Referring to FIG. 21, each of the contact protrusions 1215c and 1225c provided in the positions may not be directly disposed in the guide grooves 1214a, 1224a, and may be disposed in a guide block GB forming a portion of the guide grooves 1214a and 1224a. That is, the lens barrels 1210 and 1220 may include guide blocks GB attached to both sides of the guide grooves 1214a and 1224a.

The contact protrusions 1215c and 1225c described with reference to FIGS. 19 and 20 may be disposed on the guide block GB. Two guide blocks GB may be disposed on both sides for each guide groove 1214a and 1224a.

Figure 22:
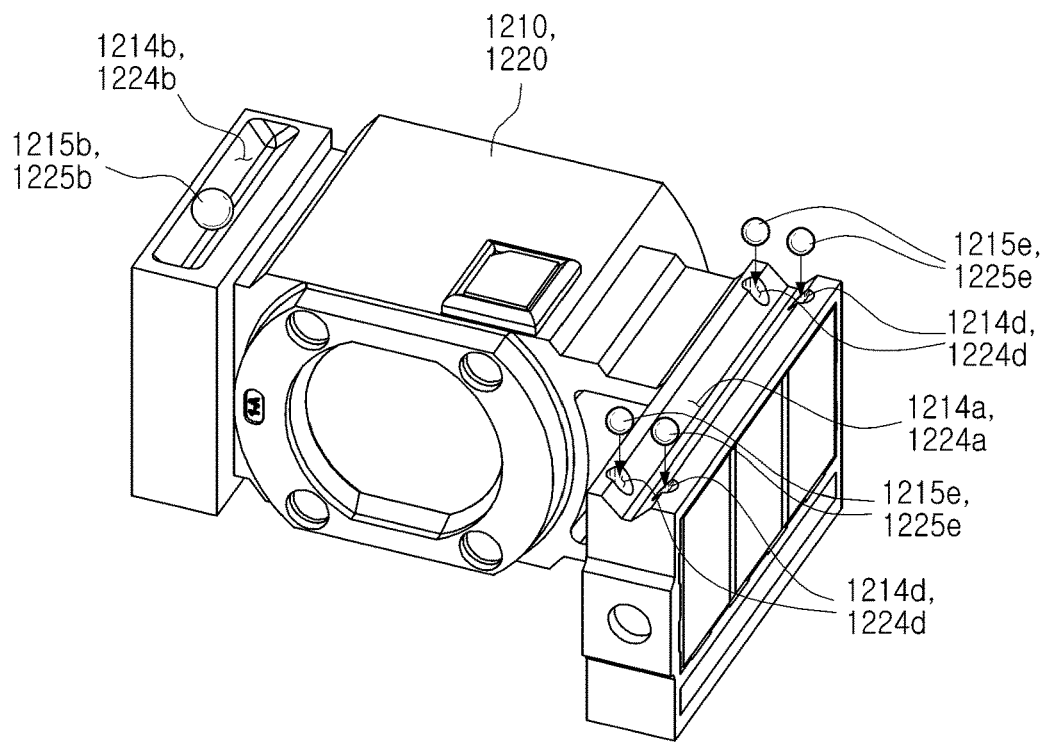

Embodiment 3-6 (FIG. 22)

Referring to FIG. 22, the spherical-shaped contact protrusions 1215c and 1225c described with reference to FIG. 19 may be disposed such that spherical-shaped ball members 1215e and 1225e may be embedded in the guide grooves 1214a and 1224a. To this end, fixing grooves 1214d and 1224d into which the ball members 1215e and 1225e are inserted may be disposed in the guide grooves 1214a and 1224a. The ball members 1215e and 1225e may be fixed to the fixing grooves 1214d and 1224d by bonding using an adhesive.

Figure 23:
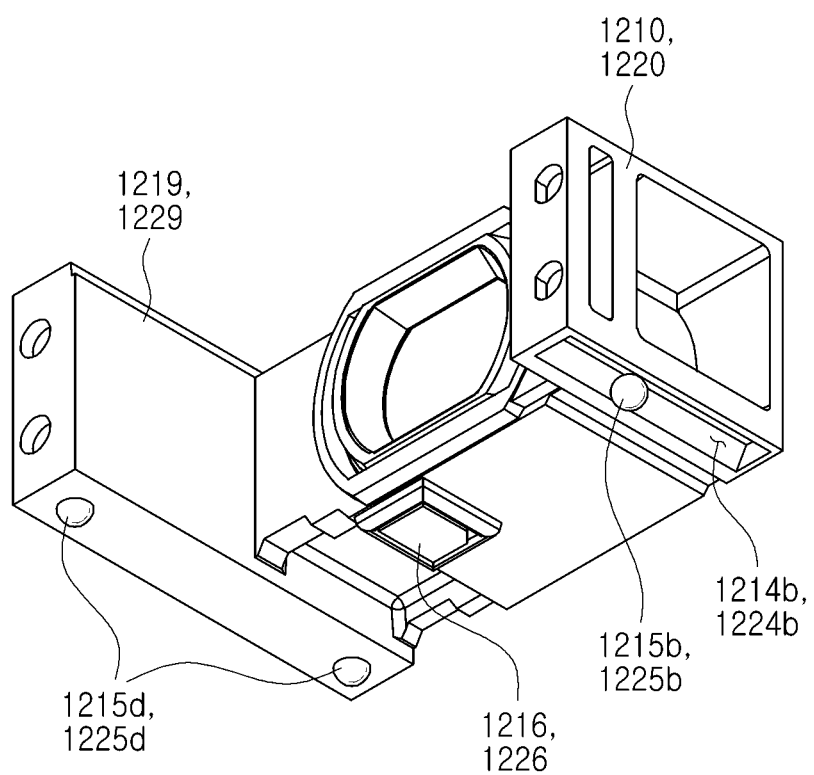

Embodiment 3-7 (FIG. 23)

Referring to FIG. 23, the first or second lens barrels 1210 and 1220 in the example embodiment may not be guided by the shaft (sliding) and the ball member (rolling), and may be guided by two ball members 1215d and 1225d (sliding) fixed to the lens barrel, instead of the shafts 1215a and 1225a, and the rolling ball members 1215b and 1225b.

Accordingly, in the example embodiment in FIG. 23, the shafts 1215a, 1225a and the contact protrusions 1215c, 1225c may not be necessary, and the two fixed ball members 1215d and 1225d may be fixed to the first or second lens barrels 1210 and 1220, respectively, instead of the shafts.

The two fixed ball members 1215d and 1225d may slide along the first or third guide grooves 1013a and 1014a of the housing 1010.

Figure 24A:
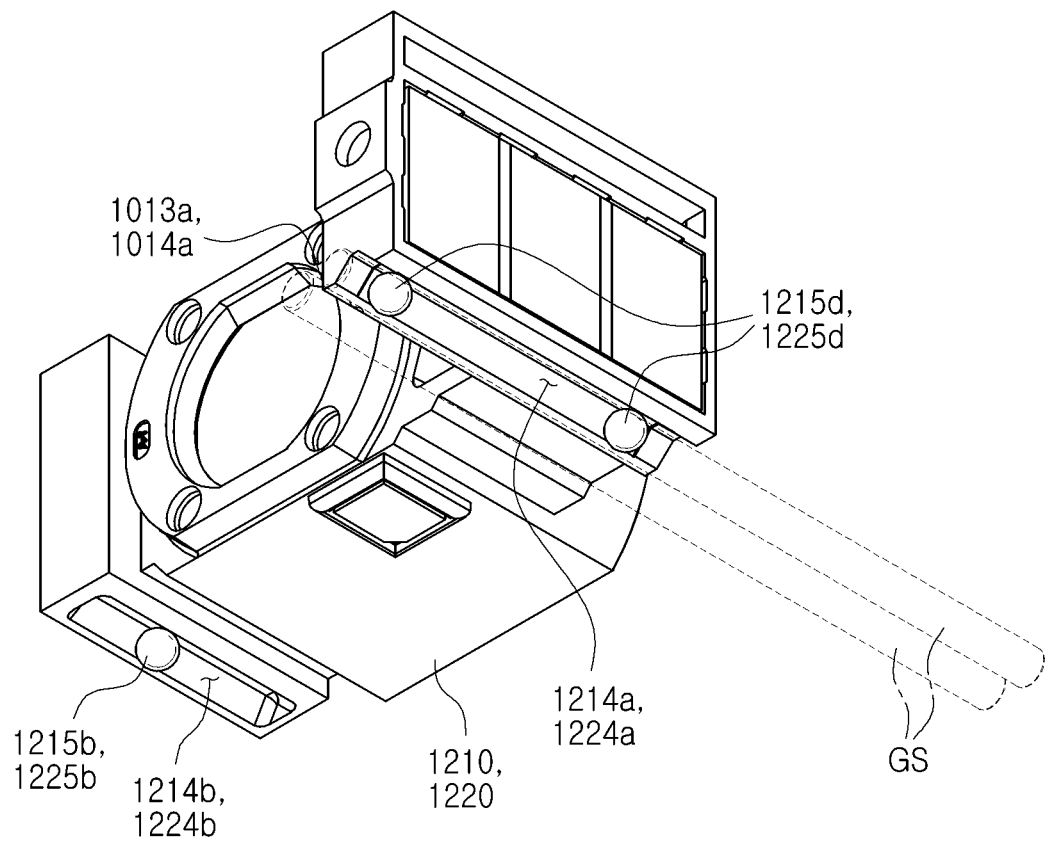
Figure 24B:
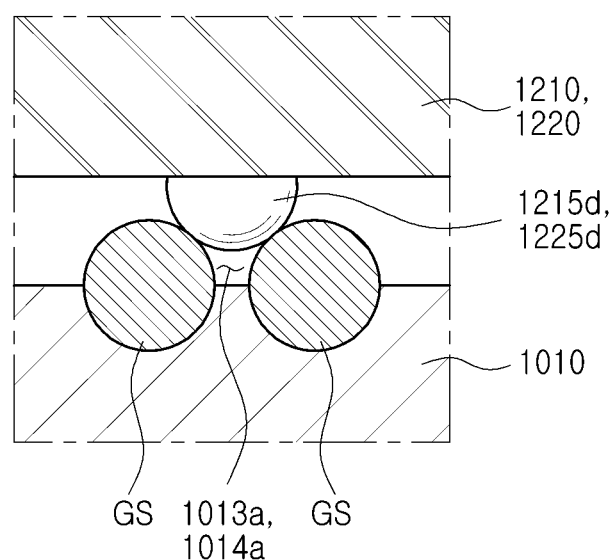

Embodiment 3-8 (FIGS. 24A to 24B)

Referring to FIGS. 24A and 24B, the first or third guide grooves 1013a and 1014a provided in the housing 1010 may be implemented by two guide shafts GS. That is, the guide shafts GS may be arranged side by side in the optical axis direction, and the two fixed ball members 1215d and 1225d, fixed to each of the first or second lens barrels 1210 and 1220, may slide using the grooves formed on and between the two guide shafts GS as the first or third guide grooves 1013a and 1014a.

(FIGS. 28 to 38) Damper and Stopper

Referring to FIGS. 28 to 38, the damper of the rotation holder and the stopper of the lens barrel will be described according to an example embodiment.

Embodiment 4-1 (FIGS. 28 to 31B)

Figure 28:
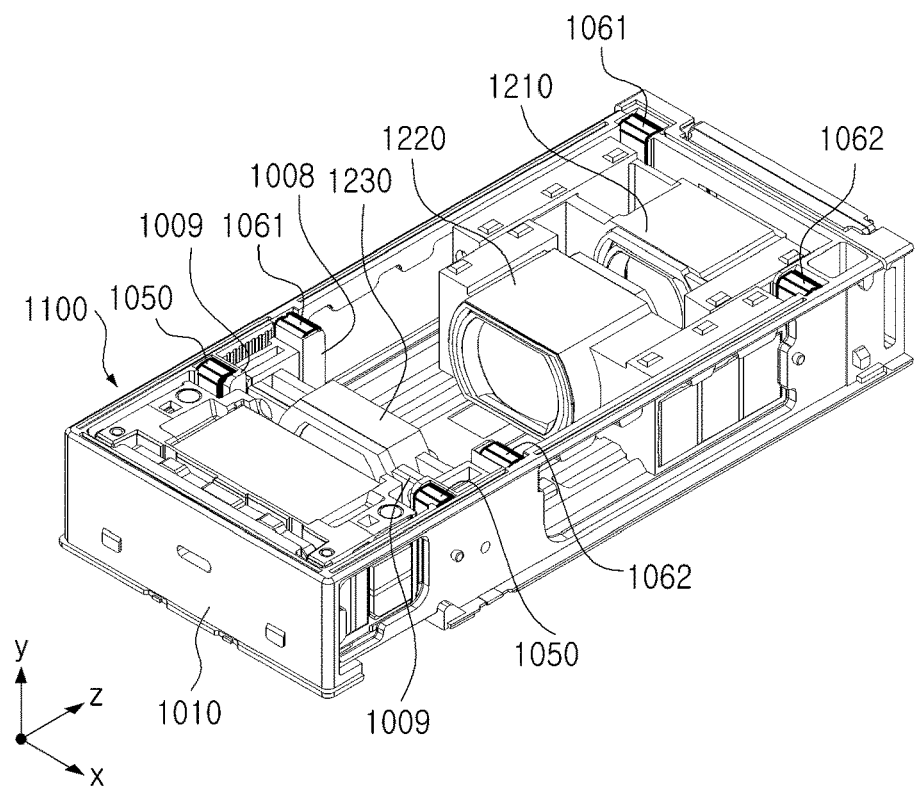
FIG. 28 is a perspective diagram illustrating an example in which a damper of a rotation holder and a stopper of a lens barrel are installed according to an example embodiment of the present disclosure.
Figure 29:
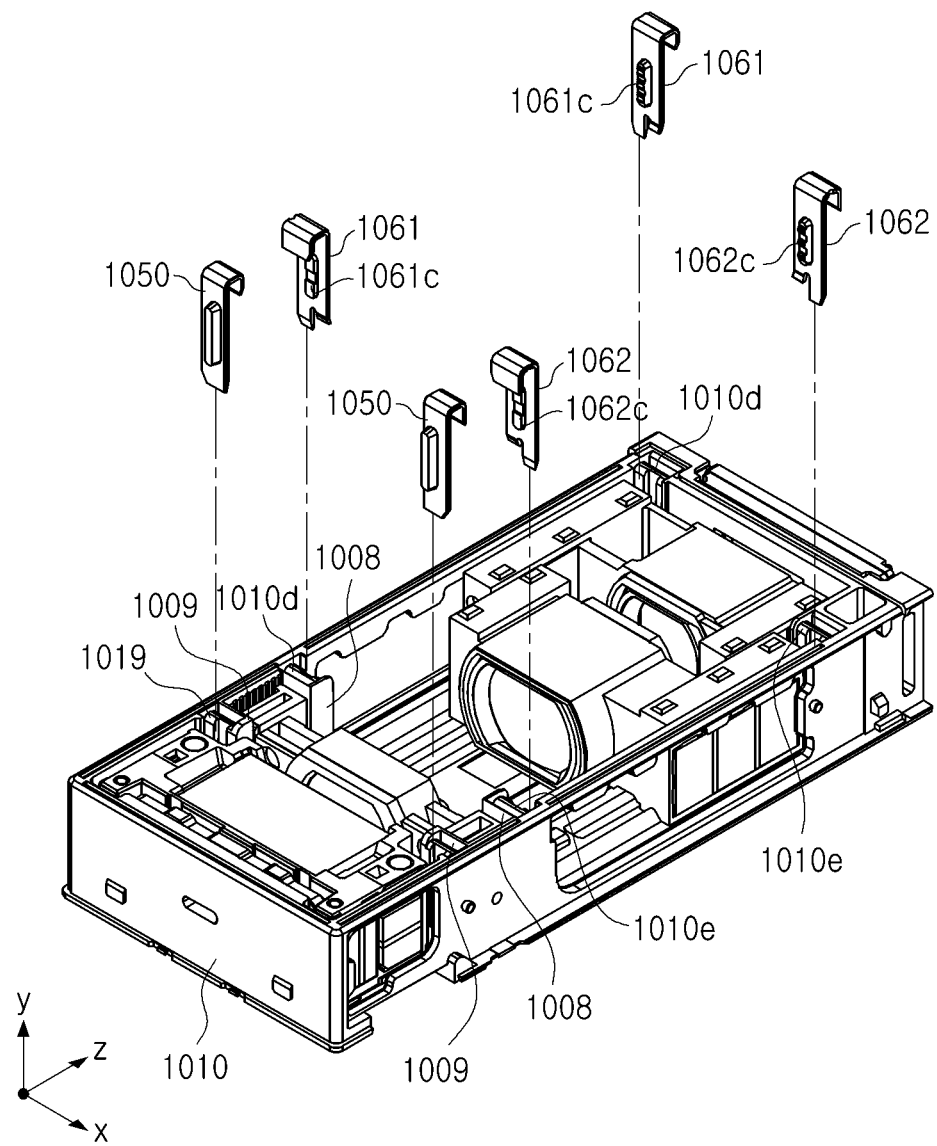
FIG. 29 is an exploded perspective diagram illustrating an example in which the damper of the rotation holder and the stopper of the lens barrel in FIG. 28 are disassembled.

Referring to FIG. 28, the reflective module 1100 and the lens module 1200 according to the example embodiment may be provided in a single space partitioned by the first protruding wall 1009.

The reflective module 1100 may be mutually in contact with the housing 1010 while moving in the optical axis direction to implement zoom or autofocusing function or by external impacts due to rotation for optical image stabilization or other impacts, and in this case, it may not be possible to accurately control the position in the optical axis direction due to breakage or excessive stroke.

Accordingly, in the housing 1010 of the camera module in the example embodiment, as described above, the damper 1050 inserted into the insertion groove 1019 provided in the upper portion of the first protruding wall 1009 may be included.

Also, in the example embodiment, a stopper 1060 may be provided to control the movement of the first and second lens barrels 1210 and 1220. The stopper 1060 may include a first stopper 1061 for limiting the moving distance of the first lens barrel 1210 and a second stopper 1062 for limiting the moving distance of the second lens barrel 1220.

A pair of first stoppers 1061 may be disposed on both ends of the first shaft 1215a to limit the movement distance of the first lens barrel 1210, and a pair of second stoppers 1062 may be disposed on both ends of the second shaft 1225a to limit the movement distance of the second lens barrel 1220.

Accordingly, in the housing 1010, first and second hooking portions 1010d and 1010e to which the first and second stoppers 1061 and 1062 are hooked and fixed may be provided in the upper portions of both ends of each of the first shaft 1215a and the second shaft 1225a, respectively.

The first stopper 1061 and the second stopper 1062 may include damping materials 1061c and 1062c in portions opposing the first and second lens barrels 1210 and 1220, respectively, and may absorb impacts when the first and second lens barrels 1210 and 1220 are in contact.

Figure 30:
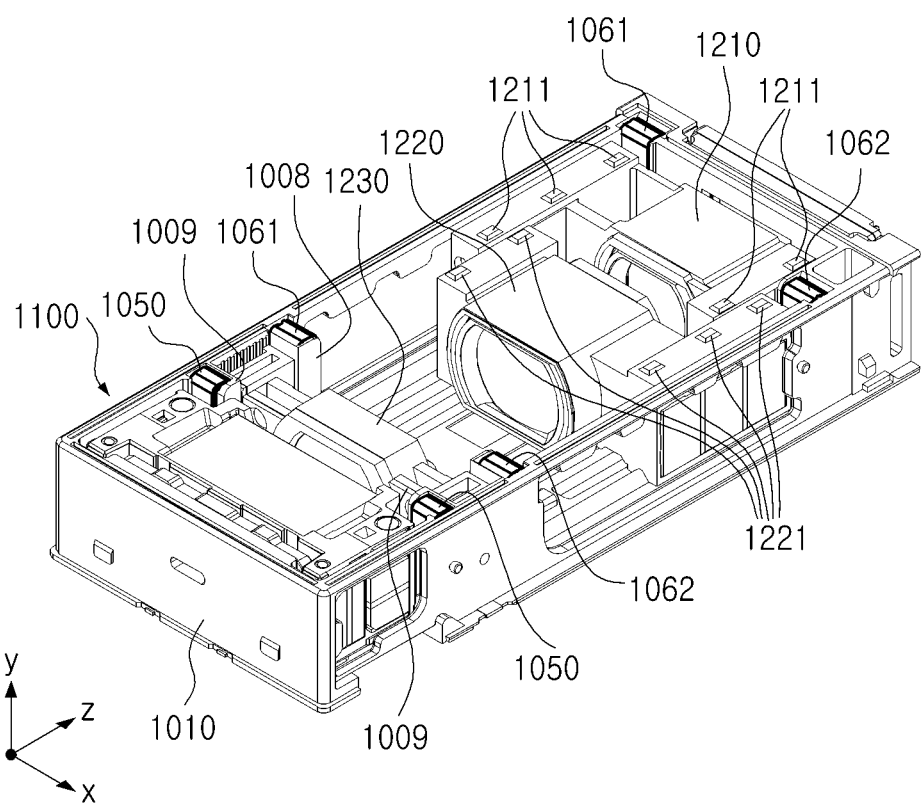
FIG. 30 is a perspective diagram illustrating a stopper provided in a zoom lens barrel according to an example embodiment of the present disclosure.

Embodiment 4-2 (FIG. 30)

The first and second lens barrels 1210 and 1220 may collide with the cover 1030 while unintentionally moving in a direction perpendicular to the optical axis direction due to shaking or external impacts.

Accordingly, with reference to FIG. 30, a plurality of third and fourth stoppers 1211 and 1221 may be provided on the upper surfaces of the first and second lens barrels 1210 and 1220 opposing the cover 1030, and the stoppers may absorb impacts or may prevent contact with the entire body such that the issue in which an unintentional portion of the first and second lens barrels 1210 and 1220 is broken or in contact may be prevented.

Figure 31B:
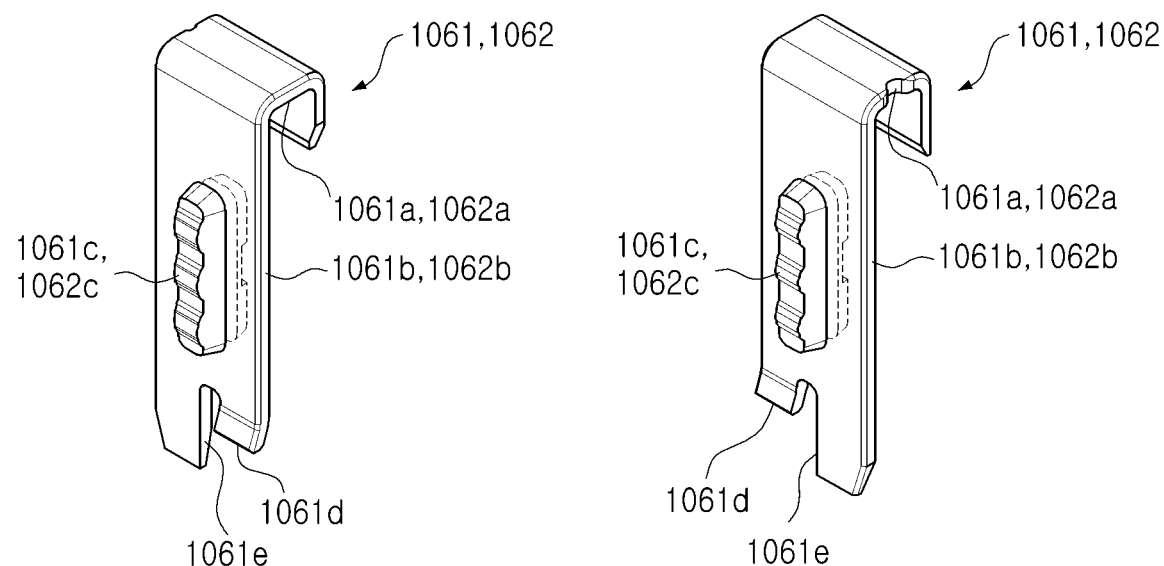
FIG. 31B is a perspective diagram illustrating a shape of a stopper according to an example embodiment of the present disclosure.
Figure 32:
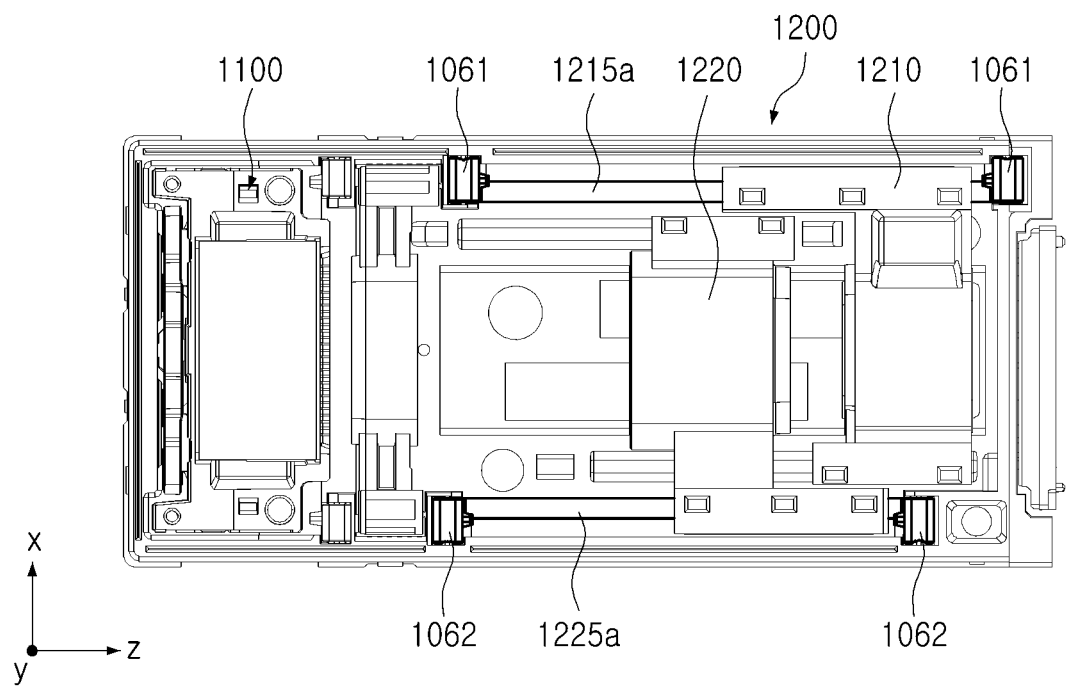
FIG. 32 is a perspective diagram illustrating a position in which a stopper is installed according to an example embodiment of the present disclosure.
Figure 33:
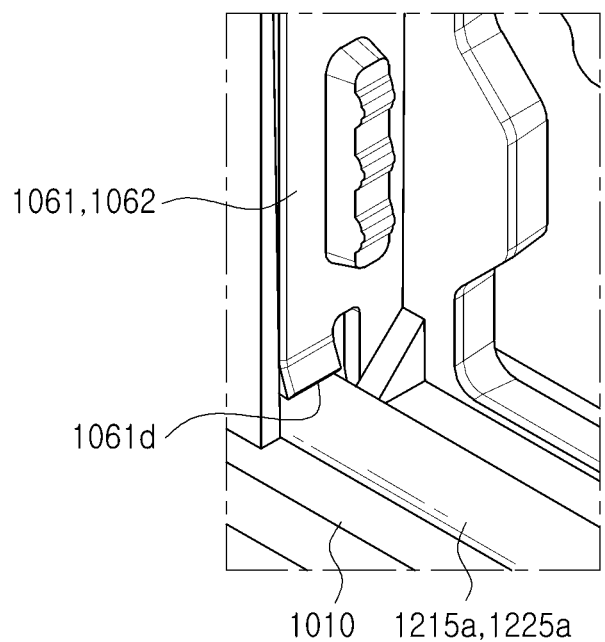
FIGS. 33 to 35 are perspective diagrams illustrating a structure in which a stopper is installed according to an example embodiment of the present disclosure.
Figure 34:
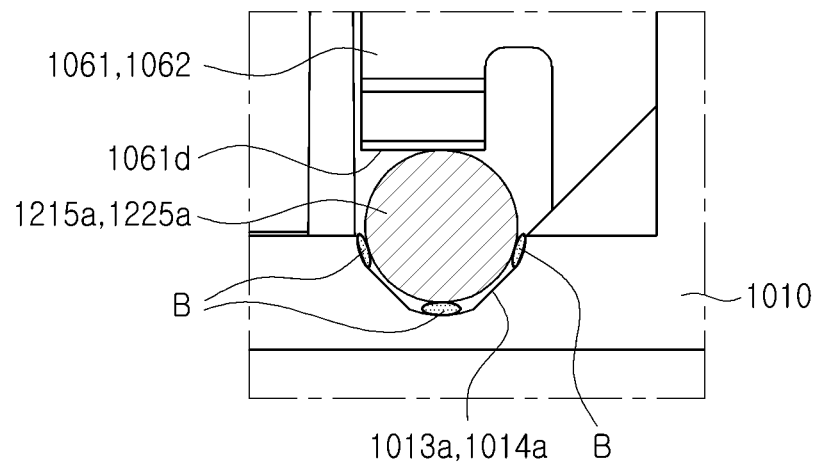

Referring to FIG. 31B, the stoppers 1061 and 1062 may include frames 1061a and 1062a, extension portions 1061b and 1062b extending in a direction perpendicular to the optical axis direction, and damping materials 1061c and 1062c provided in the extension portion 1061b.

The damping material 1061c and 1062c may be inserted into a hole provided in the extension portion 1061b and 1062b and may protrude from both surfaces of the extension portion 1061b and 1062b, or may be fixed to both surfaces of the extension portions 1061b and 1062b by bonding using an adhesive.

Also, the frames 1061a and 1062a may be provided in a hook shape and may be hooked on one end of the housing 1010 or the upper portion of the protruding wall, and the extension portions 1061b and 1062b and the damping material 1061c and 1062c may be inserted into a region between one side of the barrels 1210 and 1220 and the side surface or the protruding wall of the housing 1010.

The frames 1061a and 1062a may be pressed and inserted or may slide and couple to a side wall or a protruding wall of the housing 1010 by being hooked, and may be further fixed by bonding using an adhesive.

Embodiment 4-3 (FIGS. 32 to 35)

Referring to FIGS. 32 to 35, stoppers 1061 and 1062 may be disposed to press both ends of shafts 1215a and 1225a.

That is, the stoppers 1061 and 1062 may be provided on both ends of the shafts 1215a and 1225a and may limit the movement distance of the lens barrels 1210 and 1220 or may absorb impacts, may be inserted in a vertical direction and may be fixed by press-fitting and/or bonding using an adhesive, and may fasten the shafts 1215a and 1225a installed on the bottom of the housing using the fixing force.

Accordingly, the ends of the stoppers 1061 and 1062, that is, the ends of the extension portions 1061b and 1062b may include a support portion which may be partially cut out to be easily in contact with the shafts 1215a and 1225a, and the support portion may include an upper support portion 1061d in contact with the upper portions of the shafts 1215a and 1225a and a side support portion 1061e opposite to the side surfaces of the shafts 1215a and 1225a (FIG. 31B).

Figure 35:
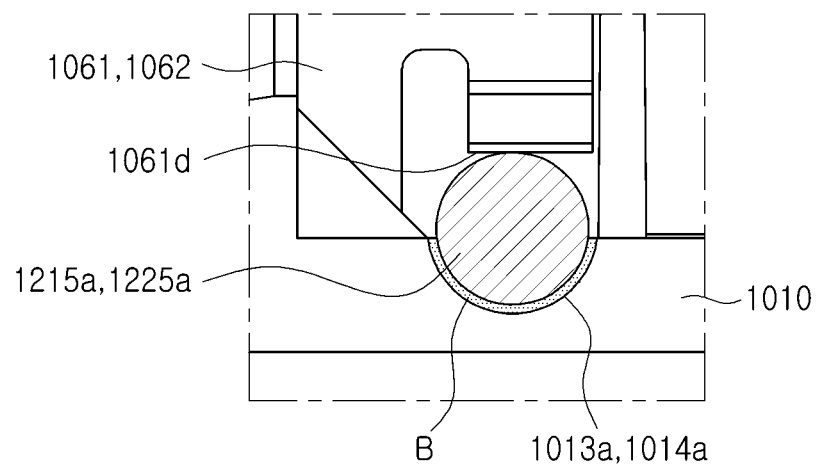

Also, the shafts 1215a and 1225a may be fixed to the guide grooves 1013a and 1014a of the housing 1010 by bonding using an adhesive, and a plurality of portions may be fixed by the guide grooves 1013a and 1014a by an adhesive B along a circumference of the shafts 1215a and 1225a (FIG. 34), or an adhesive may be continuously applied along the circumference of the shafts 1215a and 1225a and may be fixed to the guide grooves 1013a and 1014a (FIG. 35).

Figure 36:
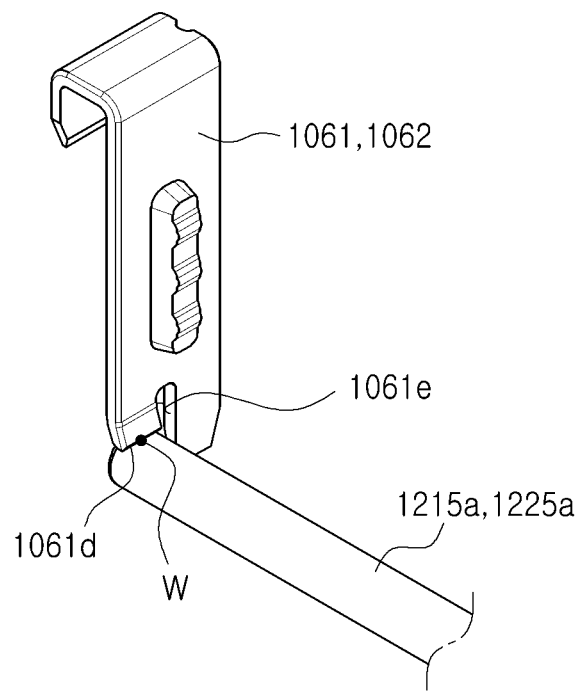
FIG. 36 is a perspective diagram illustrating a structure in which a stopper is connected to a shaft according to an example embodiment of the present disclosure.

Embodiment 4-4 (FIG. 36)

Further, as illustrated in FIG. 36, the ends of the stoppers 1061 and 1062 in contact with the shafts 1215a and 1225a may be coupled to each other by mutual welding, and the upper portion of the shafts 1215a and 1225a and the upper support portion 1061d may be mutually welded (W) to each other.

Figure 37:
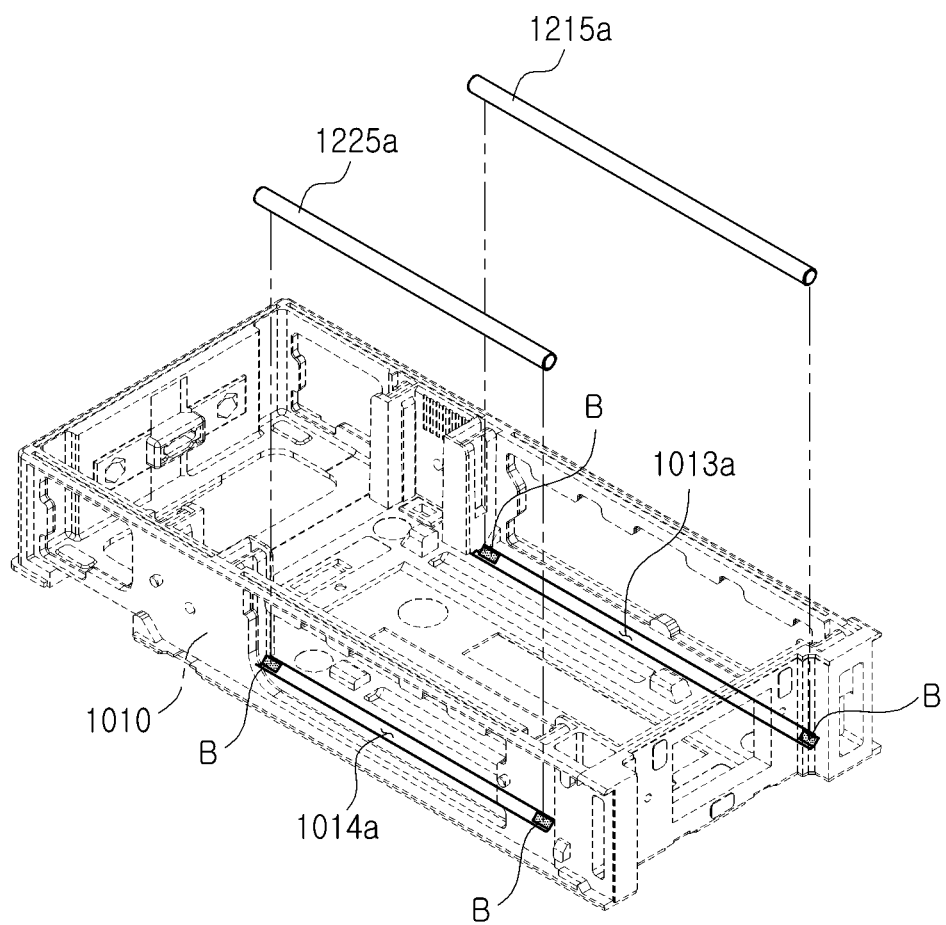
FIGS. 37 and 38 are perspective diagrams illustrating a structure in which a shaft is fixed to a housing according to an example embodiment of the present disclosure.
Figure 38:
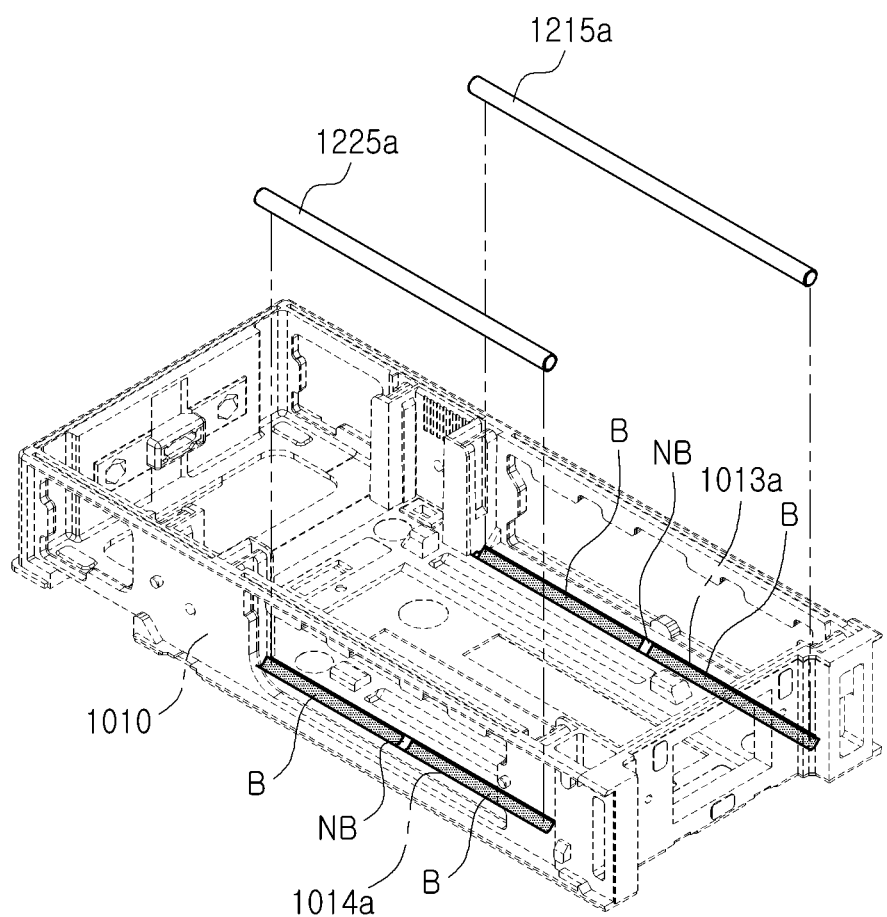

Embodiment 4-5 (FIGS. 37 to 38)

Referring to FIGS. 37 and 38, the shafts 1215a and 1225a may be fixed to the guide grooves 1013a and 1014a of the housing 1010 by bonding using an adhesive (B).

For example, both ends of the shafts 1215a and 1225a may be fixed to the guide grooves 1013a and 1014a by an adhesive B as illustrated in FIG. 37, or the shafts 1215a and 1225a may be fixed to the guide grooves 1013a and 1014a by a substantial length including both ends of the shafts 1215a and 1225a in the optical axis direction, and the shafts 1215a and 1225a may include a portion NB not coated in the middle.

(FIGS. 39 to 40) Automatic Setting of Fixed Lens Position.

Figure 39:
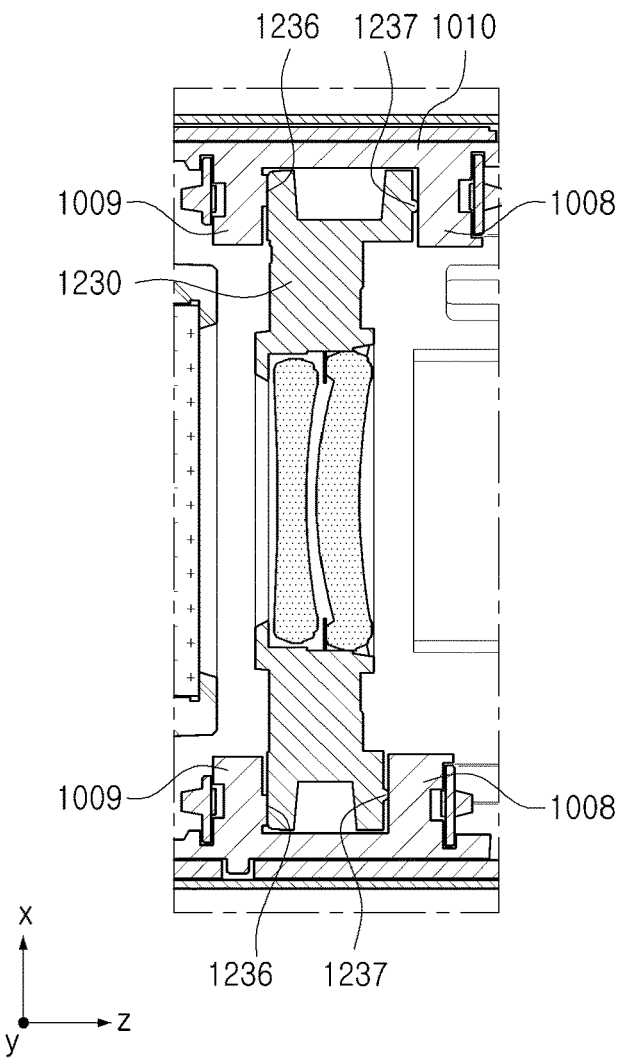
FIG. 39 is a diagram illustrating a shape in which a position of a fixed lens barrel in an optical axis direction is determined when a fixed lens barrel is present among lens barrels according to an example embodiment of the present disclosure.
Figure 40:
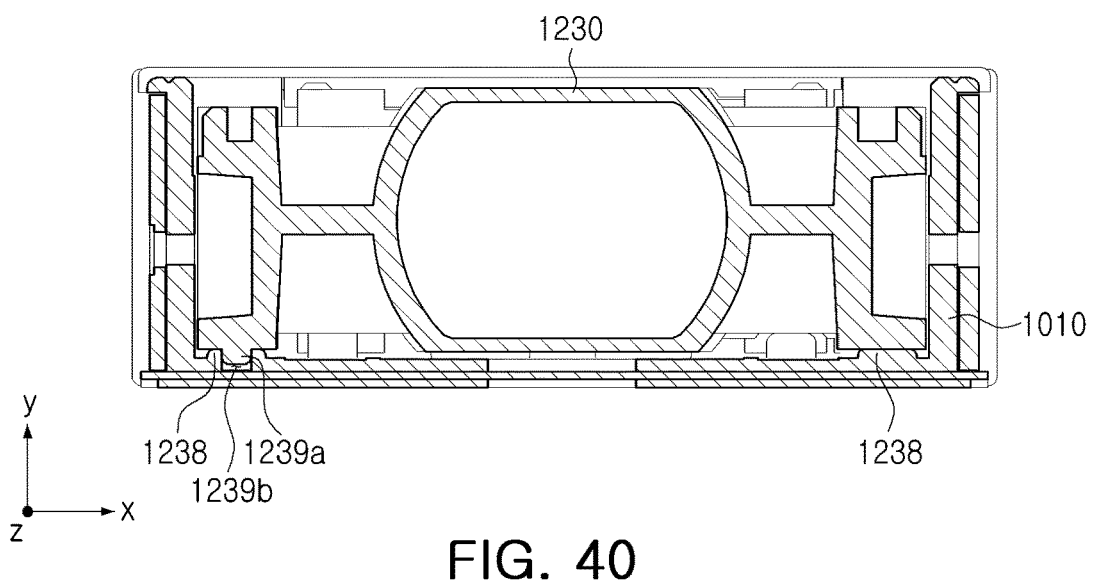
FIG. 40 is a diagram illustrating a shape in which a position of a fixed lens barrel in a direction perpendicular to an optical axis direction is determined when a fixed lens barrel is present among lens barrels according to an example embodiment of the present disclosure.

Referring to FIGS. 39 and 40, a fixed position of a lens barrel fixed to the camera module 1000 in an example embodiment is determined may be described.

The third lens barrel 1230 may be fixed to the housing 1010. For example, the third lens barrel 1230 may be disposed in front of the second lens barrel 1220 in a direction parallel to the optical axis direction along with the second lens barrel 1220.

Since the third lens barrel 1230 is fixed to a predetermined position in the housing 1010, it may be important for the third lens barrel 1230 to be disposed in an accurate position. The entire lenses provided in the camera module may need to be accurately aligned in the optical axis direction. Therefore, both the position in the optical axis direction and the position in the direction perpendicular to the optical axis direction of the lens barrel may need to be precisely determined.

Embodiment 5-1 (FIG. 39)

Referring to FIG. 39, a structure in which the position of the third lens barrel 1230 in the optical axis direction is determined will be described.

The internal space of the housing 1010 may be divided into a front first protruding wall 1009 and a rear second protruding wall 1008 in the optical axis direction, and a space into which the third lens barrel 1230 is inserted may be formed between the first protruding wall 1009 and the second protruding wall 1008.

In the third lens barrel 1230, first and second positioning protrusions 1236 and 1237 may be disposed on at least one of opposing surfaces of the first protruding wall 1009 and the third lens barrel 1230 in the optical axis direction and at least one of opposing surfaces of the second protruding wall 1008 and the third lens barrel 1230 in the optical axis direction.

Accordingly, the issue in which it may be difficult to determine the position when surface contact is used may be addressed by significantly reducing the contact area or by the point contact structure.

Embodiment 5-2 (FIG. 40)

Also, referring to FIG. 40, a structure in which the position of the third lens barrel 1230 is determined in a direction perpendicular to the optical axis direction (X and Y-axis directions) will be described.

A space into which the third lens barrel 1230 is inserted may be formed between the first protruding wall 1009 and the second protruding wall 1008, and a third positioning protrusion 1238 protruding upwardly may be provided on both sides on the bottom of the space. Accordingly, the position of the third lens barrel 1230 in the thickness direction (Y-axis direction) may be determined.

Furthermore, the third positioning protrusion 1238 may include a positioning groove 1239b introduced in the thickness direction (Y-axis direction), and a fourth positioning protrusion 1239a inserted into the positioning groove 1239b may be provided below the third lens barrel 1230. Accordingly, the positions in the optical axis direction and the width direction (X-axis direction) may be additionally determined. (FIGS. 41 to 43B) Sensor Shift Module Referring to FIGS. 41 to 43B, a camera module having a sensor shift structure will be described according to another example embodiment.

As described above with reference to FIGS. 9 and 10, an OIS function (optical image stabilization function) in the camera module 1000 in an example embodiment may be implemented by the reflective module 1100.

Figure 41:
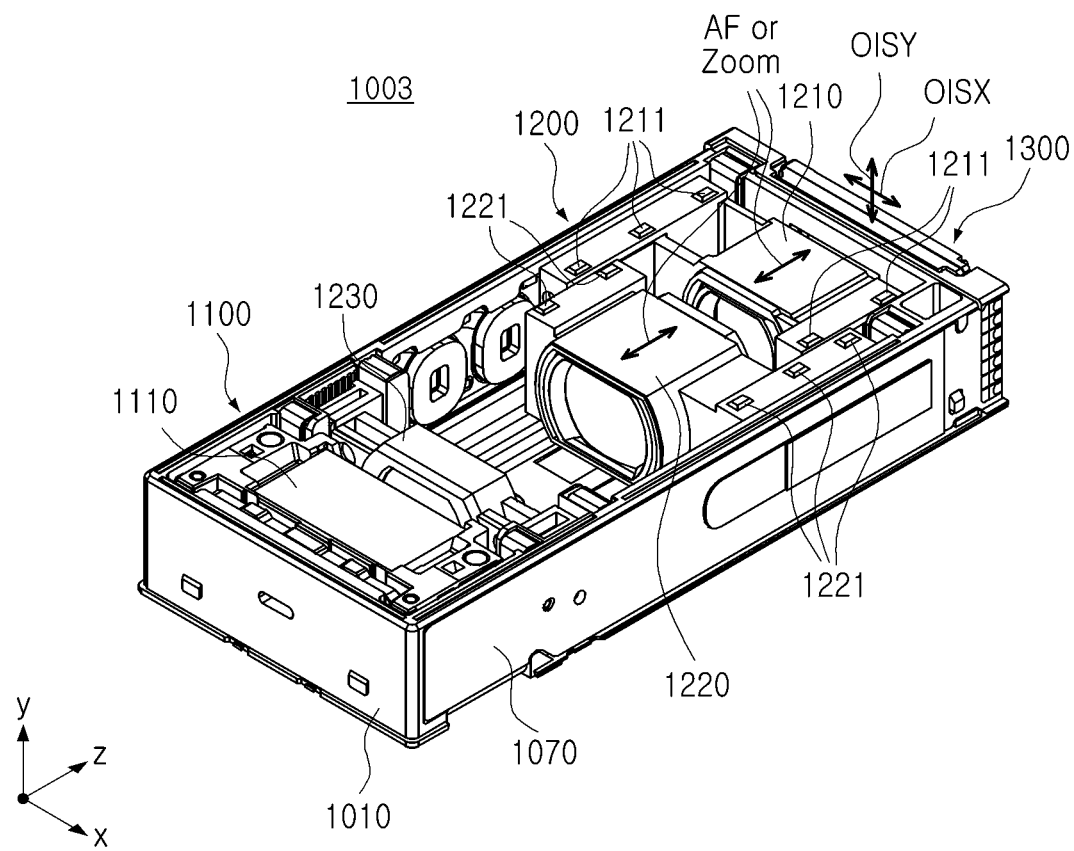
FIG. 41 is a perspective diagram illustrating a camera module having a sensor shift structure according to another example embodiment of the present disclosure.

Embodiment 6-1 (FIG. 41)

In the camera module 1003 in another example embodiment, as disclosed in FIG. 41, the optical path changing member 1110 of the reflective module 1100 may only change the light path while maintaining the state of being fixed, and the image sensor 1310 may move in two directions perpendicular to the optical axis, thereby implementing an OIS function.

Figure 42A:
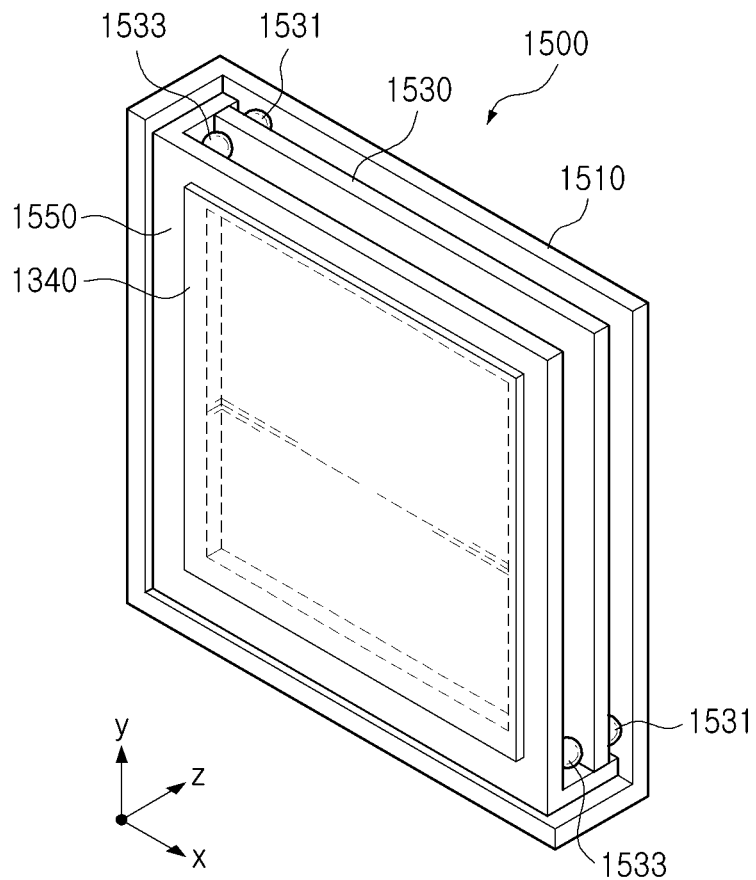
FIG. 42A is a perspective diagram illustrating a sensor shift structure applied to a camera module according to another example embodiment of the present disclosure.
Figure 42B:
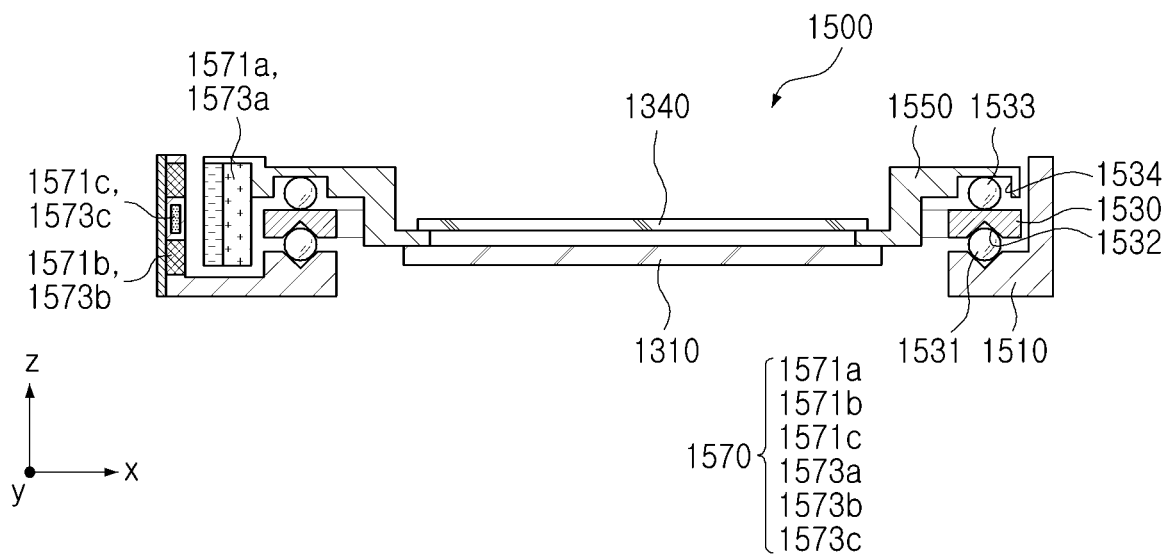
FIG. 42B is a cross-sectional diagram illustrating a sensor shift structure applied to a camera module according to another example embodiment of the present disclosure.
Figure 43A:
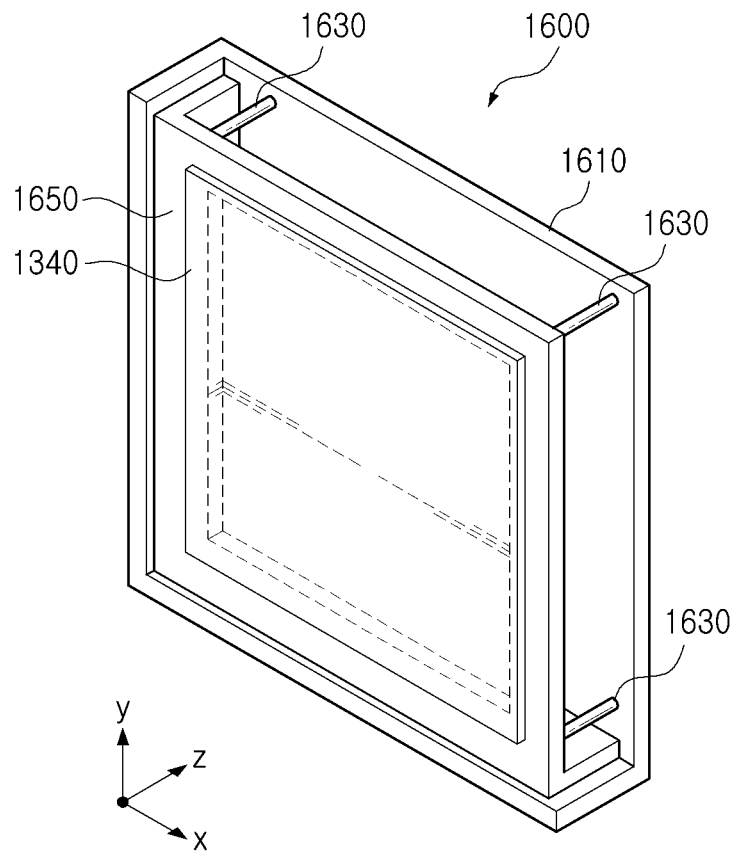
FIG. 43A is a perspective diagram illustrating a sensor shift structure applied to a camera module according to another example embodiment of the present disclosure.
Figure 43B:
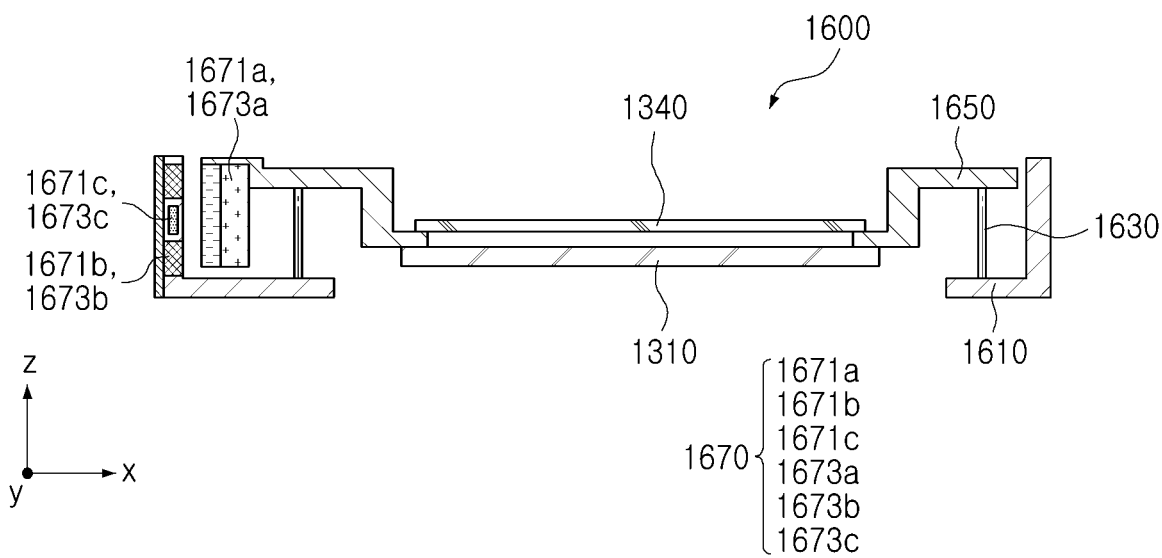
FIG. 43B is a cross-sectional diagram illustrating a sensor shift structure applied to a camera module according to another example embodiment of the present disclosure.

The above-described structure may be implemented according to the rolling movement of the ball member as illustrated in FIGS. 42A and 42B, or may be implemented by a spring support structure as illustrated in FIGS. 43A and 43B, for example.

Embodiment 6-2 (FIGS. 42A and 42B)

Referring to FIGS. 42A and 42B, an image sensor 1310 structure which may roll in a direction perpendicular to the optical axis direction while being supported by a ball member will be described. Although not illustrated in the drawings, the image sensor 1310 may be connected to the flexible board and may be connected to an external entity for control and power.

That is, an optical image stabilization module 1500 in the example embodiment may be a sensor shift module provided in the image sensor module 1300.

The optical image stabilization module 1500 may include a housing 1510 and a first frame 1530 and a second frame 1550 disposed in order in the housing 1510 in the optical axis direction (Z-axis direction), and the image sensor 1310 may be disposed in the second frame 1550.

The first frame 1530 may move in a first direction (Y-axis direction) perpendicular to the optical axis direction, and the second frame 1550 may move in a second direction (X-axis direction) perpendicular to both the optical axis direction and the first direction (Y-axis direction). Accordingly, the image sensor 1310 provided in the second frame 1550 may move in both the first direction (Y-axis direction) and the second direction (X-axis direction). Also, the optical image stabilization module 1500 may include a filter 1340, such as, for example, an infrared filter 1340.

The first frame 1530 may be disposed on the housing 1510 with a fifth ball member 1531 interposed therebetween, and the second frame 1550 may be disposed on the first frame 1530 with a sixth ball member 1533 interposed therebetween.

At least one of the opposite surfaces of the first frame 1530 and the housing 1510 may include a fifth guide groove 1532, and the fifth ball member 1531 may be inserted into a fifth guide groove 1532 and may work as a bearing by rolling or friction (sliding).

The fifth guide groove 1532 may be elongated in the first direction (Y-axis direction) perpendicular to the optical axis direction and may move by rolling or friction (sliding) in the first direction.

At least three fifth ball members 1531 may be disposed between the first frame 1530 and the housing 1510.

At least one of the opposite surfaces of the second frame 1550 and the first frame 1530 may include a sixth guide groove 1534, and the sixth ball member 1533 may be inserted into a sixth guide groove 1534 and may serve as a bearing by rolling or friction (sliding). The sixth guide groove 1534 may be elongated in the second direction (X-axis direction) perpendicular to both the optical axis direction and the first direction (Y-axis direction) and may roll or frictionally move (slide) in the second direction.

At least three sixth ball members 1533 may be disposed between the second frame 1550 and the first frame 1530.

The housing 1510 may be configured as a housing of the image sensor module 1300 forming an external shape thereof or a separately attached structure.

Also, the housing 1510 and the second frame 1550 may have a third driver 1570 providing driving force to move the first frame 1530 and the second frame 1550 in the first direction and the second direction, respectively.

The third driver 1570 may include coils 1571*b* and 1573*b* provided in the housing 1510 and magnets 1571*a* and 1573*a* provided in the second frame 1550.

The coils 1571*b* and 1573*b* may be disposed in the housing 1510 while being mounted on the board, and the magnets 1571*a* and 1573*a* may be provided in the first frame 1530 to oppose the coils 1571*b* and 1573*b*.

Although not illustrated, the magnets 1571*a* and 1573*a* may be separately provided in the first frame 1530 and the second frame 1550 to oppose the coils 1571*b* and 1573*b*, respectively.

In the drawing (FIG. 42B), as in the magnets 1571*a* and 1573*a*, and coils 1571*b* and 1573*b*, two reference numerals are simultaneously provided for a single magnet and a single coil, which may indicate that the component is either one of the two components. In an actual configuration, the components may be separately provided on different surfaces of the housing 1510. For example, the components may be disposed in positions corresponding to both sides of the housing 1010 in consideration of the reduction in thickness of the camera module.

Also, the optical image stabilization module 1500 in the example embodiment may use a closed-loop control method of continuously controlling by sensing the positions of the first frame 1530 and the second frame 1550, and accordingly, the housing 1510 may include position sensors 1571*c* and 1573*c* for sensing the position of the second frame 1550, and the position sensors may be disposed in positions in which changes in the magnetic field of the magnets 1571*a* and 1573*a* may be sensed. The position sensors 1571*c* and 1573*c* may be Hall sensors, general TMR sensors, TMR angle sensor, magnetic sensors, or the like.

Embodiment 6-3 (FIG. 43A and FIG. 43B)

Referring to FIGS. 43A and 43B, the structure of an image sensor 1310 structure which may roll in a direction perpendicular to the optical axis direction while being supported by the elastic member 1630 will be described. Although not illustrated in the drawings, the image sensor 1310 may be connected to a flexible board and may be connected to an external entity for control and power.

That is, the optical image stabilization module 1600 in the example embodiment may be configured as a sensor shift module provided in the image sensor module 1300.

The optical image stabilization module 1600 may include a housing 1610 and a frame 1650 overlapping the housing 1610 in the optical axis direction (Z-axis direction), and the image sensor 1310 may be disposed on the frame 1650.

The frame 1630 may move in a first direction (X-axis direction) perpendicular to the optical axis direction and in a second direction (Y-axis direction) perpendicular to both the optical axis direction and the first direction (X-axis direction). Accordingly, the image sensor 1310 provided in the frame 1650 may move in both the first direction (X-axis direction) and the second direction (Y-axis direction). Also, the optical image stabilization module 1600 may include a filter 1340, such as, for example, an infrared filter 1340.

The frame 1650 may be disposed to be supported by an elastic member 1630 in the housing 1610. The elastic member 1630 may be configured as a wire, a string, a coil spring, a leaf spring, or the like, having elasticity.

Four elastic members 1630 may be disposed between the frame 1650 and the housing 1610. In the drawings, only the structure in which the elastic member 1630 is erected in the optical axis direction is illustrated, but the elastic member 1630 may be elongated in a direction perpendicular to the optical axis direction or may have a structure in which at least four elastic members are connected to each other.

The housing 1610 may be configured as a housing of the image sensor module 1300 forming an external shape thereof or a structure attached separately.

Also, the housing 1610 and the frame 1650 may include a fourth driver 1670 providing driving force to move the frame 1650 in the first direction and the second direction.

The fourth driver 1670 may include coils 1671*b* and 1673*b* provided in the housing 1610 and magnets 1671*a* and 1673*a* provided in the frame 1650.

The coils 1671*b* and 1673*b* may be disposed in the housing 1610 while being mounted on the board, and the magnets 1671*a* and 1673*a* may be disposed in the frame 1650 to oppose the coils 1671*b* and 1673*b*.

In the drawing (FIG. 43B), for convenience, as in magnets 1671*a* and 1673*a*, and coils 1671*b* and 1673*b*, two reference numerals are simultaneously provided for a single magnet and a single coil, which may indicate that the component is either one of the two components. In an actual configuration, the components may be separately provided on different surfaces of the housing 1610. For example, the components may be disposed in positions corresponding to both sides of the housing 1010 in consideration of the reduction in thickness of the camera module.

Also, the optical image stabilization module 1600 in the example embodiment may use a closed-loop control method for continuously controlling by sensing the position of the frame 1650, and accordingly, the housing 1610 may include position sensors 1671*c* and 1673*c* for sensing the position of the second frame 1650, and the position sensors may be disposed in positions in which changes in the magnetic field of the magnets 1671*a* and 1673*a* may be sensed. The position sensors 1671*c* and 1673*c* may be Hall sensors, general TMR sensors, TMR angle sensor, magnetic sensors, or the like.

(FIG. 44) Another Type of Actuator

A driving actuator for generating force for moving the lens barrel in the optical axis direction in the lens module 1200 of the camera module 1000 in an example embodiment may be implemented as a linear actuator, a piezo-actuator, a shape memory alloy actuator, a stepper motor, an electromagnetic actuator, a moving coil, and a moving magnet. Although the detailed illustration of each actuator is not provided, actuators of various structures applied to general camera modules may be applied. Hereinafter, the structure of a piezo-actuator applicable to the example embodiment will be described as an example with reference to FIG. 44.

The camera module 1000 in an example embodiment may employ a piezo-actuator as a driving actuator. The structures illustrated in the other drawings may be applied other than the modification of the driving actuator.

Figure 44:
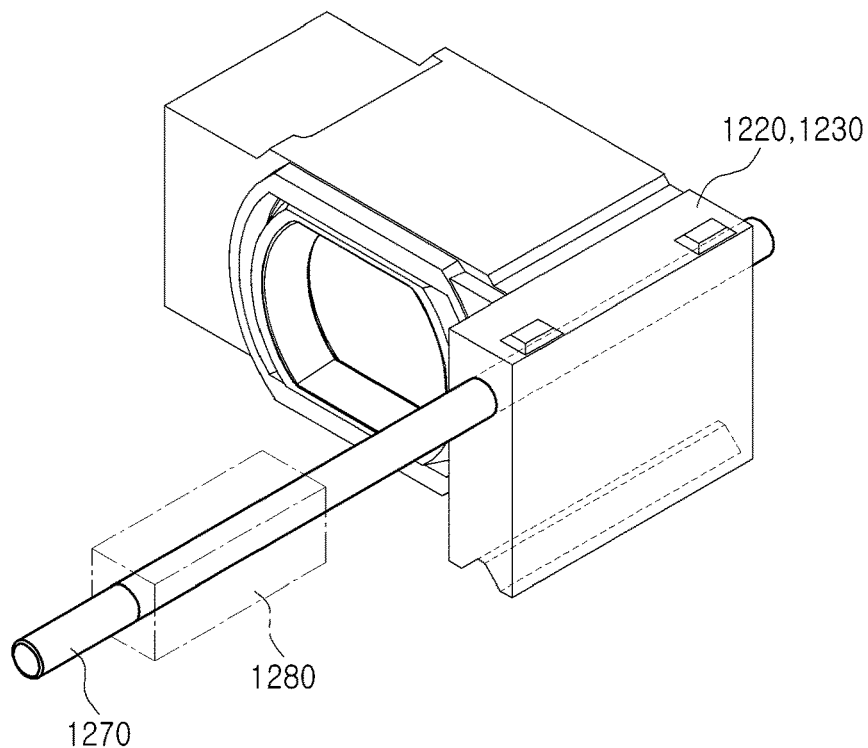
FIG. 44 is a perspective diagram illustrating a camera module having a piezo-actuator structure according to another example embodiment of the present disclosure.

Embodiment 7-1 (FIG. 44)

Referring to FIG. 44, in the camera module 1000 in the example embodiment, the actuator used in the lens module 1200 may be implemented as a piezo-actuator, rather than a voice coil motor using a coil and a magnet.

For the implementation of the piezo-actuator, a pusher 1270 having a rod-shape and elongated in the optical axis (Z-axis) direction, and a piezo device 1280 into which the pusher 1270 is inserted and penetrates may be provided.

The rod-shaped pusher 1270 extending and elongated in the optical axis (Z-axis) direction may be disposed on the lens barrels 1210 and 1220, and the piezo device 1280 into which the pusher 1270 is inserted and penetrates may be fixed to the housing 1010. The piezo device 1280 may generate force to push or pull the pusher 1270 in the optical axis direction, and accordingly, the lens barrels 1210 and 1220 in which the pusher 1270 is installed may move in the optical axis direction.

However, in the above-described structure, since the rod-shaped pusher 1270 moves in the optical axis direction, a relatively long space may be necessary in the optical axis direction.

Accordingly, in the example embodiment, the rod-shaped pusher 1270 elongated in the optical axis (Z-axis) direction may be disposed in the housing 1010, and the piezo device 1280 into which the pusher 1270 is inserted and penetrates may be provided in the lens barrels 1210 and 1220. The piezo device 1280 may generate force pushing or pulling the pusher 1270 in the optical axis direction, and accordingly, the lens barrels 1210 and 1220 in which the piezo device 1280 is installed may move in the optical axis direction.

(FIGS. 45 to 58) Position Sensor (Hall Sensor, TMR Sensor)

Figure 45:
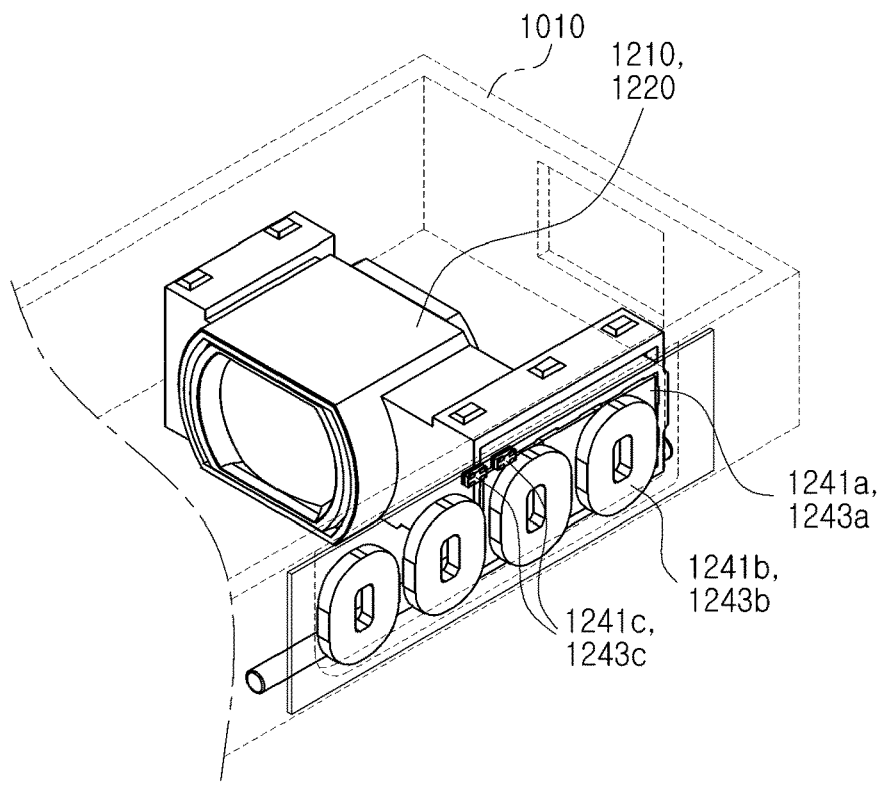
FIG. 45 is a diagram illustrating a positional relationship between a magnet and a position sensor provided in a lens barrel according to an example embodiment of the present disclosure.

FIG. 45 is a diagram illustrating a positional relationship between a magnet and a position sensor provided in a lens barrel according to an example embodiment.

Embodiment 8-1 (FIG. 45)

Referring to FIG. 45, the camera module 1000 in the example embodiment may use the position sensors 1241*c* and 1243*c* to sense the positions of the lens barrels 1210 and 1220 in the optical axis direction.

The position sensors 1241*c* and 1243*c* may be installed in a position in which changes in the magnetic field of a magnet provided in the lens barrels 1210 and 1220 may be sensed, and a hall sensor, a general TMR sensor, a TMR angle sensor, or the like, may be applied to the position sensors.

In the lens barrels 1210 and 1220 having a relatively long moving distance in the optical axis direction as in the example embodiment to implement the zoom function with improved performance, accuracy may be insufficient with a single position sensor, and thus, in the example embodiment, two or more position sensors may be used.

Figure 46:
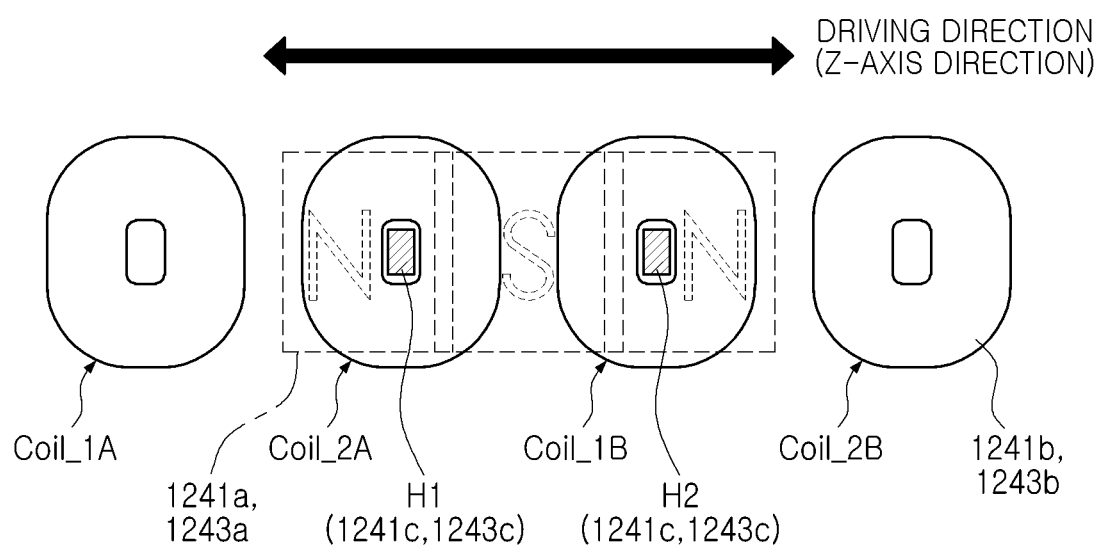
FIG. 46 is a diagram illustrating a positional relationship between a position sensor (Hall sensor) and a magnet according to an example embodiment of the present disclosure.
Figure 47:
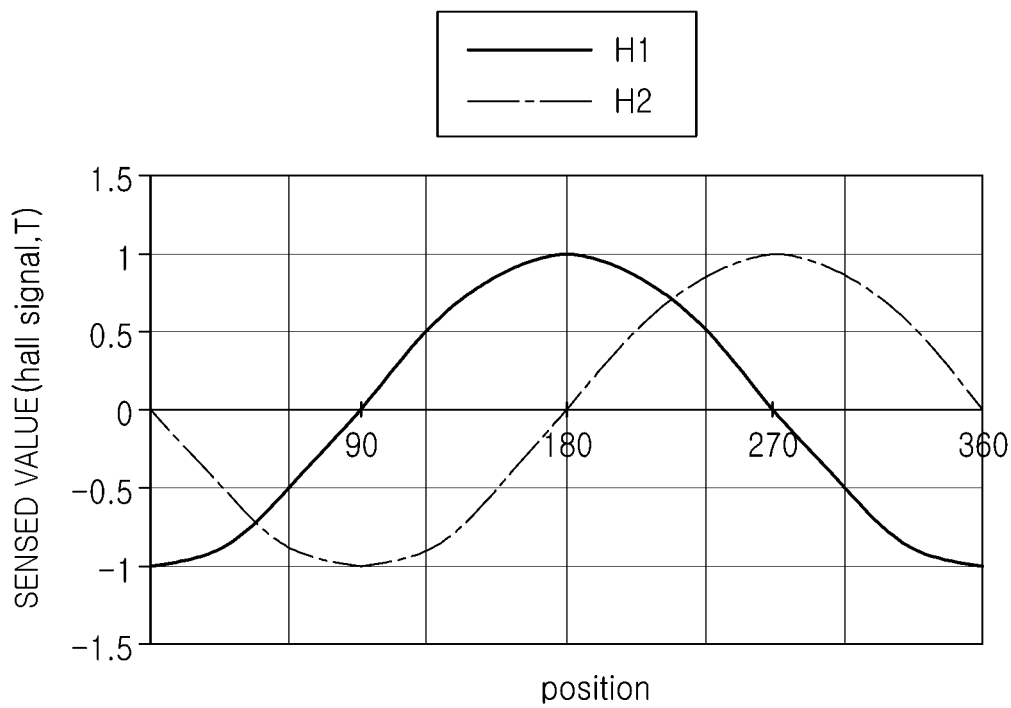
FIG. 47 is a graph illustrating sensed values of two position sensors (Hall sensors) according to the movement of the lens barrel in the positional relationship illustrated in FIG. 46.
Figure 48:
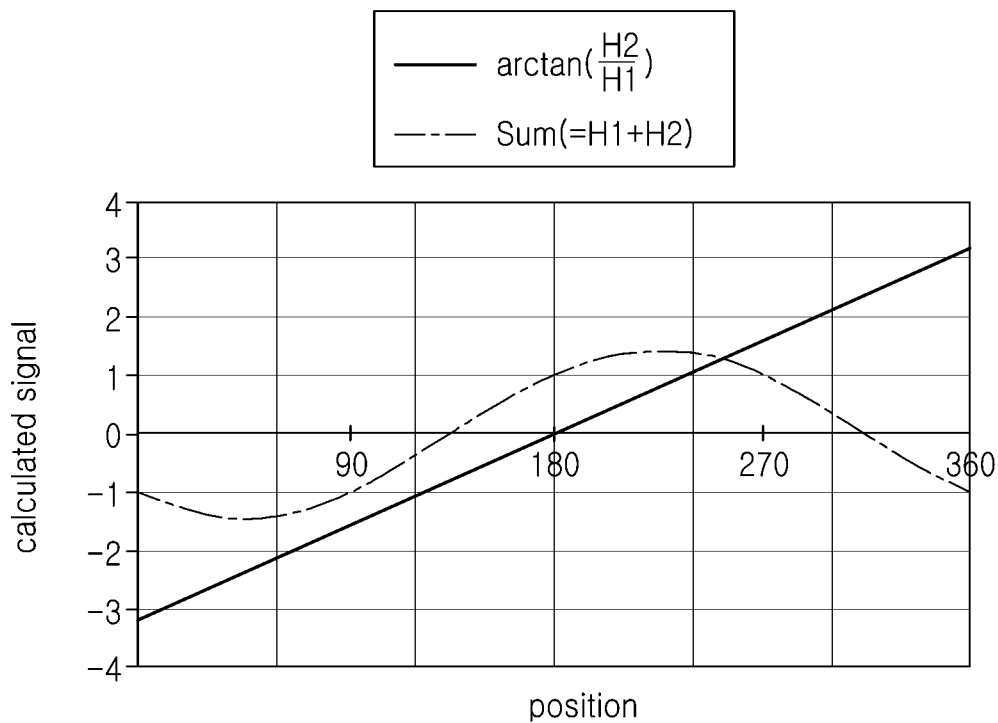
FIG. 48 is a graph illustrating a value taken as an arctan using the sensed value illustrated in FIG. 47.

Embodiment 8-2 (FIGS. 46 to 48)

FIG. 46 is a diagram illustrating a positional relationship between a position sensor (Hall sensor) and a magnet according to an example embodiment. FIG. 47 is a graph illustrating sensed values of two position sensors (Hall sensors) according to the movement of the lens barrel in the positional relationship illustrated in FIG. 46. FIG. 48 is a graph illustrating a value taken as an arctan using the sensed value illustrated in FIG. 47.

Referring to FIG. 46, at least four coils 1241*b* and 1243*b* arranged in the optical axis direction may be disposed in the housing 1010, and the lens barrels 1210 and 1220 moving in the optical axis direction may include magnets 1241*a* and 1243*a* magnetized in three poles to oppose the coils 1241*b* and 1243*b*. Here, the magnets 1241*a* and 1243*a* may be configured as driving magnets providing driving force to the lens barrels 1210 and 1220.

In the housing 1010, two position sensors 1241*c* and 1243*c*, marked H1 and H2 in the drawings, may be disposed in positions around the magnets 1241*a* and 1243*a* in which changes in the magnetic fields of the magnets 1241*a* and 1243*a* occur, respectively.

When the magnets 1241*a* and 1243*a* move in the optical axis direction (Z-axis direction), the position sensors H1 and H2, such as, for example, a Hall sensor or a general TMR sensor, may have different sensed values (unit, for example, T, Tesla) depending on the positions of the magnets 1241*a* and 1243*a*, and in the example embodiment, the first and second position sensors H1 and H2 may sense sine (sin) or cosine (cos) curves according to the movement of the magnets 1241*a* and 1243*a*.

As illustrated in FIG. 47, the first and second position sensors H1 and H2 in the example embodiment may be disposed in the housing 1010 such that the values sensed according to the movement of the magnets 1241*a* and 1243*a* may have a phase difference of 90 degrees therebetween.

A difference in the sensed values of the position sensors may be varied depending on a magnetization interval, width, or the like, of the magnets 1241*a* and 1243*a* and the installation position of the position sensor, and accordingly, the position sensors H1 and H2 may be installed in the housing 1010 such that the sensed values may have a phase difference of 90 degrees therebetween after the magnets 1241*a* and 1243*a* are installed in the lens barrel 1210 and 1220.

When obtaining the arc tangent values of H1 and H2, that is, the value of arctan (H2/H1), in the sine or cosine curve values indicated by the sensed values of the first and second position sensors H1 and H2 illustrated in FIG. 47, the linear line illustrated in FIG. 48 may be derived. That is, when the arc tangent value of the sensed values of the two first and second position sensors H1 and H2 in the example embodiment is used, the arc tangent value may be represented in the graph in which the arc tangent value gradually increases depending on the positions of the lens barrels 1210 and 1220, and more specifically, the arc tangent value may be represented in the graph in which the arc tangent value increases or decreases constantly with a substantially constant slope.

In this case, since the arc tangent value may (constantly) increase or decrease according to the movement of the lens barrel in the optical axis direction, the positions of the lens barrels 1210 and 1220 may be easily and accurately sensed.

Figure 49:
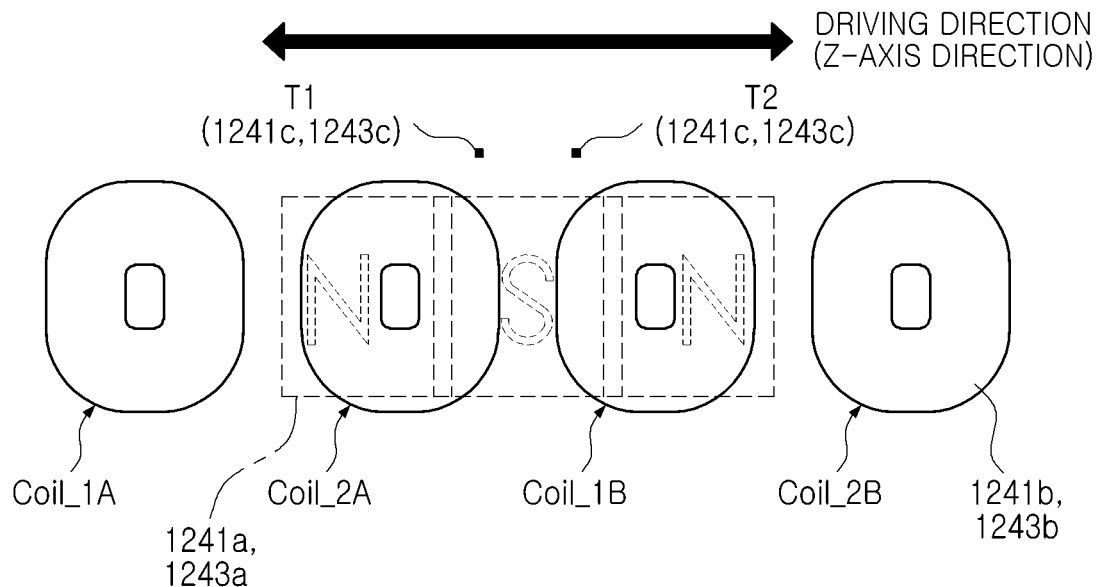
FIG. 49 is a diagram illustrating a positional relationship between a position sensor (a TMR angle sensor) and a magnet according to an example embodiment of the present disclosure.
Figure 50:
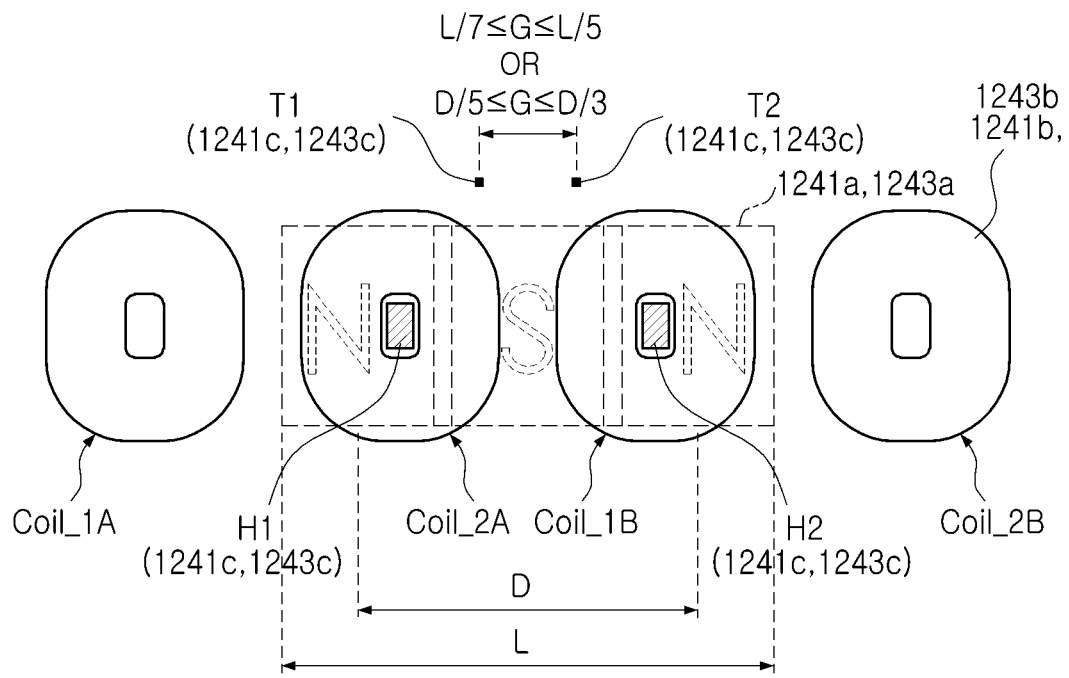
FIG. 50 is a diagram illustrating positioning of the TMR angle sensor illustrated in FIG. 49.
Figure 51:
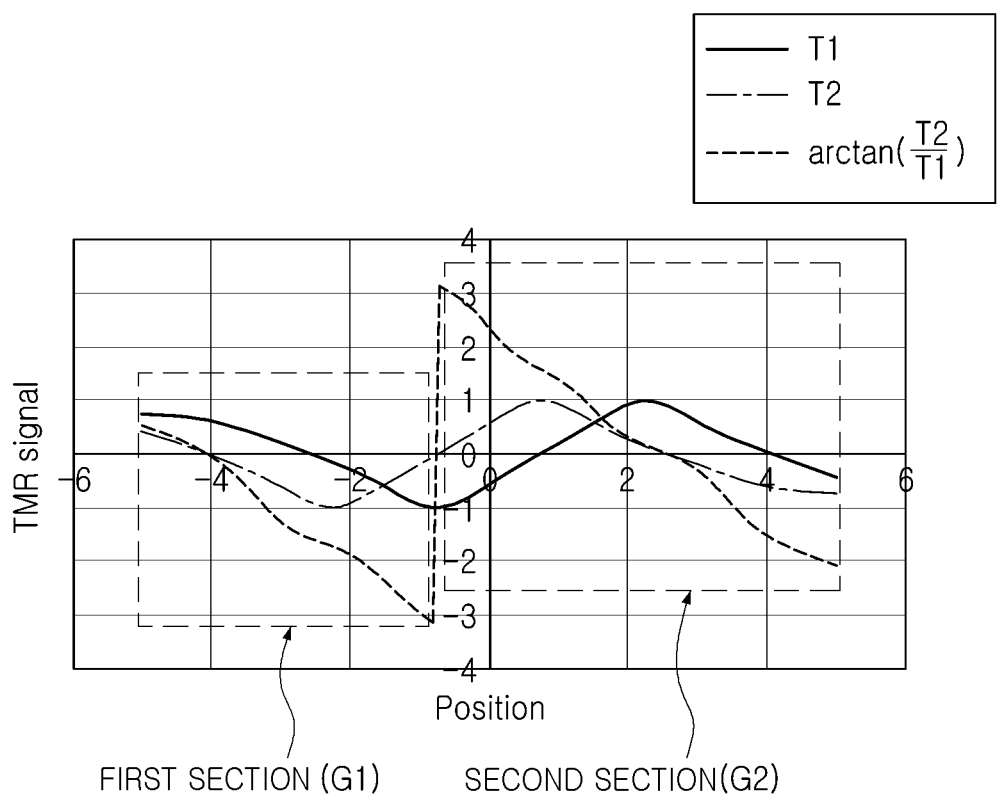
FIG. 51 is a graph illustrating sensed values of two position sensors (TMR angle sensors) according to the movement of the lens barrel in the positional relationship illustrated in FIG. 49 and an arctan of the sensed values.

Embodiment 8-3 (FIGS. 49 to 51)

FIG. 49 is a diagram illustrating a positional relationship between a position sensor (a TMR angle sensor) and a magnet according to an example embodiment. FIG. 50 is a diagram illustrating positioning of the TMR angle sensor illustrated in FIG. 49. FIG. 51 is a graph illustrating sensed values of two position sensors (TMR angle sensors) according to the movement of the lens barrel in the positional relationship illustrated in FIG. 49 and an arctan of the sensed values.

Referring to FIG. 49, the housing 1010 may include four coils 1241*b* and 1243*b* arranged in the optical axis direction, and the lens barrels 1210 and 1220 moving in the optical axis direction may have magnets 1241*a* and 1243*a* magnetized to 3 poles to oppose the coils 1241*b* and 1243*b*. Here, the magnets 1241*a* and 1243*a* may be configured as driving magnets providing driving force to the lens barrels 1210 and 1220.

In the housing 1010, two position sensors 1241*c* and 1243*c*, marked T1 and T2 in the drawings, respectively, may be disposed in positions around the magnets 1241*a* and 1243*a* in which changes in the magnetic fields of the magnets 1241*a* and 1243*a* may be sensed.

When the magnets 1241*a* and 1243*a* move in the optical axis direction (Z-axis direction), the position sensors T1 and T2, such as, for example, the TMR angle sensor, may have different sensed values (unit, for example, degrees), and in the example embodiment, the first and second position sensors T1 and T2 may have a sine or cosine curve shape according to the movement of the magnets 1241*a* and 1243*a*. The TMR angle sensor may sense the angle of the magnetic force line generated from the magnets 1241*a* and 1243*a* (that is, sensing the angle of the magnetic force line passing through the TMR angle sensor), and may be generally used to sense the position of a rotating object, but in an example embodiment, the TMR angle sensor may be used for sensing the position of a lens barrel moving linearly.

The TMR angle sensor may be configured to accurately sense the movement position of the magnet even when the sensor does not oppose the magnet.

As in FIG. 51, the first and second position sensors T1 and T2 in the example embodiment may be disposed in the housing 1010 such that the values sensed according to the movement of the magnets 1241*a* and 1243*a* may have a phase difference of 90 degrees therebetween.

Therefore, as illustrated in FIG. 50, when the distance between the centers of the poles of both ends in the magnet magnetized with three polarities in the optical axis direction is "D", the distance G between the two TMR angle sensors T1 and T2 in the optical axis direction may be determined to be D/5 or more and D/3 or less. Alternatively, with reference to the total length L of the magnet in the optical axis direction, the distance G between the two TMR angle sensors T1 and T2 in the optical axis direction may be determined to be L/7 or more and L/5 or less.

The center of the two TMR angle sensors T1 and T2 may almost coincide with the center of the magnet in the optical axis direction. For example, in the case of a three-pole magnet, two TMR angle sensors T1 and T2 may be disposed so as not to deviate from the pole disposed in the middle.

Furthermore, a difference in the sensed values of the position sensors may be varied depending on the magnetization interval, width, or the like, of the magnets 1241*a* and 1243*a* and the installation position of the position sensor, and accordingly, the position sensors T1 and T2 may be installed in the housing 1010 such that the sensed values may have a phase difference of 90 degrees after the magnets 1241*a* and 1243*a* are installed in the lens barrels 1210 and 1220.

When obtaining the arc tangent values of the first and second position sensors T1 and T2 in the sine or cosine curve values indicated by the sensed values of the first and second position sensors T1 and T2 illustrated in FIG. 51, that is, the value of arctan (T2/T1), the linear line illustrated in FIG. 51 may be derived. That is, when the arc tangent value of the sensed values of the two first and second position sensors T1 and T2 in the example embodiment is used, the arc tangent value may be represented in the graph in which the arc tangent value gradually increases depending on the positions of the lens barrels 1210 and 1220, and more specifically, the arc tangent value may be represented in the graph in which the arc tangent value increases or decreases constantly with a substantially constant slope.

In this case, since the arc tangent value may (constantly) increase or decrease according to the movement of the lens barrel in the optical axis direction, the positions of the lens barrels 1210 and 1220 may be easily and accurately sensed.

However, the arc tangent value may include a section in which the arc tangent value jumps in the middle depending on the sensed value, and in this case, both values G1 and G2 may be used in consideration of the jumping section.

Figure 52A:
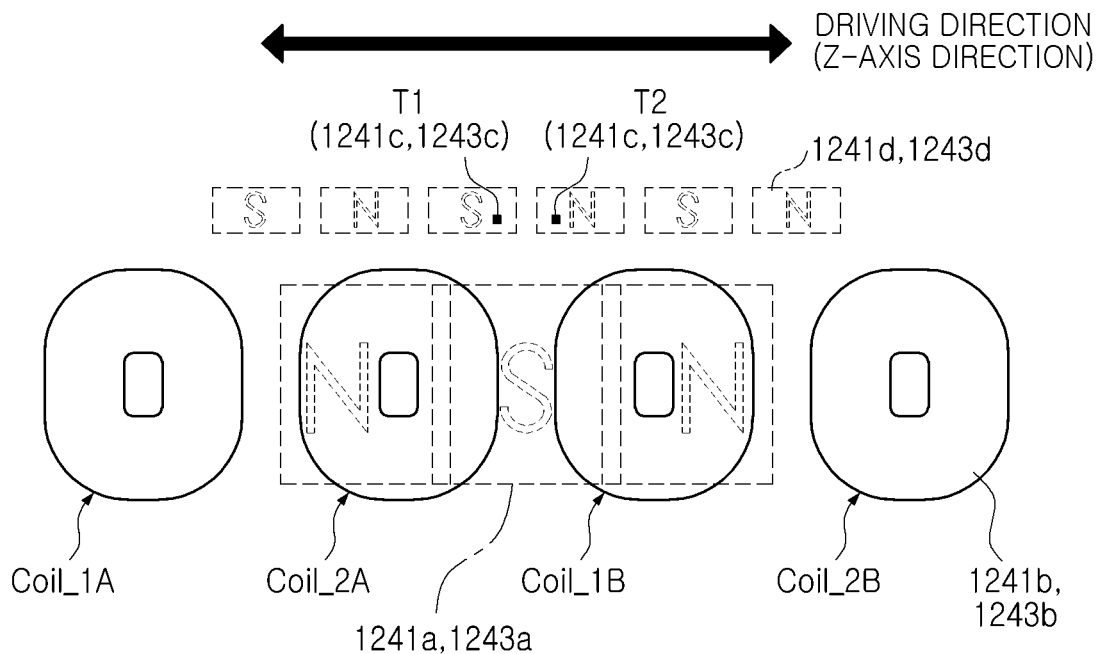
FIGS. 52A and 52B are diagrams illustrating a positional relationship between a position sensor (a TMR angle sensor) and a sensing magnet according to other example embodiments of the present disclosure.
Figure 52B:
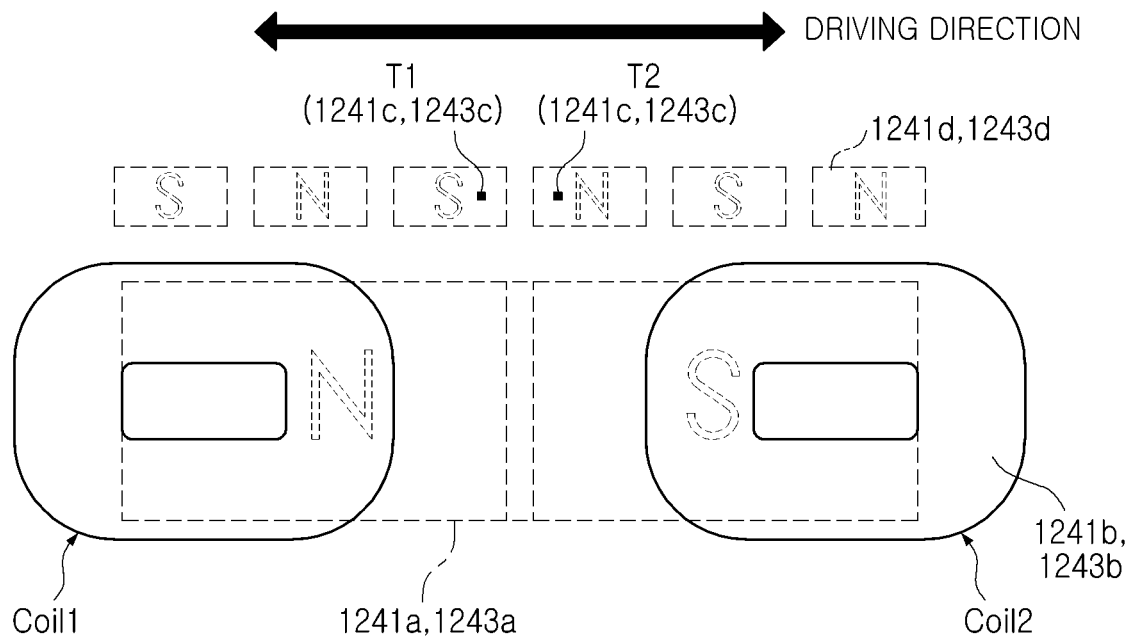
Figure 53:
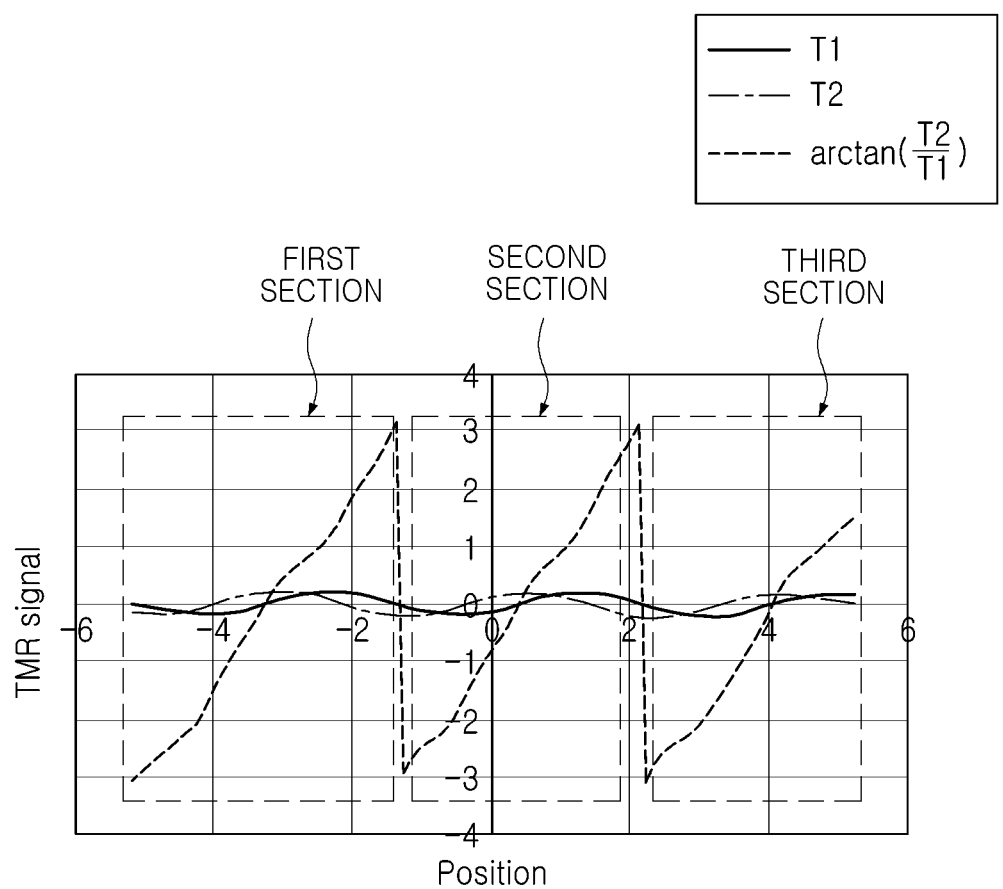
FIG. 53 is a graph illustrating sensed values of two position sensors (TMR angle sensors) according to the movement of the lens barrel in the positional relationship illustrated in FIG. 49 and an arctan of the sensed values.

Embodiment 8-4 (FIGS. 52A to 53)

FIGS. 52A and 52B are diagrams illustrating a positional relationship between a position sensor (a TMR angle sensor) and a sensing magnet according to another example embodiment. FIG. 53 is a graph illustrating sensed values of two position sensors (TMR angle sensors) according to the movement of the lens barrel in the positional relationship illustrated in FIG. 49 and an arctan of the sensed values.

Referring to FIGS. 52A and 52B, the housing 1010 may include coils 1241*b* and 1243*b* arranged in the optical axis direction, and the lens barrels 1210 and 1220 moving in the optical axis direction may have magnets 1241*a* and 1243*a* magnetized to at least two poles to oppose the coils 1241*b* and 1243*b*.

Specifically, in FIG. 52A, four coils 1241*b* and 1243*b* and magnets 1241*a* and 1243*a* magnetized to 3 poles to oppose the coils may be disposed, and in 1241*b*, two coils 1241*b* and 1243b and magnets 1241a and 1243a magnetized with two poles to oppose the coils may be disposed.

The sensing magnets 1241d and 1243d may be disposed in the lens barrels 1210 and 1220 separately from the driving magnets 1241a and 1243a. The sensing magnets 1241d and 1243d may be disposed to alternately have N poles and S poles in the optical axis direction.

In the housing 1010, two position detecting sensors 1241c and 1243c, marked T1 and T2 in the drawings, which may sense changes in the magnetic fields of sensing magnets 1241d and 1243d to oppose each other in the direction perpendicular to the optical axis direction, that is, for example, around the sensing magnets 1241d and 1243d, may be disposed.

When the sensing magnets 1241d and 1243d move in the optical axis direction (Z-axis direction), the position sensors T1 and T2, such as, for example, the TMR angle sensor, may have different sensed values depending on the positions of the magnets 1241d and 1243d (unit, for example, degrees), and in the example embodiment, the first and second position sensors T1 and T2 may appear in a sine or cosine curve according to the movement of the sensing magnets 1241d and 1243d. The TMR angle sensor may sense the angle of the magnetic force line generated from the sensing magnets 1241d and 1243d (that is, sensing the angle of the magnetic force line passing through the TMR angle sensor), and may be generally used to sense the position of a rotating object, but in the example embodiment, the TMR angle sensor may be used for sensing the position of a lens barrel moving linearly.

As illustrated in FIG. 53, the first and second position sensors T1 and T2 in the example embodiment may be disposed in the housing 1010 such that the sensed values according to the movement of the sensing magnets 1241d and 1243d may have a phase difference of 90 degrees therebetween.

A difference in the sensed values of the position sensors may be varied depending on the magnetization interval, width, or the like, of the magnets 1241d and 1243d and the installation position of the position sensor, and accordingly, the position sensors T1 and T2 may be installed in the housing 1010 such that the sensed values may have a phase difference of 90 degrees therebetween after the magnets 1241d and 1243d are installed in the lens barrels 1210 and 1220.

When obtaining the arc tangent values of the first and second position sensors T1 and T2 in the sine or cosine curve values indicated by the sensed values of the first and second position sensors T1 and T2 illustrated in FIG. 53, that is, the value of arctan (T2/T1), the linear line illustrated in FIG. 53 may be derived. That is, when the arc tangent value of the sensed values of the two first and second position sensors T1 and T2 in the example embodiment is used, the arc tangent value may be represented in the graph in which the arc tangent value gradually increases depending on the positions of the lens barrels 1210 and 1220, and more specifically, the arc tangent value may be represented in the graph in which the arc tangent value increases or decreases constantly with a substantially constant slope.

In this case, since the arc tangent value may (constantly) increase or decrease according to the movement of the lens barrel in the optical axis direction, the positions of the lens barrels 1210 and 1220 may be easily and accurately sensed.

However, it may include a section in which the arc tangent value jumps in the middle according to the sensed value, and in this case, both values (G1, G2, and G3) may be used in consideration of the jumping section.

Figure 54A:
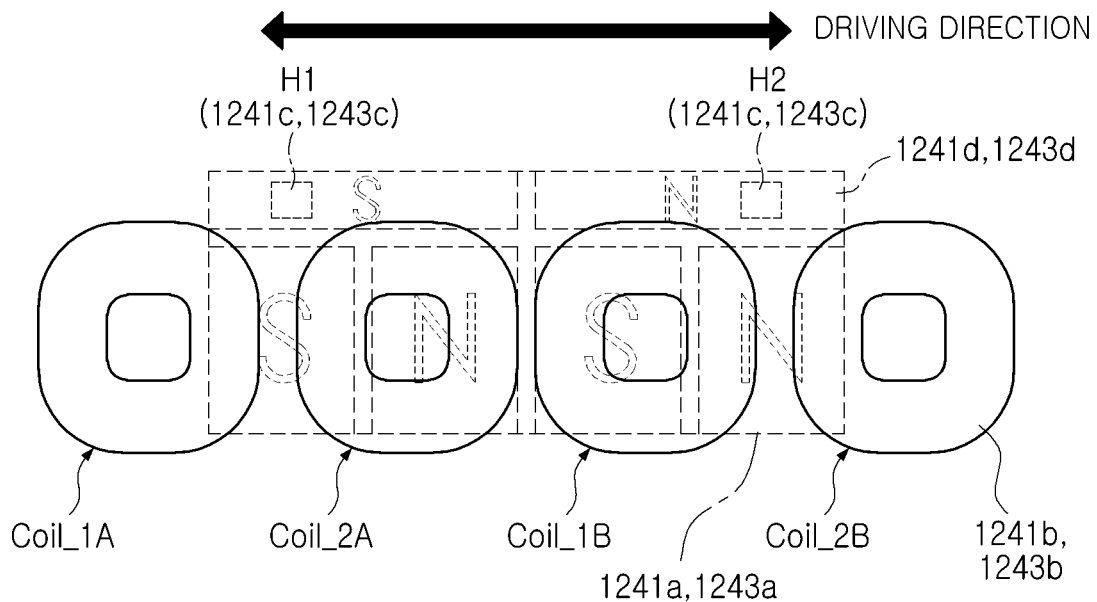
FIGS. 54A and 54B are diagrams illustrating a positional relationship between a position sensor (a Hall sensor or a general TMR angle sensor) and a sensing magnet according to other example embodiments of the present disclosure.
Figure 54B:
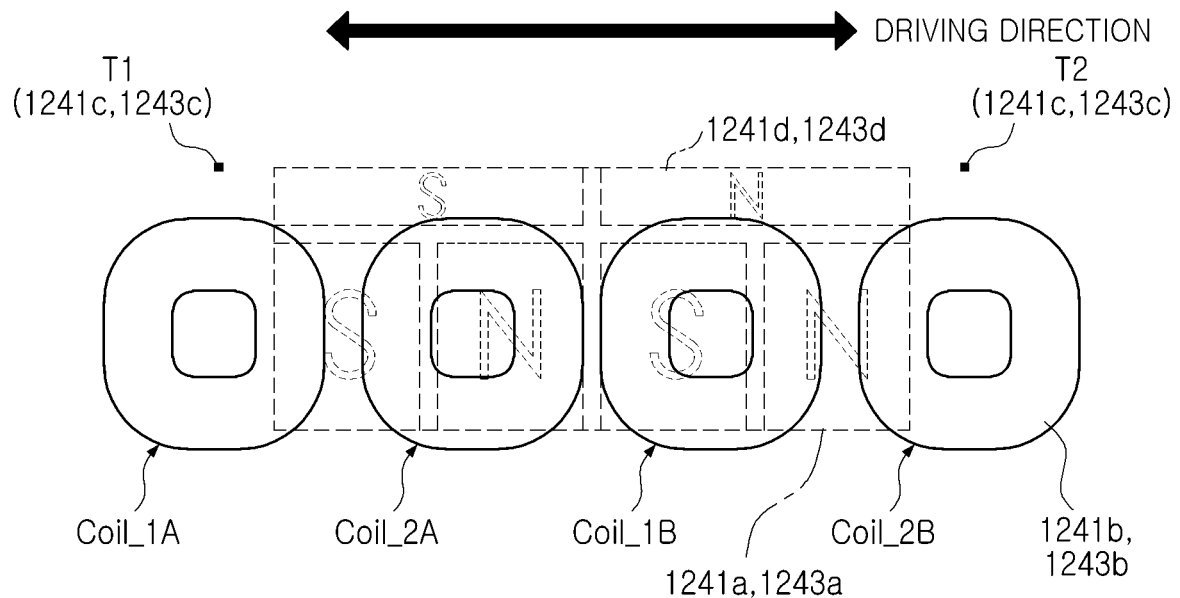
Figure 55:
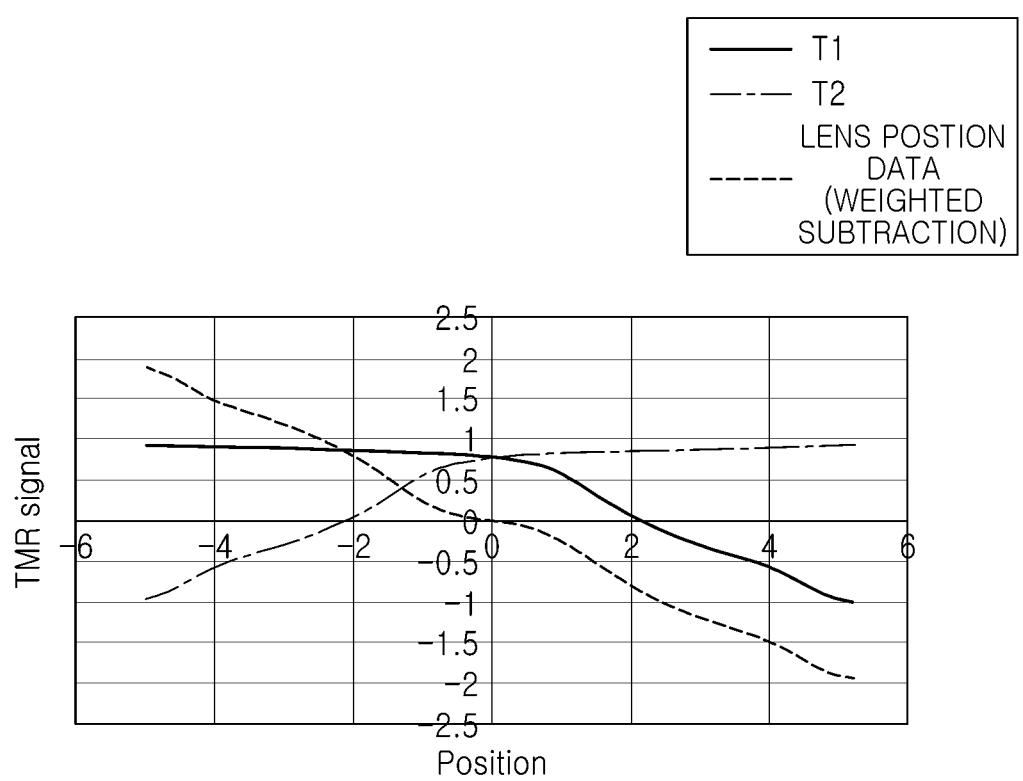
FIG. 55 is a graph illustrating sensed values of two position sensors (general TMR sensors) according to the movement of the lens barrel in the positional relationship illustrated in FIG. 54B and weighted subtraction values of the sensed values.

Embodiment 8-5 (FIGS. 54A to 55)

FIGS. 54A and 54B are diagrams illustrating a positional relationship between a position sensor (a Hall sensor or a general TMR angle sensor) and a sensing magnet according to another example embodiment. FIG. 55 is a graph illustrating sensed values of two position sensors (general TMR sensors) according to the movement of the lens barrel in the positional relationship illustrated in FIG. 54B and weighted subtraction values of the sensed values.

Referring to FIGS. 54A and 54B, the housing 1010 may include four coils 1241b and 1243b arranged in the optical axis direction, and the lens barrels 1210 and 1220 moving in the optical axis direction may include magnets 1241a and 1243a magnetized to 4 poles to oppose the coils 1241b and 1243b.

The sensing magnets 1241d and 1243d may be disposed in the lens barrels 1210 and 1220 separately from the driving magnets 1241a and 1243a. The sensing magnets 1241d and 1243d may be disposed to alternately have N poles and S poles in the optical axis direction.

The housing 1010 may include two position sensors 1241c and 1243c which may sense changes in the magnetic fields of the sensing magnets 1241d and 1243d around the sensing magnets 1241d and 1243d.

As illustrated in FIG. 54A, when the position sensors 1241c and 1243c are configured as Hall sensors or general TMR sensors H1 and H2, the position sensors 1241c and 1243c may be disposed to oppose the sensing magnets 1241d and 1243d. As illustrated in FIG. 54B, when the position sensors 1241c and 1243c are configured as TMR angle sensors T1 and T2, the position sensors 1241c and 1243c may be disposed on both sides to have a spacing greater than the length of the sensing magnets 1241d and 1243d in the entire optical axis direction.

When the sensing magnets 1241d and 1243d move in the optical axis direction (Z-axis direction), the position sensor may have different sensed values depending on the positions of the magnets 1241d and 1243d.

The two sensed values may be expressed as a graph having a shape almost symmetrical horizontally with respect to the original point, and when the values are weighted-subtracted (lens position value=a*1th position sensor sensed value-b*2 position sensor sensed value, where a and b are positive numbers), the values may be represented in a graph in which the lens position value gradually increases or decreases depending on the position, and more specifically, the values may be represented in a graph in which the values constantly increases or decreases with a substantially constant slope.

For example, when the position sensors 1241c and 1243c are configured as the TMR angle sensors T1 and T2, the sensed values of the two TMR angle sensors T1 and T2 may be represented in the graph having a shape almost symmetrical horizontally with respect to the original point as illustrated in FIG. 55, and when the values are weighted-subtracted (lens position value=a*T1 sensed value-b*T2 sensed value, where a and b are positive numbers), the values may be represented in a graph in which the lens position value gradually increases or decreases depending on the position, and more specifically, the values may be represented in a graph in which the values constantly increases or decreases with a substantially constant slope.

That is, since the lens position value may (constantly) increase or decrease according to the movement of the lens barrel in the optical axis direction, the positions of the lens barrels 1210 and 1220 may be easily and accurately sensed.

Figure 56:
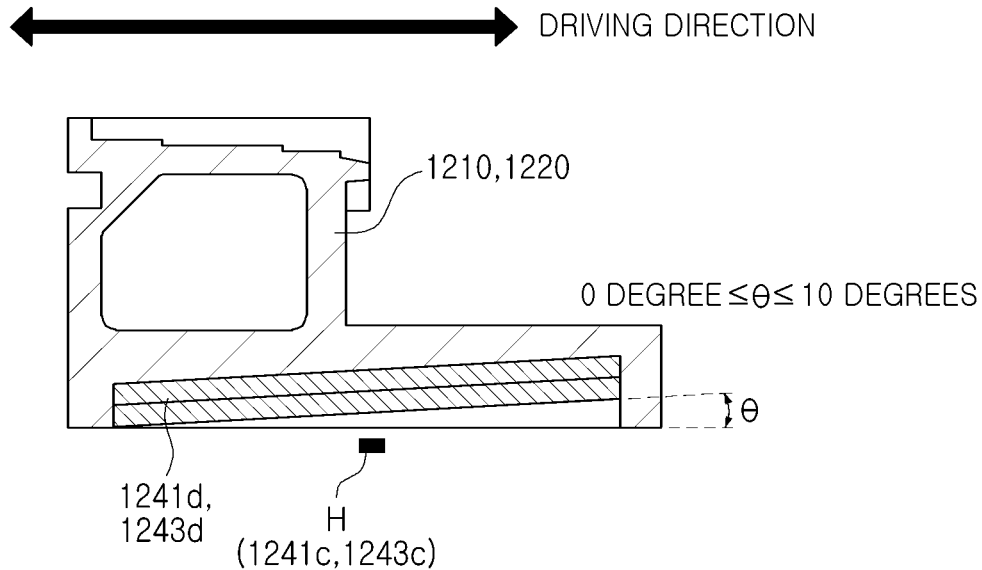
FIG. 56 is a diagram illustrating a positional relationship between a single position sensor (a Hall sensor or a general TMR angle sensor) and a sensing magnet according to another example embodiment of the present disclosure.

Embodiment 8-6 (FIG. 56)

FIG. 56 is a diagram illustrating a positional relationship between a single position sensor (a Hall sensor or a general TMR angle sensor) and a sensing magnet according to another example embodiment.

Referring to FIG. 56, the lens barrels 1210 and 1220 may include sensing magnets 1241d and 1243d having a structure inclined with respect to the optical axis direction. The sensing magnets 1241d and 1243d may be inclined within ±10 degrees with respect to the optical axis.

The sensing magnets 1241d and 1243d and the position sensors 1241c and 1243c may be disposed opposite to each other. The position sensors 1241c and 1243c may be Hall sensors or general TMR sensors H1 and H2.

The sensing magnets 1241d and 1243d may have a surface opposite to the position sensors 1241c and 1243c to be magnetized as a single pole (N pole or S pole), and accordingly, when the lens barrels 1210 and 1220 move in the optical axis direction, the distance between the position sensors 1241c and 1243c and the sensing magnets 1241d and 1243d may increase or decrease linearly, and accordingly, the sensed values of the position sensors 1241c and 1243c may increase or decrease linearly depending on the difference in the magnetic force.

Accordingly, the position of the lens barrel 1210 and 1220 may be sensed in a simplified manner.

Figure 57:
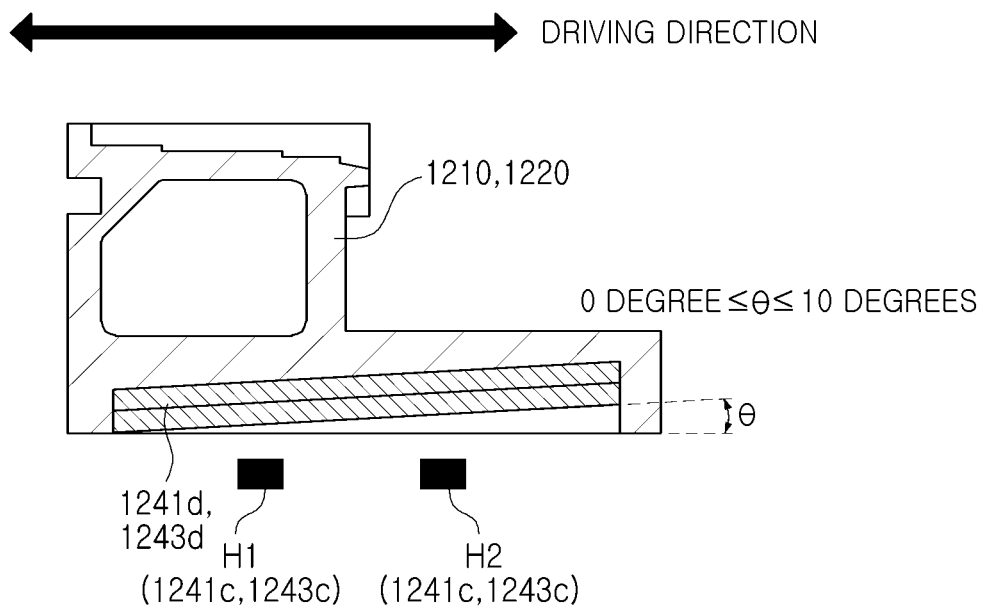
FIG. 57 is a diagram illustrating a positional relationship between two position sensors (Hall sensors or general TMR angle sensors) and a sensing magnet according to another example embodiment of the present disclosure.
Figure 58:
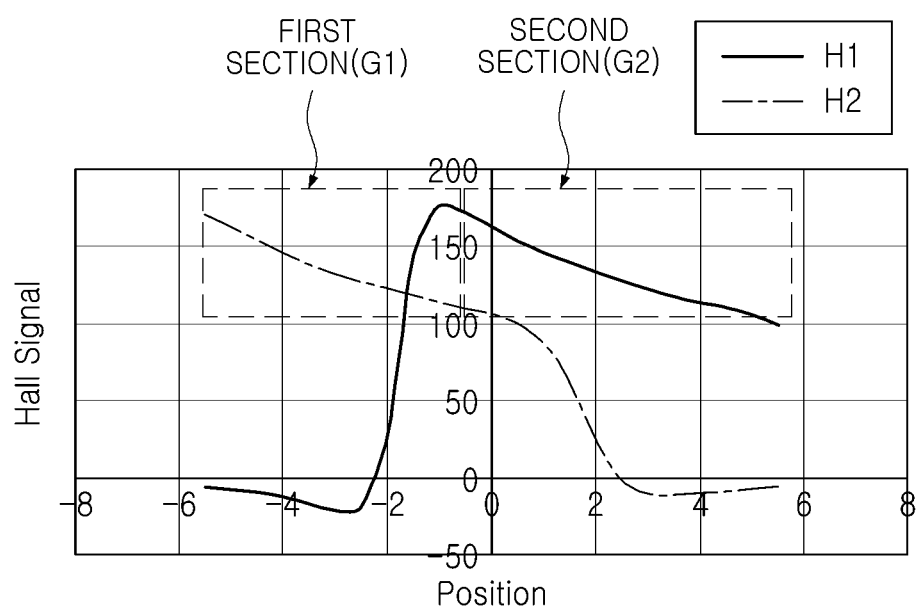
FIG. 58 is a graph illustrating sensed values of two position sensors (Hall sensors or general TMR angle sensors) according to the movement of the lens barrel in the positional relationship illustrated in FIG. 54B and weighted subtraction values of the sensed values.

Embodiment 8-7 (FIGS. 57 to 58)

FIG. 57 is a diagram illustrating a positional relationship between two position sensors (Hall sensors or general TMR angle sensors) and a sensing magnet according to another example embodiment. FIG. 58 is a graph illustrating sensed values of two position sensors (Hall sensors or general TMR angle sensors) according to the movement of the lens barrel in the positional relationship illustrated in FIG. 54B and weighted subtraction value values of the sensed values.

The position sensing according to FIG. 56 may be relatively efficient, but when the lens barrel moves a relatively long distance in the optical axis direction to implement high-performance zoom, it may not be easy to accurately sense the position sensing in a predetermined distance or more.

Accordingly, in FIG. 57, two or more position sensors 1241c and 1243c may be provided.

Referring to FIG. 57, the lens barrels 1210 and 1220 may include sensing magnets 1241d and 1243d having a structure inclined with respect to the optical axis direction. The sensing magnets 1241d and 1243d may be inclined within ±10 degrees with respect to the optical axis.

At least two position sensors 1241c and 1243c may be disposed to oppose the sensing magnets 1241d and 1243d. The position sensors 1241c and 1243c may be Hall sensors or general TMR sensors H1 and H2.

The sensing magnets 1241d and 1243d may have surfaces opposite to the position sensors 1241c and 1243c to be magnetized as a single pole (N pole or S pole), and accordingly, when the lens barrels 1210 and 1220 move in the optical axis direction, the distance between the position sensors 1241c and 1243c and the sensing magnets 1241d and 1243d increases or decreases linearly, such that the sensed values of the position sensors 1241c and 1243c may linearly increase or decrease depending on the difference in magnetic force.

However, as illustrated in FIG. 58, there may be jumping phenomenon in which the sensed values of the position sensors 1241c and 1243c may rapidly fall or decrease when exceeding a predetermined section, and accordingly, among the sensed values of the position sensors 1241c and 1243c, the section in which the value linearly increases or decreases may be taken and may be used for position sensing.

According to the aforementioned example embodiments, the camera module in an example embodiment may implement functions such autofocusing adjustment, zoom, and optical image stabilization, may have a simplified structure, and may have a reduced size.

Furthermore, in the example embodiments, even when a plurality of groups of lenses are provided, the plurality of groups of lenses may be easily aligned in the optical axis direction.

Also, in the example embodiments, a guide to allow a plurality of groups of lenses to easily move in an optical axis direction may be included.

Also, both the zoom lens and the reflective module may include a stopper or a damper so as not to deviate from the optimal position.

Also, to implement the maximum performance of the zoom lens, the movement position of the zoom lens may be measured accurately by the plurality of position sensors and the sensed result may be used.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing having an internal space; and
   a first lens module and a second lens module disposed in the internal space, and each configured to be movable in an optical axis direction,
   wherein one side of the first lens module is supported by a first shaft, and another side of the first lens module is supported by a first ball member,
   wherein one side of the second lens module on the same side as the one side of the first lens module is supported by a second ball member, and another side of the second lens module on the same side as the other side of the first lens module is supported by a second shaft, and
   wherein the first shaft and the first ball member are disposed to contact a bottom surface of the first lens module and the second shaft and the second ball member are disposed to contact a bottom surface of the second lens module.

2. The camera module of claim 1,
   wherein the one side of the first lens module has a length longer than that of the other of both sides of the first lens module in the optical axis direction, and wherein the other of both sides of the second lens module has a length longer than that of the one side of the second lens module in the optical axis direction.

3. The camera module of claim 1,
wherein a first magnet is disposed on one side surface of the first lens module, and a first coil portion including a plurality of coils is disposed in a position opposing the first magnet in a direction perpendicular to an optical axis direction,
wherein a second magnet is disposed on one side surface of the second lens module, and a second coil portion including a plurality of coils is disposed in a position opposing the second magnet in a direction perpendicular to the optical axis direction, and
wherein the one side surface of the first lens module and the one side surface of the second lens module are disposed opposite to each other with respect to the optical axis.

4. The camera module of claim 3,
wherein one surface of the first magnet opposing the first coil portion has an N pole and an S pole in the optical axis direction,
wherein one surface of the second magnet opposing the second coil portion has an N pole and an S pole in the optical axis direction, and
wherein two position sensors of which sensed values have a phase difference of 90 degrees therebetween according to a movement of the first magnet, and two position sensors of which sensed values have a phase difference of 90 degrees therebetween according to a movement of the second magnet are disposed in the housing.

5. The camera module of claim 1,
wherein a magnetic material configured to generate magnetic force in a direction perpendicular to the optical axis direction is disposed on each of surfaces of the first lens module and the housing opposing each other, and
wherein a magnetic material configured to generate magnetic force in a direction perpendicular to the optical axis direction is disposed on each of surfaces of the second lens module and the housing opposing each other.

6. The camera module of claim 5,
wherein a center of magnetic force acting between the first lens module and the housing is disposed more adjacent to the first shaft than the first ball member, and
wherein a center of magnetic force acting between the second lens module and the housing is disposed more adjacent to the second shaft than the second ball member.

7. The camera module of claim 1, wherein the first shaft and the second shaft are disposed on and fixed to a bottom surface of the housing.

8. The camera module of claim 1,
wherein the first lens module includes a first guide groove in which the first shaft is accommodated and a second guide groove in which the first ball member is accommodated, and
wherein the second lens module includes a third guide groove in which the second shaft is accommodated and a fourth guide groove in which the second ball member is accommodated.

9. The camera module of claim 8,
wherein a plurality of contact protrusions are disposed in the first guide groove and the third guide groove, respectively, and wherein the plurality of contact protrusions are configured to slide with respect to the first shaft and the second shaft.

10. The camera module of claim 9, wherein each of the first lens module and the second lens module are supported at three points by the plurality of contact protrusions, the first ball member, and the second ball member.

11. The camera module of claim 1, further comprising:
a reflective module configured to change a path of light such that light is directed toward the first lens module and the second lens module; and
an image sensor module including an image sensor configured to receive light passing through the first lens module and the second lens module.

12. The camera module of claim 11, wherein the reflective module is configured to be rotatable about a first axis perpendicular to the optical axis and a second axis perpendicular to both the optical axis and the first axis as rotation axes.

13. The camera module of claim 11, wherein the image sensor is configured to be movable on a first axis perpendicular to an optical axis and a second axis perpendicular to both the optical axis and the first axis.

14. The camera module of claim 1,
wherein a first stopper configured to limit a moving distance of the first lens module and a second stopper configured to limit a moving distance of the second lens module are disposed in the housing, and
wherein the first stopper is disposed to press both ends of the first shaft, and the second stopper is disposed to press both ends of the second shaft.

15. The camera module of claim 1, wherein, when moving in the optical axis direction, rolling friction occurs on one of both sides of each lens module, and sliding friction occurs on the other of both sides.

16. A camera module, comprising:
a housing comprising a first side surface and a second side surface facing each other with an internal space therebetween;
first and second lens barrels disposed in the internal space along an optical axis direction;
a first shaft and a first ball member disposed between the first lens barrel and the housing; and
a second ball member and a second shaft disposed between the second lens barrel and the housing,
wherein the first shaft and the second ball member are disposed close to the first side surface of the housing, and the first ball member and the second shaft are disposed close to the second side surface of the housing, and
wherein the first shaft is disposed closer to the first side surface of the housing than the second ball member, and the second shaft is disposed closer to the second side surface of the housing than the first ball member.

17. The camera module of claim 16, wherein the first lens barrel is movably disposed on the first shaft and the first ball member to move in the optical axis direction, and
wherein the second lens barrel is movably disposed on the second shaft and the second ball member to move in the optical axis direction.

18. The camera module of claim 17, wherein the first lens barrel is supported on the first shaft in two sliding areas spaced apart from each other in the optical axis direction and supported on the first ball member in one rolling area.

19. The camera module of claim 18, wherein the first lens barrel comprises a pair of protrusions in each sliding area slidably contacting the first shaft, and a groove accommodating the first ball member rotatable in the rolling area.

20. The camera module of claim 19, wherein the protrusions are disposed in a groove on the first lens module.

21. The camera module of claim 18, wherein the first shaft comprises a pair of shafts, and
wherein the first lens barrel comprises a protrusion in each sliding area slidably contacting the pair of shafts, and a groove accommodating the first ball member rotatable in the rolling area.

22. The camera module of claim 16, wherein a side of the first lens barrel disposed facing the first side surface is slidably supported on the first shaft, and a side of the first lens barrel disposed facing the second side surface is supported on the first ball member, wherein the first ball member is rotatable, and
wherein a side of the second lens barrel disposed facing the second side surface is slidably supported on the second shaft, and a side of the second lens barrel disposed facing the first side surface is supported on the second ball member, wherein the second ball member is rotatable.

23. The camera module of claim 22, wherein the side of the first lens barrel disposed facing the first side surface has a length longer in the optical axis direction than that of the side of the first lens barrel disposed facing the second side surface, and
wherein the side of the second lens barrel disposed facing the second side surface has a length longer in the optical axis direction than that of the side of the second lens barrel disposed facing the first side surface.

24. The camera module of claim 22, wherein first coils are disposed in the optical axis direction on the first side surface and a first magnet is disposed on the first lens barrel opposing the first coils, and
wherein a second magnet is disposed on the side of the second lens barrel disposed facing the second side surface, and second coils are disposed in the optical axis direction opposing the second magnet.

25. A camera module, comprising:
a first lens barrel slidably disposed on a first shaft disposed in an optical axis direction; and
a second lens barrel spaced apart from the first shaft and slidably disposed on a second shaft disposed in the optical axis direction,
wherein the first and second lens barrels are disposed on an optical axis,
wherein a first side of the first lens barrel has a length longer in the optical axis direction than that of a second side of the first lens barrel opposite to the first side,
wherein a second side of the second lens barrel has a length longer in the optical axis direction than that of a first side of the second lens barrel opposite to the second side, and
wherein the first sides of the first and second lens barrels face in a substantially same direction perpendicular to the optical axis direction.

26. The camera module of claim 25, further comprising:
first and second rotatable ball members spaced apart from the first and second shafts in a direction perpendicular to the optical axis direction, respectively,
wherein the first lens barrel is disposed on the first ball member, and
wherein the second lens barrel is spaced apart from the first ball member and disposed on the second ball member.

27. The camera module of claim 26, wherein the first ball member comprises two or more rotatable ball members, and
wherein the second ball member comprises two or more rotatable ball members.

28. The camera module of claim 26, wherein a lower surface connecting the first side and the second side of the first lens barrel is disposed on the first shaft and the first ball member,
wherein the first shaft is disposed closer to the first side of the first lens barrel than the first ball member is, and
wherein the lower surface is supported on the first shaft in two places and on the first ball member in one place to form a triangle of support.

29. The camera module of claim 28, wherein a center of magnetic force urging the first lens barrel in a direction toward the first shaft and the first ball member is disposed within the triangle of support.

30. The camera module of claim 25, further comprising:
a reflective module configured to change a path of light such that light is directed toward the first lens barrel and the second lens barrel; and
an image sensor module including an image sensor configured to receive light passing through the first lens barrel and the second lens barrel.

31. The camera module of claim 30, wherein one or more of the reflective module and the image sensor is configured to be movable on a first axis perpendicular to the optical axis and a second axis perpendicular to both the optical axis and the first axis.

* * * * *